(12) United States Patent  
Adibhatla et al.

(10) Patent No.: US 11,834,196 B2
(45) Date of Patent: Dec. 5, 2023

(54) SYSTEM AND METHOD FOR CONTROL FOR UNDUCTED ENGINE

(71) Applicant: General Electric Company, Schenectady, NY (US)

(72) Inventors: Sridhar Adibhatla, Glendale, OH (US); Stefan Joseph Cafaro, Maineville, OH (US); Robert Jon McQuiston, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 228 days.

(21) Appl. No.: 17/071,000

(22) Filed: Oct. 15, 2020

(65) Prior Publication Data

US 2021/0108575 A1 Apr. 15, 2021

Related U.S. Application Data

(60) Provisional application No. 62/915,364, filed on Oct. 15, 2019.

(51) Int. Cl.
*F01D 7/00* (2006.01)
*B64D 45/00* (2006.01)
(Continued)

(52) U.S. Cl.
CPC .............. *B64D 45/00* (2013.01); *B32B 7/022* (2019.01); *B64C 1/12* (2013.01); *B64C 1/38* (2013.01);
(Continued)

(58) Field of Classification Search
CPC ......... B64C 11/30; B64C 11/305; F01D 7/00; F01D 7/02; F02C 7/042; F02C 9/26;
(Continued)

(56) References Cited

U.S. PATENT DOCUMENTS 4,321,791 A * 3/1982 Carroll ...................... F02C 9/28
  60/790
4,446,696 A * 5/1984 Sargisson ................ F02K 3/077
  60/226.3

(Continued)

OTHER PUBLICATIONS

Carney et al., Weight Assessment for Fuselage Shielding on Aircraft With Open-Rotor Engines and Composite Blade Loss, NASA/TM-2013-216582, 2013, 33 Pages.

(Continued)

*Primary Examiner* — Alain Chau
(74) *Attorney, Agent, or Firm* — Dority & Manning, P.A.

(57) ABSTRACT

A computing system for an unducted rotor engine with a variable pitch vane assembly in aerodynamic relationship with an unducted rotor assembly, including a sensor-based controller configured to execute a first set of operations and a model-based controller configured to execute a second set of operations. The first set of operations includes obtaining a first signal corresponding to a commanded low spool speed; obtaining a second signal indicative of a pitch angle corresponding to thrust output from the unducted rotor assembly and variable pitch vane assembly; generating a pitch feedback signal corresponding to a commanded adjustment to the pitch angle based at least on one or both of a variable blade pitch angle or a variable vane pitch angle. The second set of operations include obtaining a desired thrust output via a throttle input; determining, at least via a power management block, a commanded thrust output signal; receiving the commanded thrust output signal; and generating an output signal.

17 Claims, 24 Drawing Sheets

(51) Int. Cl.

| | |
|---|---|
| *B32B 7/022* | (2019.01) |
| *B64C 1/12* | (2006.01) |
| *B64C 1/38* | (2006.01) |
| *B64D 27/12* | (2006.01) |
| *F01D 5/14* | (2006.01) |
| *F01D 5/18* | (2006.01) |
| *F01D 5/30* | (2006.01) |
| *F01D 9/04* | (2006.01) |
| *F01D 15/10* | (2006.01) |
| *F01D 15/12* | (2006.01) |
| *F01D 17/16* | (2006.01) |
| *F01D 25/12* | (2006.01) |
| *F02C 6/20* | (2006.01) |
| *F02C 7/264* | (2006.01) |
| *F02C 7/32* | (2006.01) |
| *F02C 7/36* | (2006.01) |
| *F02C 9/00* | (2006.01) |
| *F02C 9/22* | (2006.01) |
| *F02K 1/66* | (2006.01) |
| *F02K 1/76* | (2006.01) |
| *B64C 1/00* | (2006.01) |
| *F02C 3/113* | (2006.01) |

(52) U.S. Cl.
CPC ............ *B64D 27/12* (2013.01); *F01D 5/146* (2013.01); *F01D 5/187* (2013.01); *F01D 5/30* (2013.01); *F01D 5/3007* (2013.01); *F01D 7/00* (2013.01); *F01D 9/041* (2013.01); *F01D 15/10* (2013.01); *F01D 15/12* (2013.01); *F01D 17/162* (2013.01); *F01D 25/12* (2013.01); *F02C 6/206* (2013.01); *F02C 7/264* (2013.01); *F02C 7/32* (2013.01); *F02C 7/36* (2013.01); *F02C 9/00* (2013.01); *F02C 9/22* (2013.01); *F02K 1/66* (2013.01); *F02K 1/76* (2013.01); *B32B 2307/558* (2013.01); *B32B 2307/72* (2013.01); *B32B 2307/732* (2013.01); *B32B 2571/02* (2013.01); *B32B 2605/18* (2013.01); *B64C 2001/0072* (2013.01); *F02C 3/113* (2013.01); *F05D 2220/323* (2013.01); *F05D 2220/325* (2013.01); *F05D 2230/60* (2013.01); *F05D 2240/12* (2013.01); *F05D 2240/24* (2013.01); *F05D 2240/60* (2013.01); *F05D 2250/37* (2013.01); *F05D 2260/201* (2013.01); *F05D 2260/30* (2013.01); *F05D 2260/4031* (2013.01); *F05D 2260/70* (2013.01); *F05D 2270/05* (2013.01); *F05D 2270/051* (2013.01); *F05D 2270/121* (2013.01); *F05D 2270/304* (2013.01); *F05D 2270/71* (2013.01); *F05D 2270/81* (2013.01)

(58) Field of Classification Search
CPC ...... F02C 9/28; F02C 9/00; F02C 9/20; F02C 9/16; F02K 3/00; F02K 3/06; F05D 2220/324; F05D 2220/235; B64D 2027/005
See application file for complete search history.

(56) References Cited

U.S. PATENT DOCUMENTS

| | | | |
|---|---|---|---|
| 4,534,526 A | 8/1985 | Metzger et al. | |
| 4,917,336 A | 4/1990 | Jacobs et al. | |
| 4,934,825 A | 6/1990 | Martin | |
| 4,958,289 A * | 9/1990 | Sum ............... | B64C 11/305 |
| | | | 701/99 |
| 4,976,102 A | 12/1990 | Taylor | |
| 5,148,402 A | 9/1992 | Magliozzi et al. | |
| 5,156,353 A | 10/1992 | Gliebe et al. | |
| 5,190,441 A | 3/1993 | Murphy et al. | |
| 5,197,855 A | 3/1993 | Magliozzi et al. | |
| 5,789,678 A | 8/1998 | Pla | |
| 6,341,747 B1 | 1/2002 | Schmidt et al. | |
| 7,578,132 B2 | 8/2009 | Webster | |
| 8,011,613 B2 | 9/2011 | Belleville | |
| 8,083,482 B2 | 12/2011 | Serven et al. | |
| 8,087,607 B2 | 1/2012 | Moore et al. | |
| 8,186,617 B2 | 5/2012 | Llamas Sandin | |
| 8,196,860 B2 | 6/2012 | Gall et al. | |
| 8,210,798 B2 | 7/2012 | Stern | |
| 8,220,586 B2 | 7/2012 | Todorovic | |
| 8,240,609 B2 | 8/2012 | Parazzoli et al. | |
| 8,350,398 B2 | 1/2013 | Butt | |
| 8,550,397 B2 | 10/2013 | Verde Preckler et al. | |
| 8,689,538 B2 * | 4/2014 | Sankrithi ............... | B64D 27/12 |
| | | | 60/226.1 |
| 8,690,106 B1 | 4/2014 | Reissig | |
| 8,967,967 B2 | 3/2015 | Stretton et al. | |
| 9,057,329 B2 | 6/2015 | Weir et al. | |
| 9,102,397 B2 | 8/2015 | Wood | |
| 9,527,578 B2 | 12/2016 | Towkan | |
| 9,540,094 B2 | 1/2017 | Negulescu et al. | |
| 9,725,155 B2 | 8/2017 | Miller et al. | |
| 9,745,051 B2 | 8/2017 | Tantot et al. | |
| 9,758,254 B2 | 9/2017 | Moore et al. | |
| 9,759,160 B2 * | 9/2017 | Sankrithi .................. | F01D 7/00 |
| 9,771,878 B2 * | 9/2017 | Lu ........... | B64C 11/00 |
| 9,856,745 B2 | 1/2018 | Ali | |
| 9,890,657 B2 | 2/2018 | Ali | |
| 9,932,120 B2 * | 4/2018 | Fisher .................... | B64D 31/06 |
| 10,118,710 B2 | 11/2018 | Derrez et al. | |
| 10,131,441 B2 | 11/2018 | Edwards et al. | |
| 10,202,865 B2 | 2/2019 | Breeze-Stringfellow et al. | |
| 10,370,086 B2 | 8/2019 | Vion et al. | |
| 10,378,452 B1 | 8/2019 | Barmichev et al. | |
| 10,399,664 B2 | 9/2019 | Bowden et al. | |
| 10,414,486 B2 | 9/2019 | Wood et al. | |
| 10,414,497 B2 | 9/2019 | Velez De Mendizabal Alonso et al. | |
| 10,669,881 B2 | 6/2020 | Breeze-Stringfellow et al. | |
| 10,961,921 B2 * | 3/2021 | Tang .................... | B64C 11/301 |
| 2008/0245925 A1 | 10/2008 | Udall | |
| 2011/0056183 A1 * | 3/2011 | Sankrithi .................. | F02K 3/06 |
| | | | 60/226.1 |
| 2011/0219741 A1 * | 9/2011 | Ernst ......................... | F02K 3/06 |
| | | | 60/39.15 |
| 2012/0195739 A1 | 8/2012 | Kingan | |
| 2013/0115083 A1 | 5/2013 | Vuillemin | |
| 2014/0223884 A1 * | 8/2014 | Sankrithi .................. | F01D 7/00 |
| | | | 60/204 |
| 2014/0248116 A1 | 9/2014 | Ali | |
| 2015/0291276 A1 | 10/2015 | Zatorski et al. | |
| 2015/0344127 A1 | 12/2015 | Wood et al. | |
| 2015/0367950 A1 * | 12/2015 | Rajashekara .......... | B64D 31/06 |
| | | | 903/930 |
| 2016/0010487 A1 | 1/2016 | Breeze-Stringfellow et al. | |
| 2016/0040550 A1 * | 2/2016 | Do ........................ | F04D 27/002 |
| | | | 415/13 |
| 2016/0333729 A1 | 11/2016 | Miller et al. | |
| 2016/0333734 A1 | 11/2016 | Bowden et al. | |
| 2016/0368592 A1 | 12/2016 | Szymandera | |
| 2017/0002688 A1 | 1/2017 | Beutin et al. | |
| 2017/0107914 A1 * | 4/2017 | Lu ............................ | F02K 3/04 |
| 2017/0159571 A1 | 6/2017 | Sidelkovskiy | |
| 2017/0225773 A1 | 8/2017 | Wood et al. | |
| 2017/0267329 A1 * | 9/2017 | Lassalle .................... | F01D 7/00 |
| 2018/0065727 A1 | 3/2018 | Gruber et al. | |
| 2018/0079492 A1 | 3/2018 | Seidel et al. | |
| 2018/0127084 A1 | 5/2018 | Tajan et al. | |
| 2018/0319491 A1 * | 11/2018 | Kearney-Fischer ........................ | G10K 11/17813 |
| 2018/0354634 A1 | 12/2018 | Jodet et al. | |
| 2020/0088112 A1 * | 3/2020 | Tang ..................... | B64C 11/301 |

(56) References Cited

U.S. PATENT DOCUMENTS

2020/0165983 A1* 5/2020 Chahal .................... F02C 9/58
2020/0165984 A1* 5/2020 Chahal ................. B64C 11/305

OTHER PUBLICATIONS

Gazzaniga et al., Wind Tunnel Performance Results of Swirl Recovery Vanes as Tested with an Advanced High-Speed Propeller, AIAA-92-3770, 28th Joint Propulsion Conference Exhibit, Nashville TN, Jul. 6-8, 1992, 42 Pages.
Open Rotor Engine and Installation, European Aviation Safety Agency, Notice of Proposed Amendment 2015-22, RMT.0384 (MDM. 092) Dec. 21, 2015., 96 Pages.

* cited by examiner

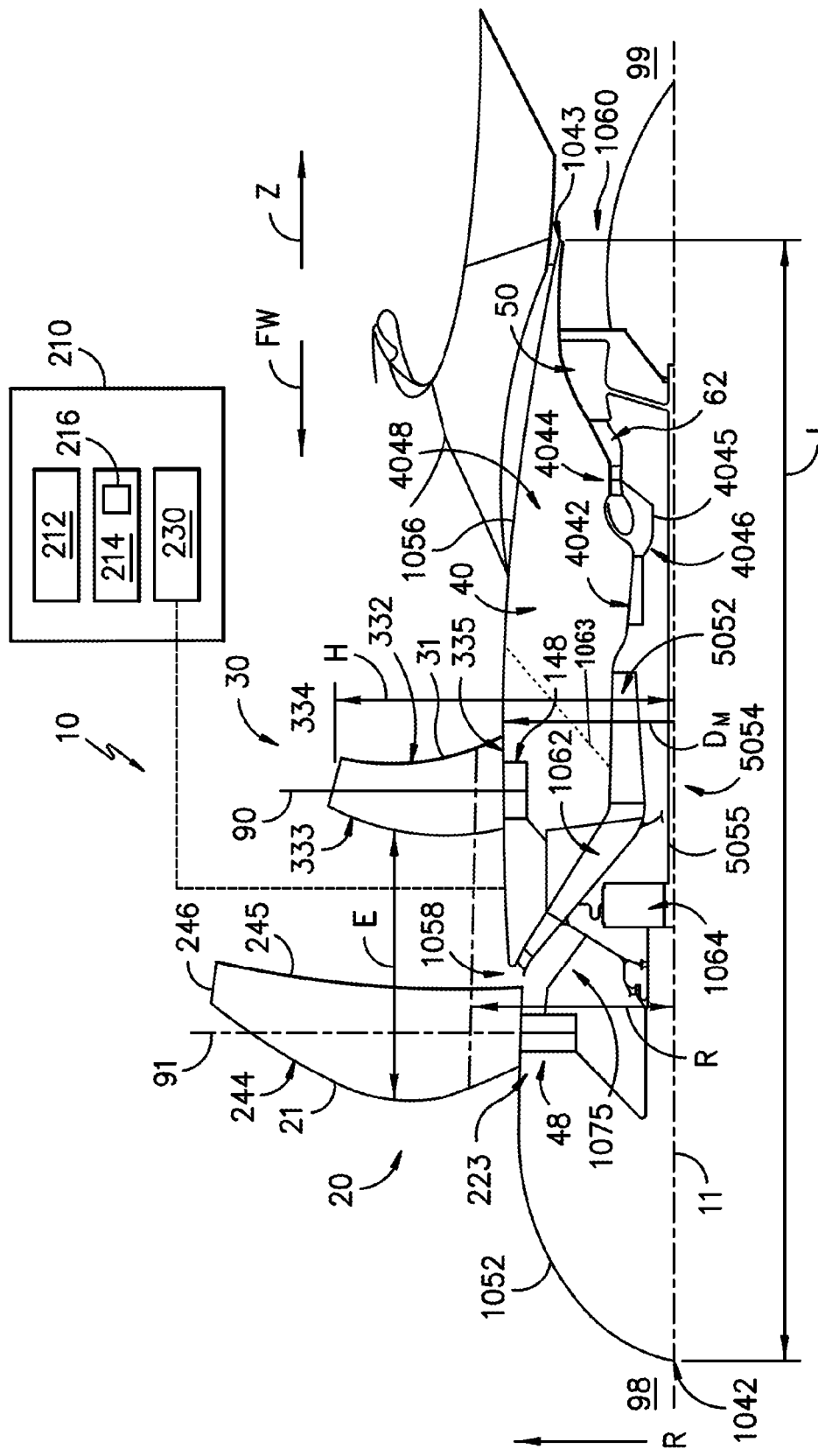
FIG. -1-

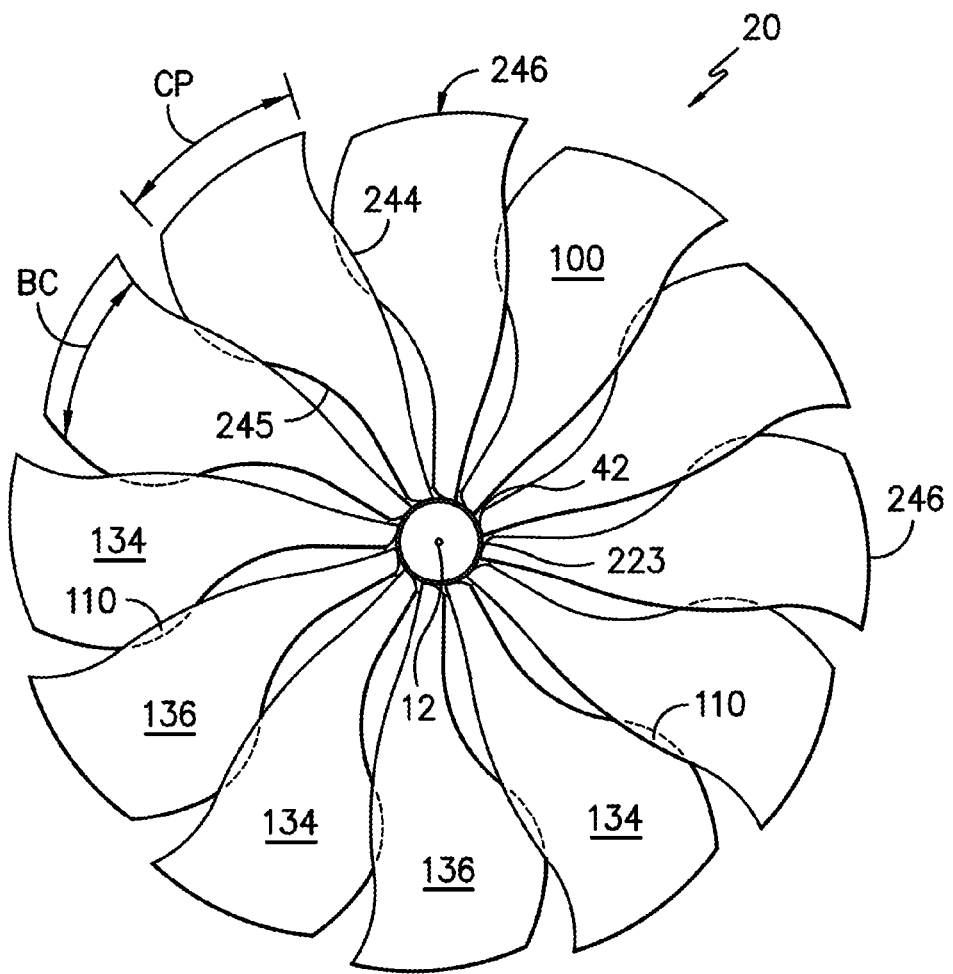
FIG. -2-

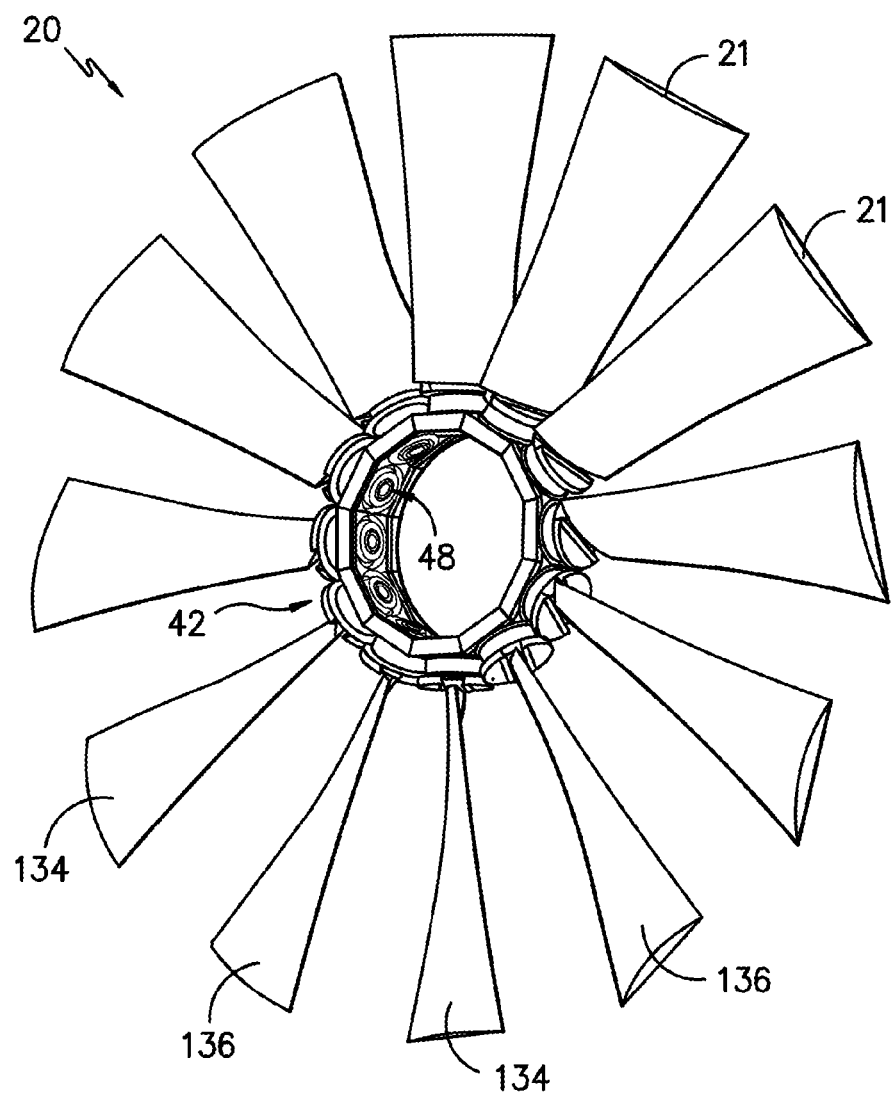
FIG. -3-

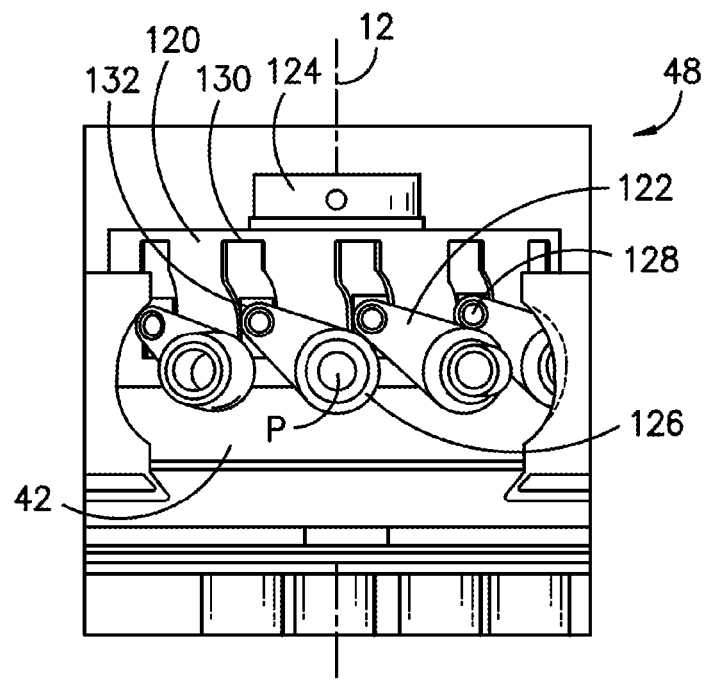
FIG. -4-
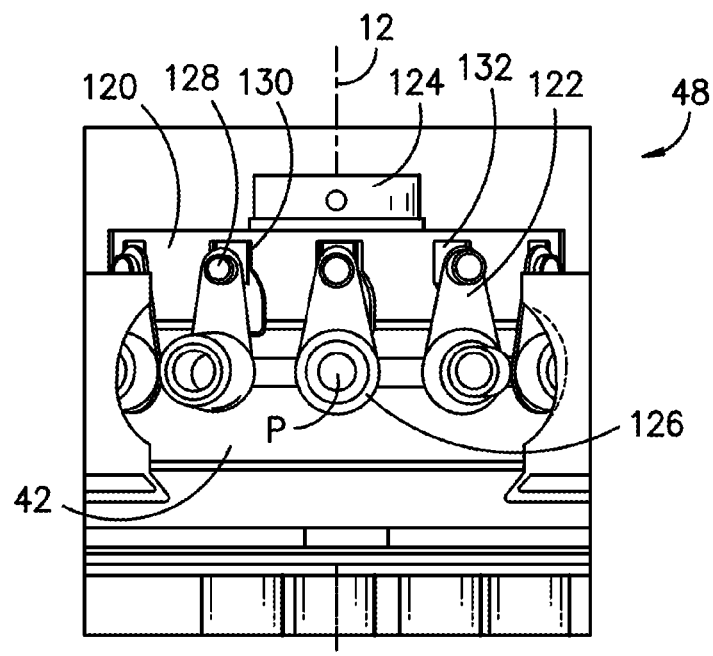
FIG. -5-

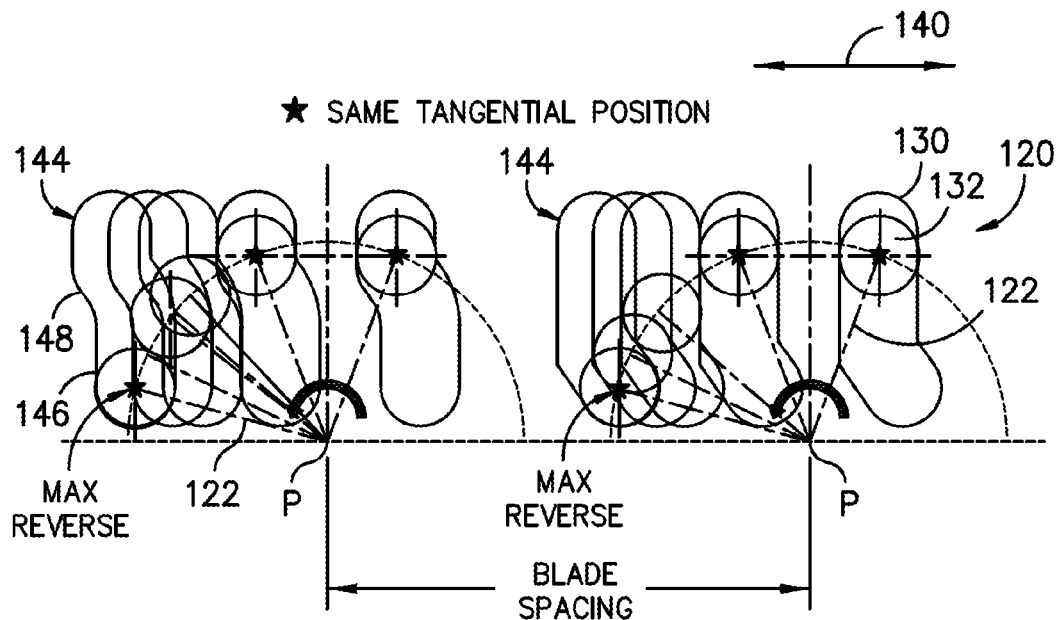
FIG. -6-
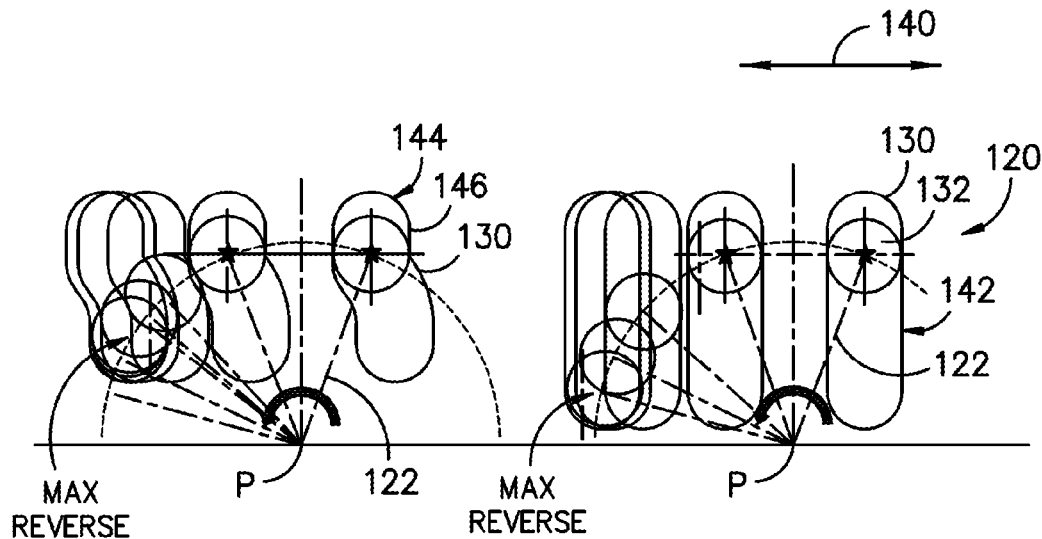
FIG. -7-

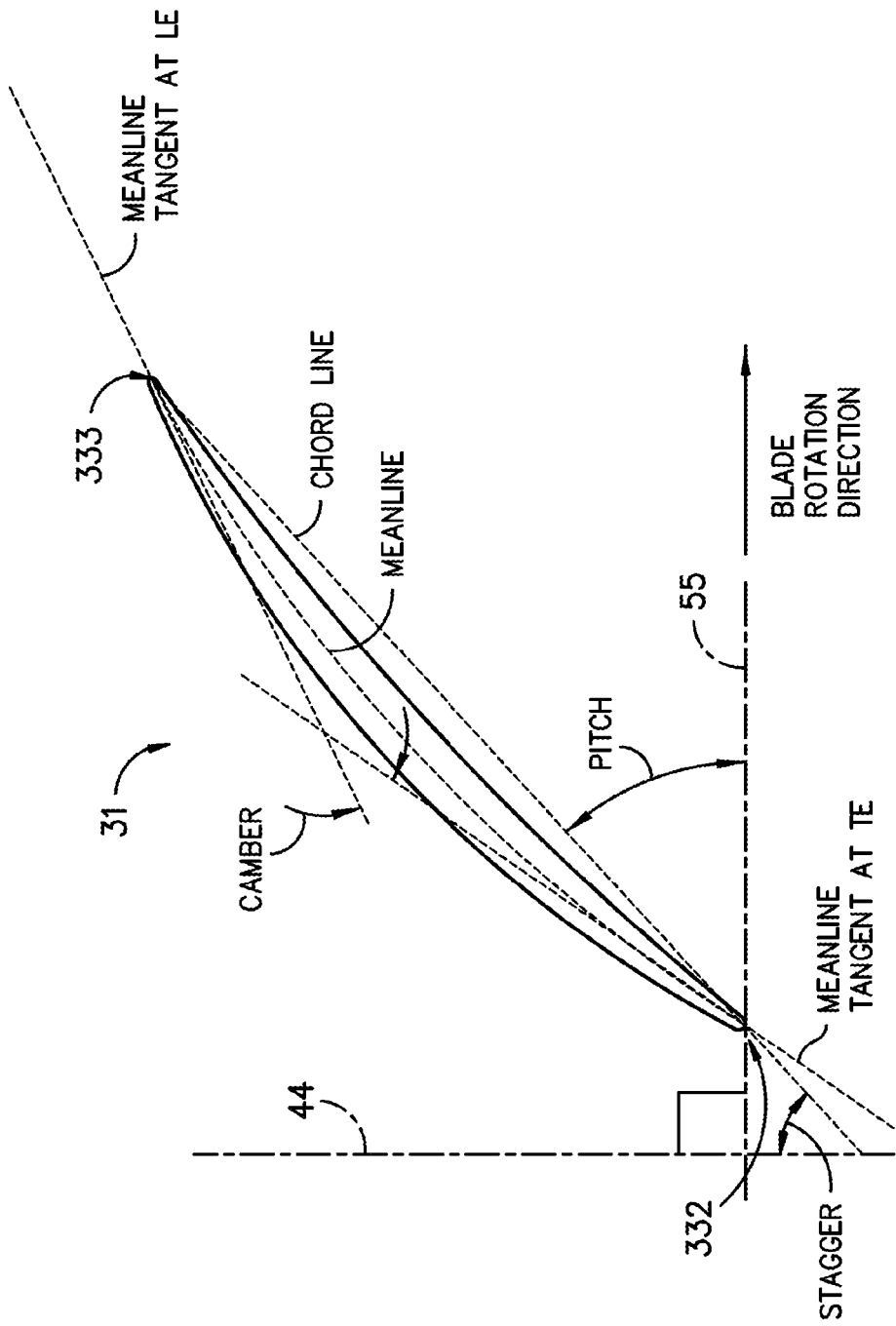

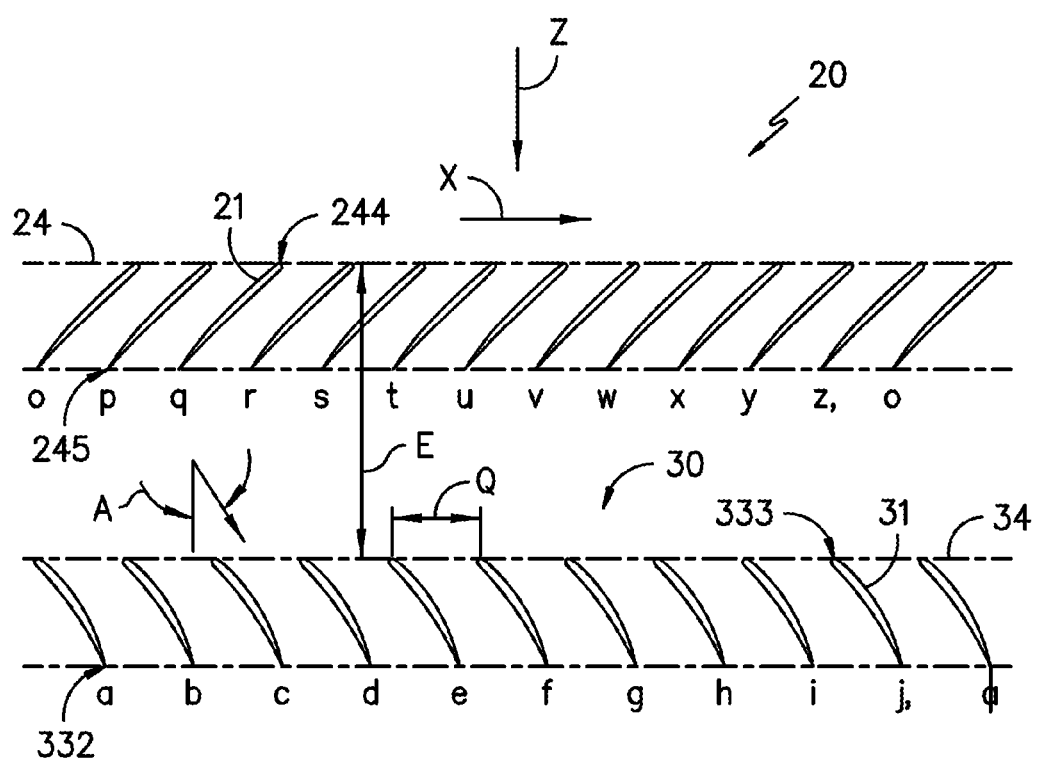
FIG. -9-

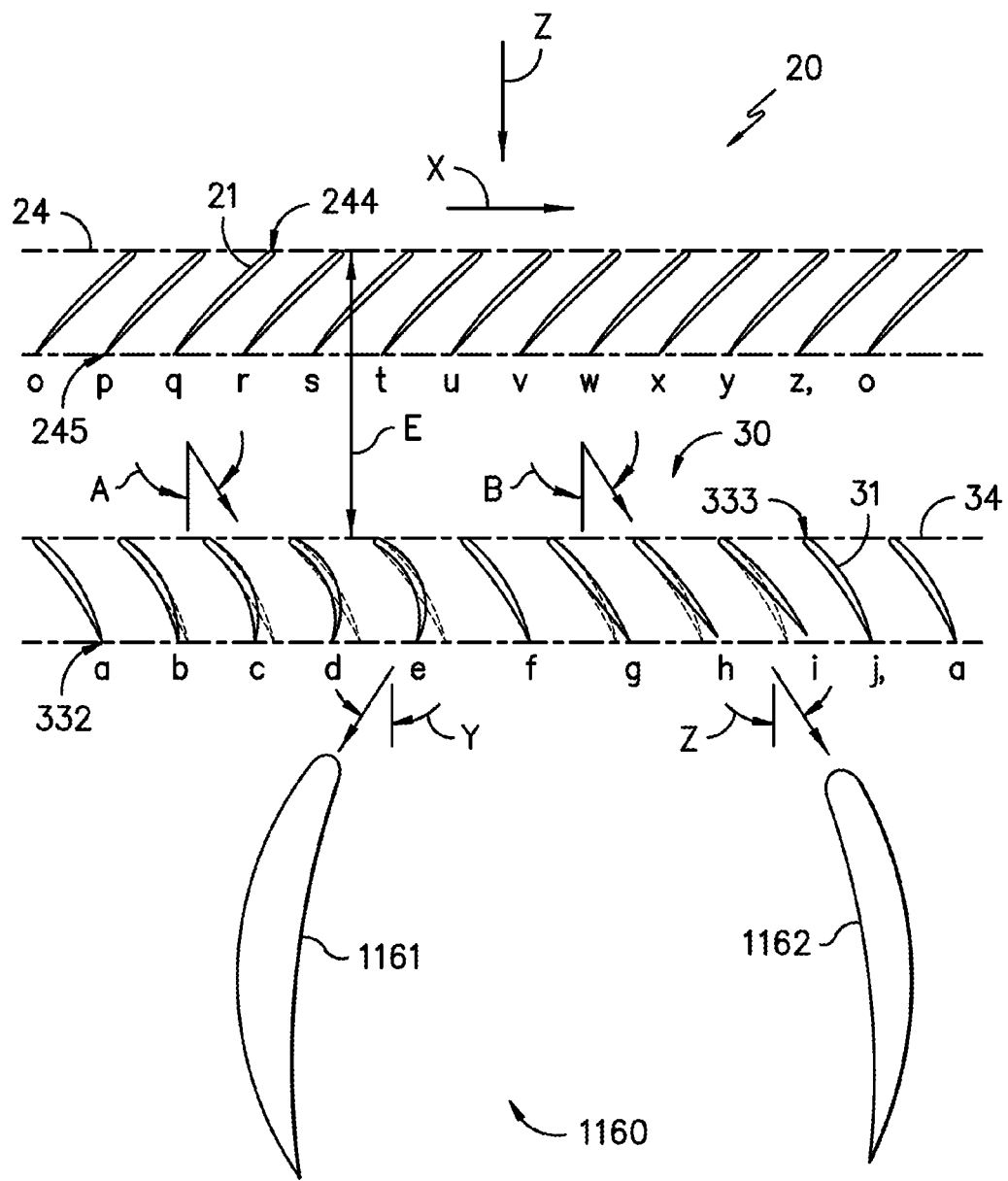
FIG. -10-

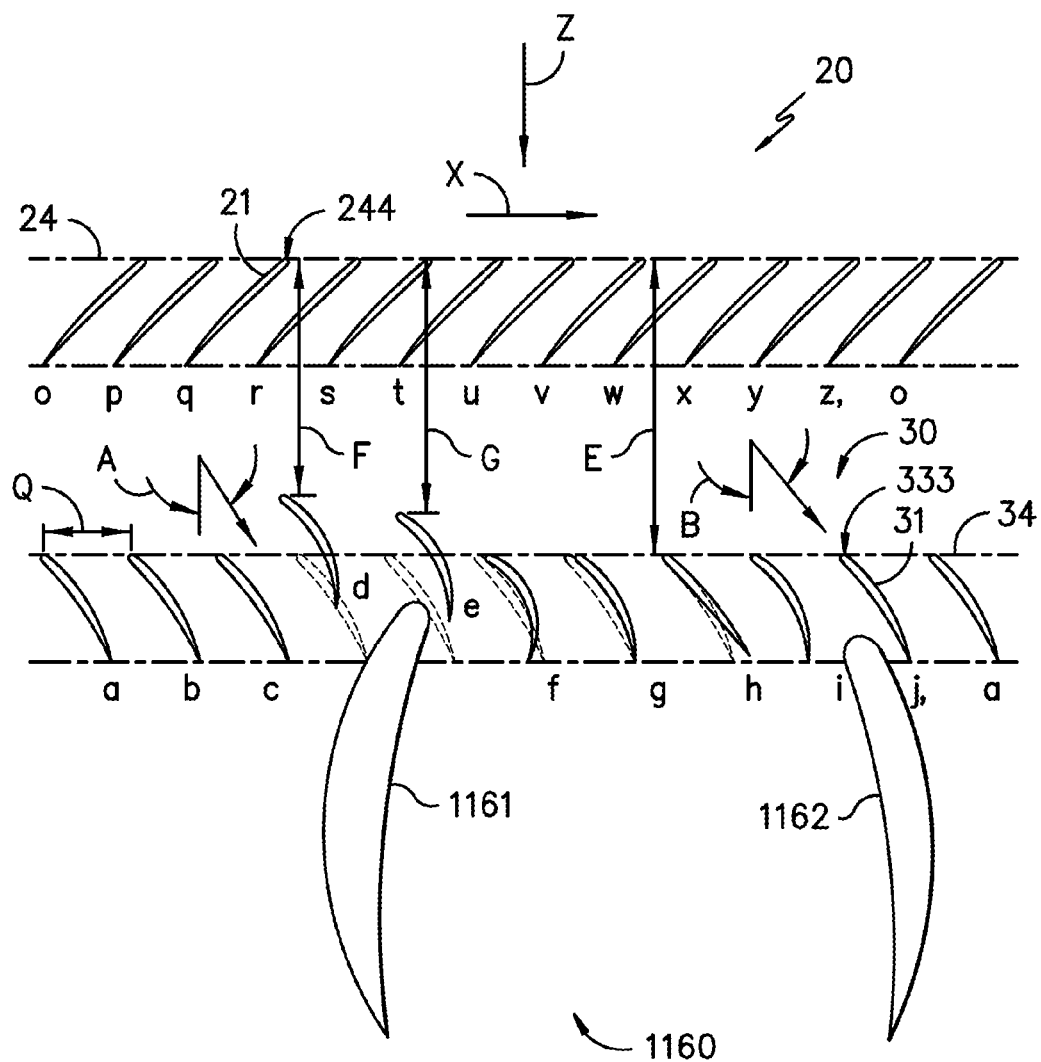
FIG. -11-

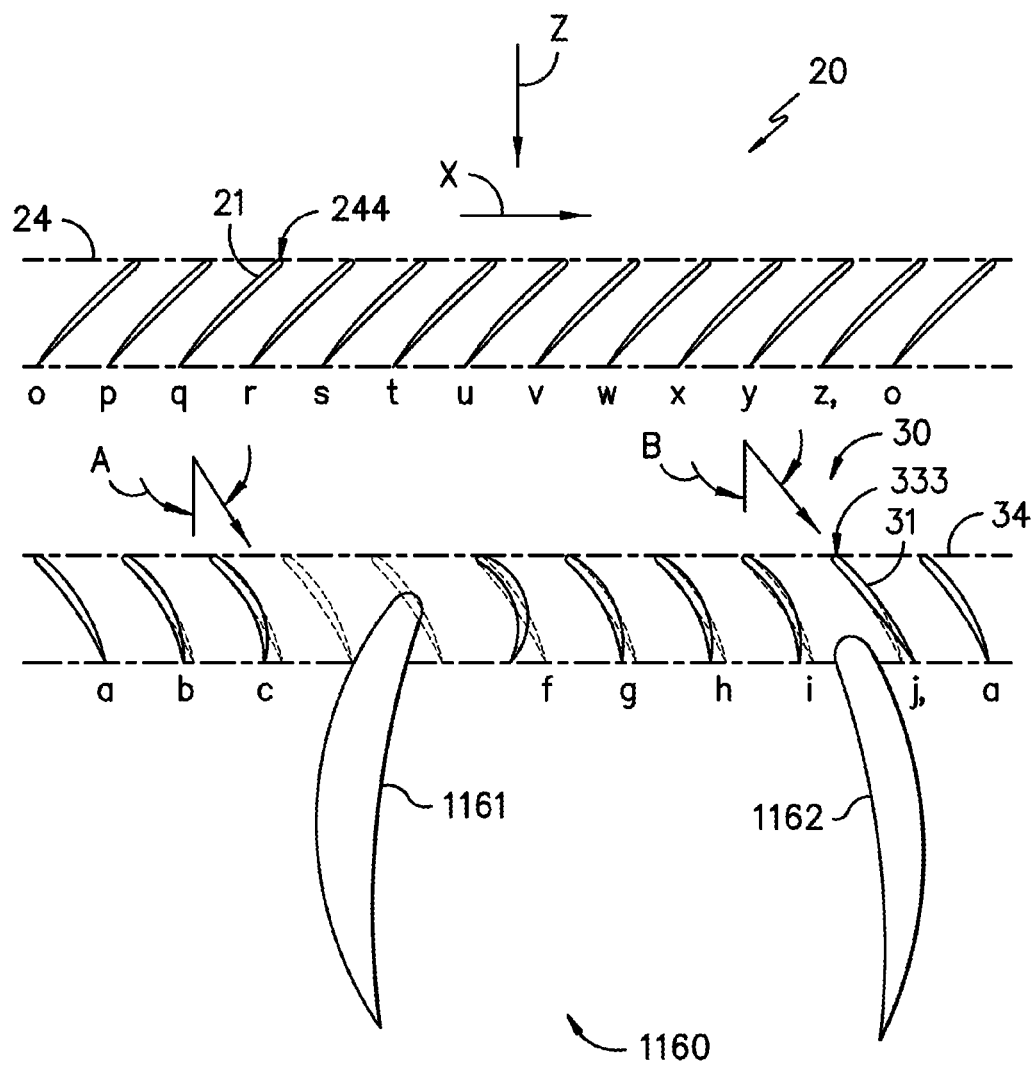
FIG. -12-

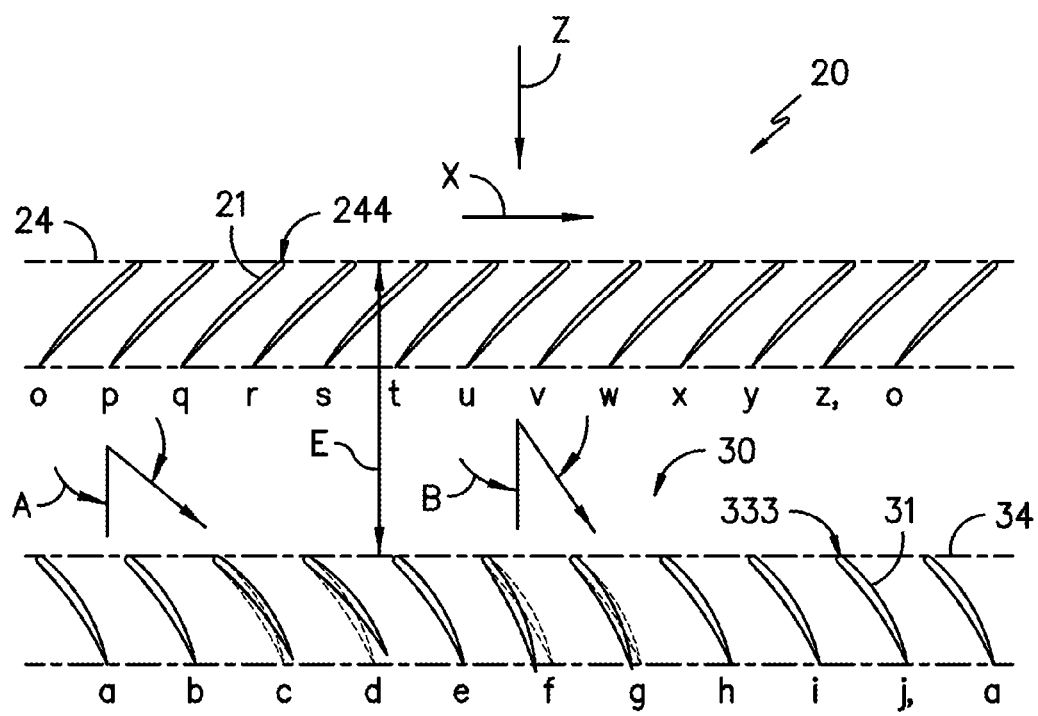
FIG. -13-

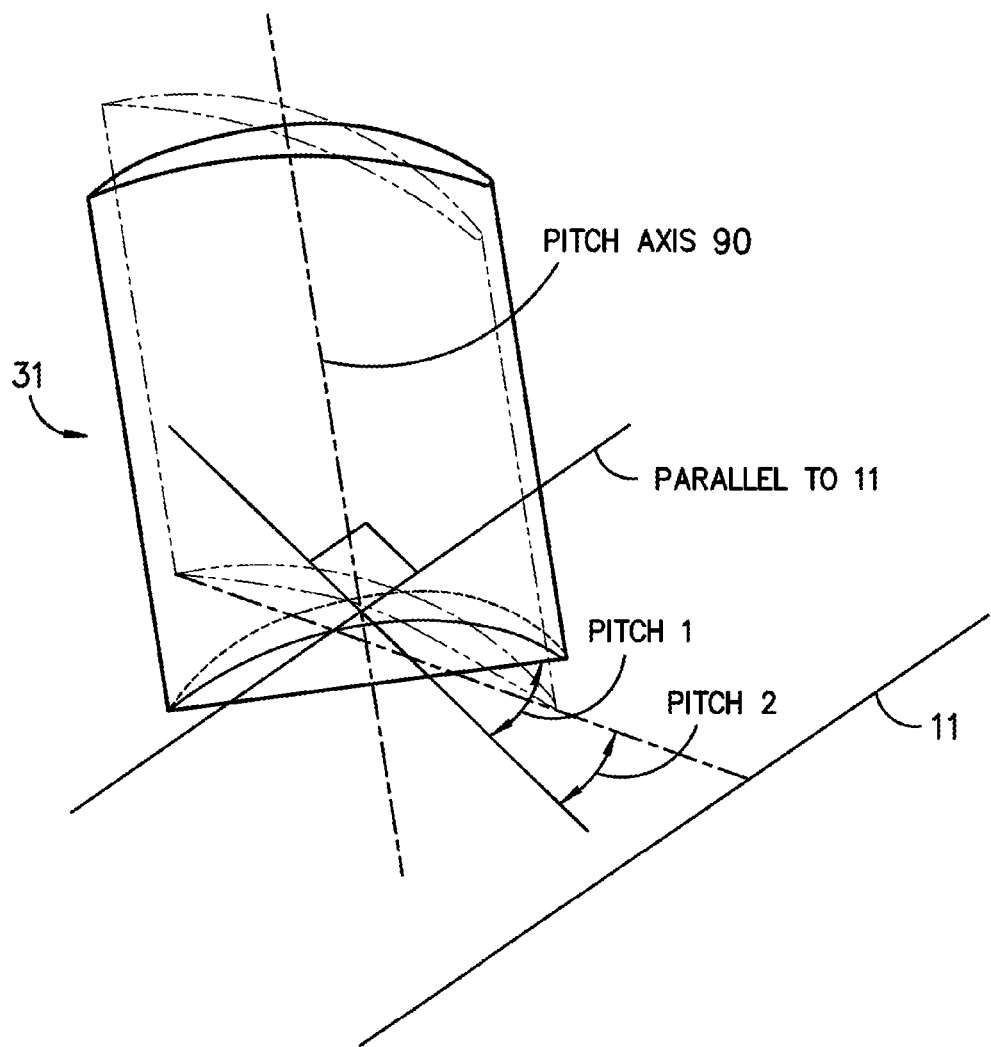
FIG. -14-

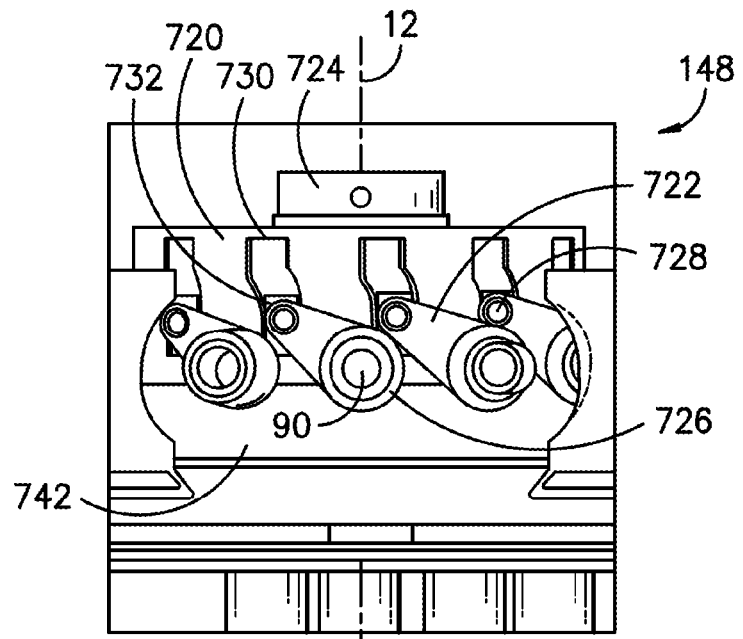
FIG. -15-
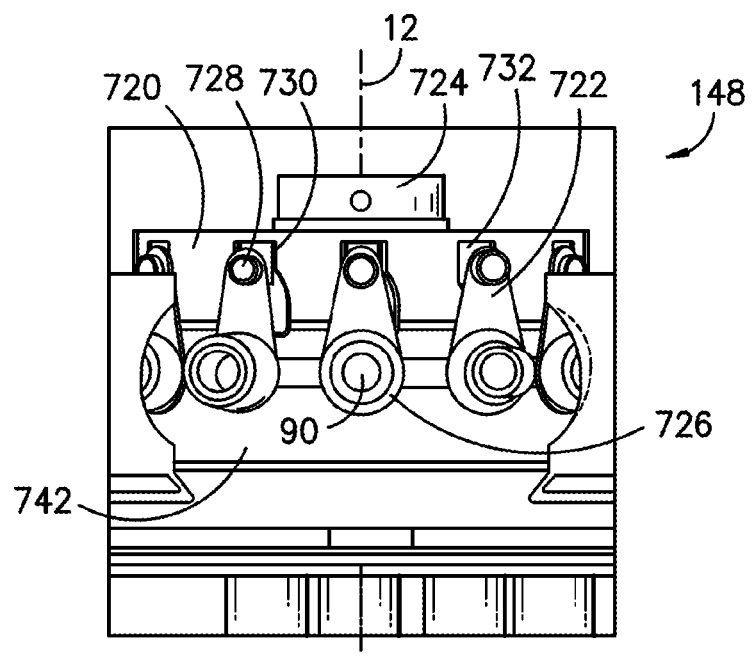
FIG. -16-

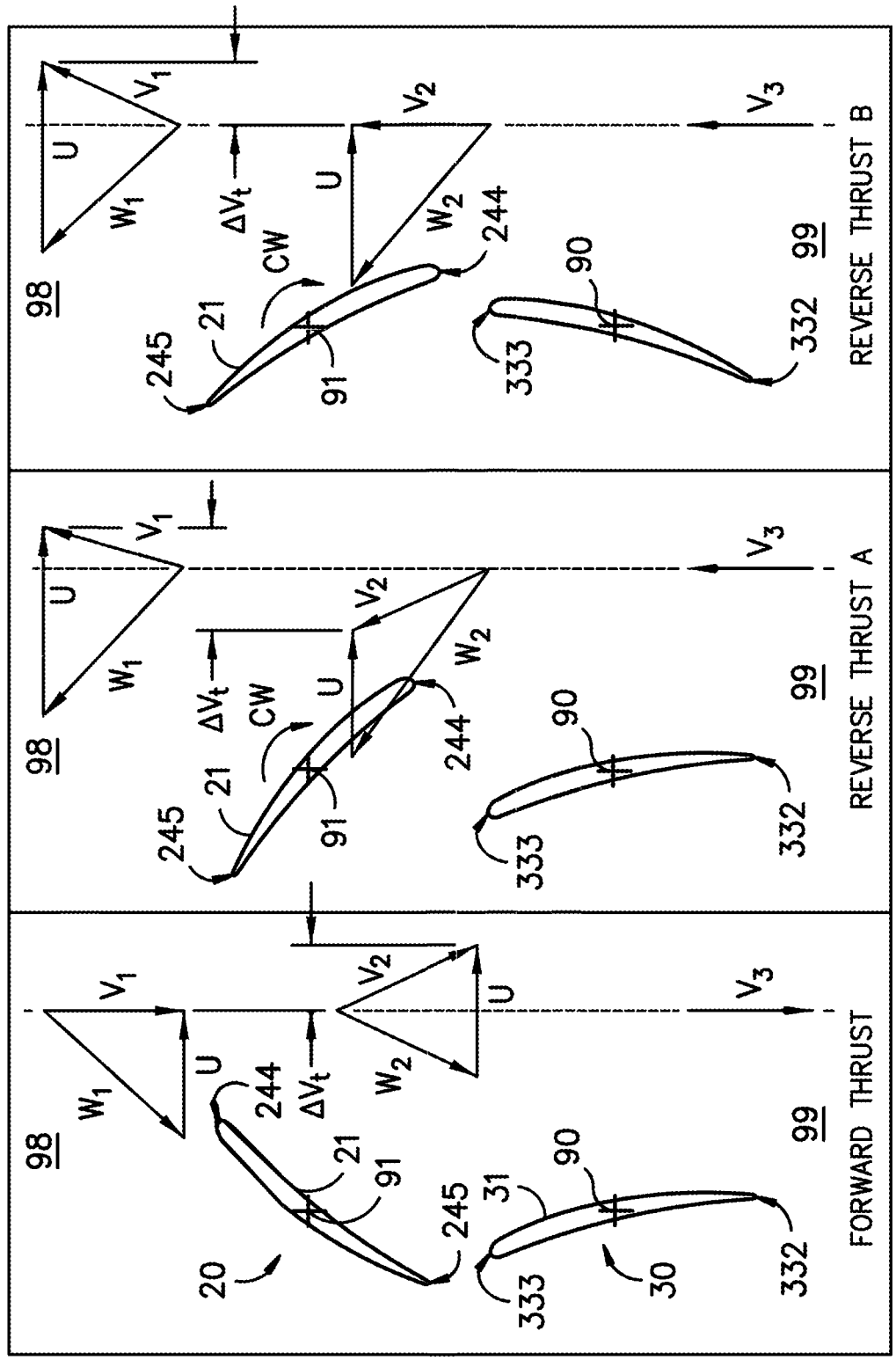

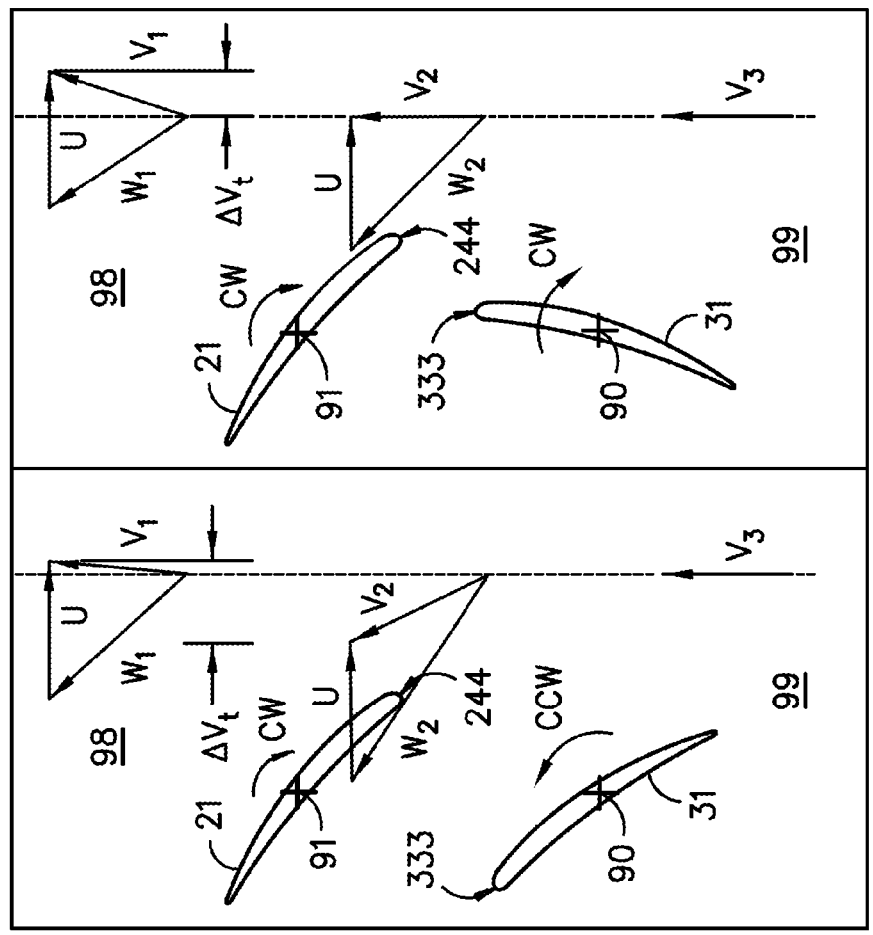

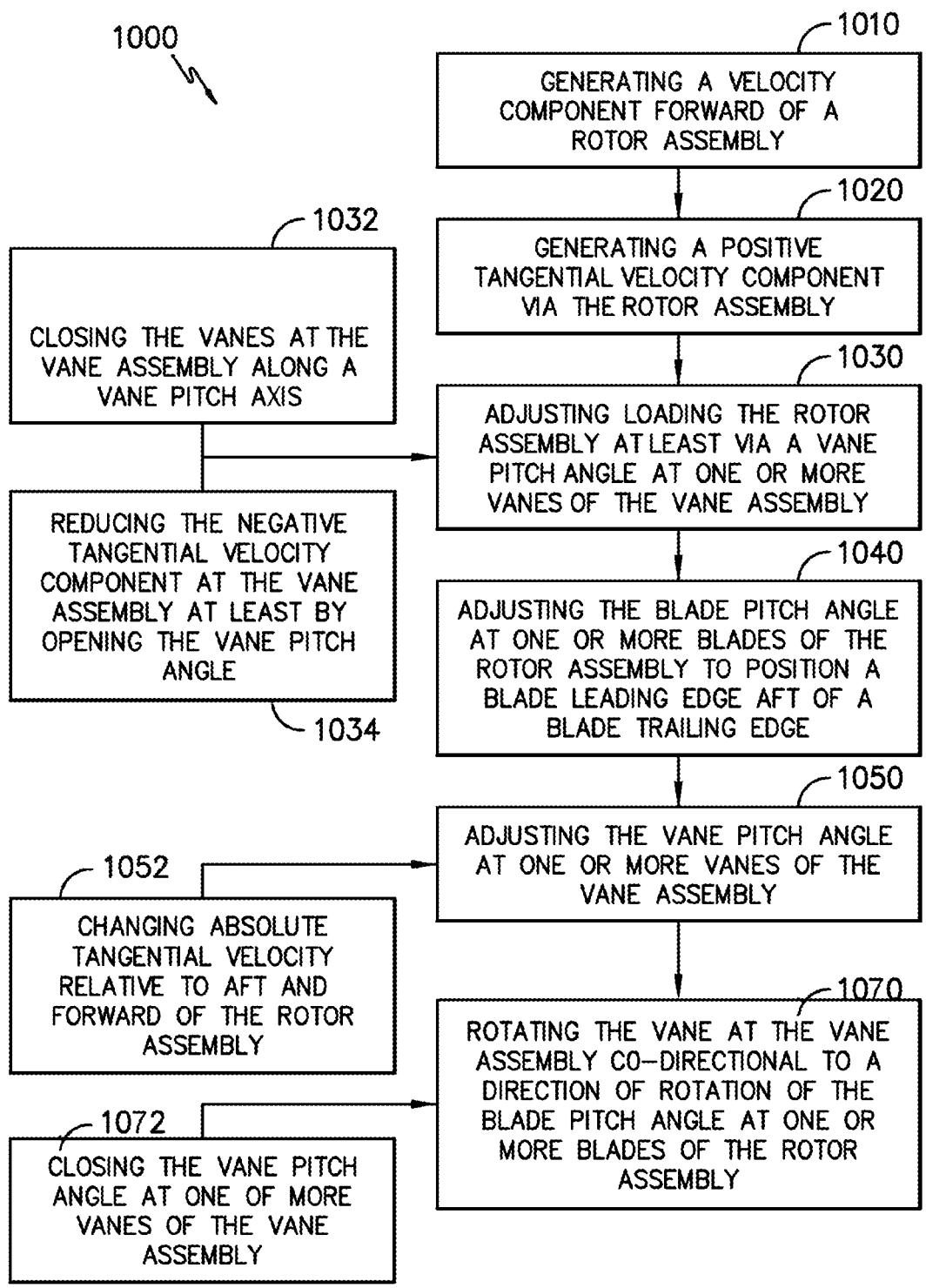
FIG. -22-

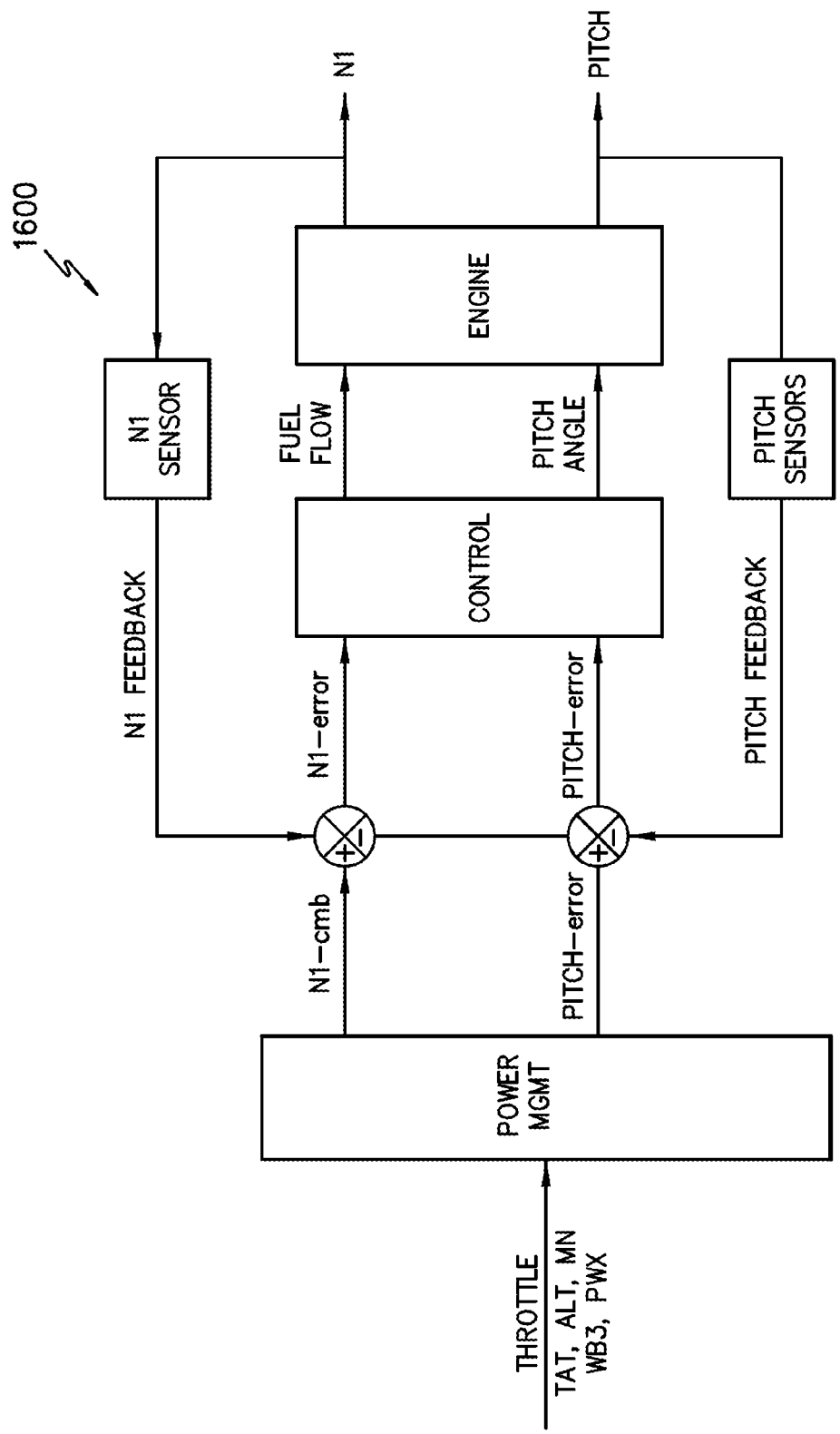
FIG. -23-

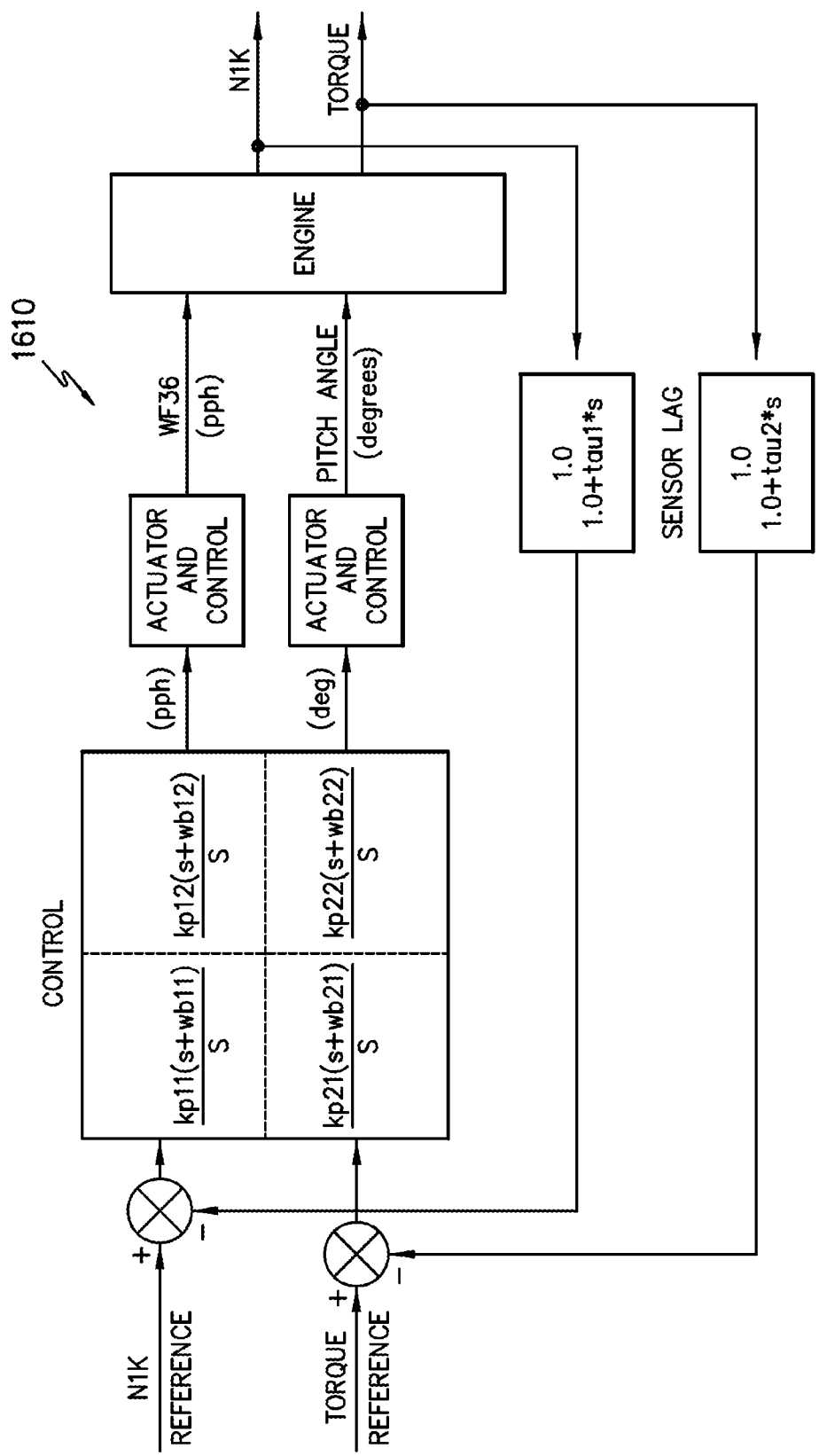
FIG. -24-

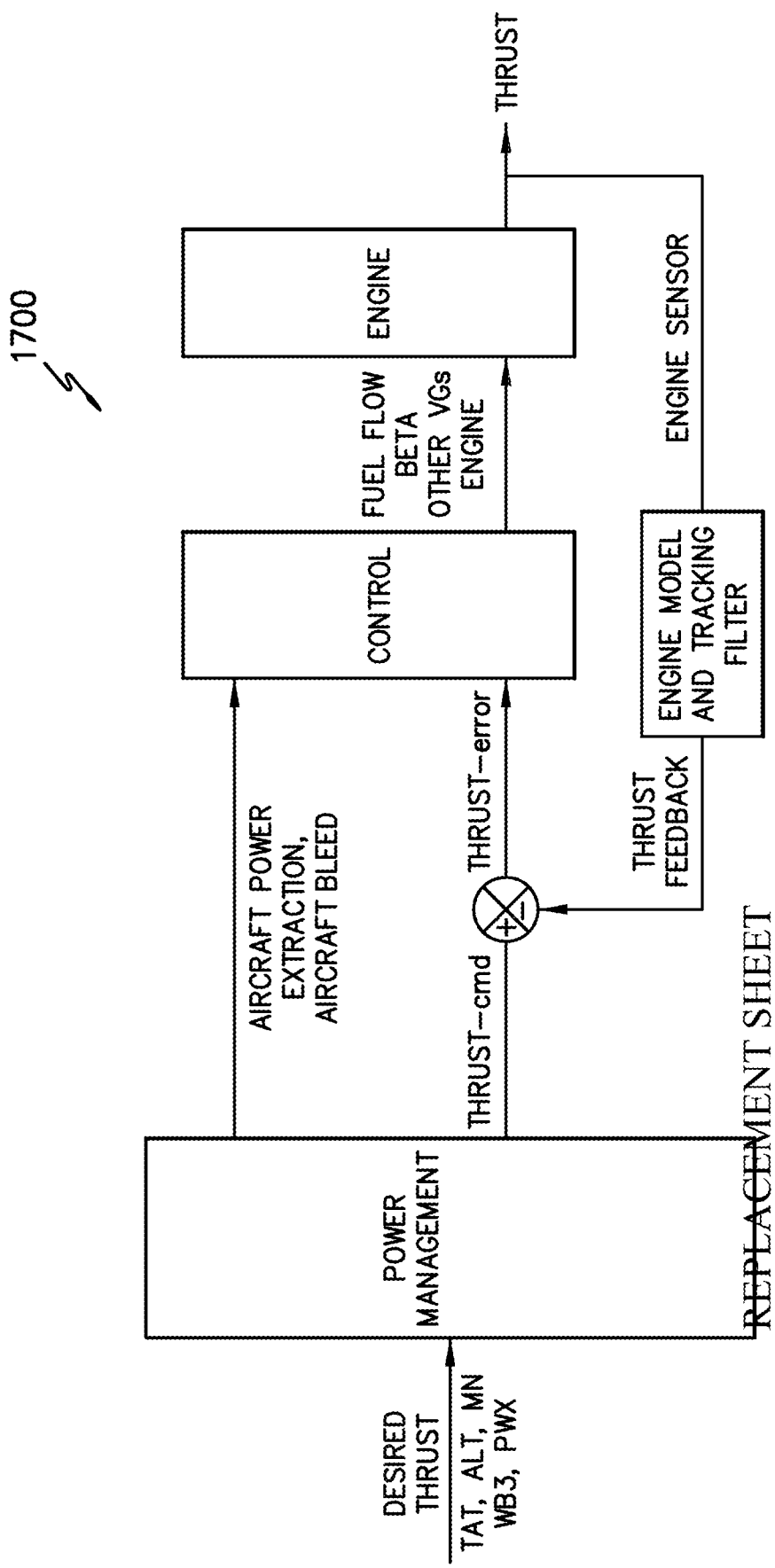
FIG. -25-

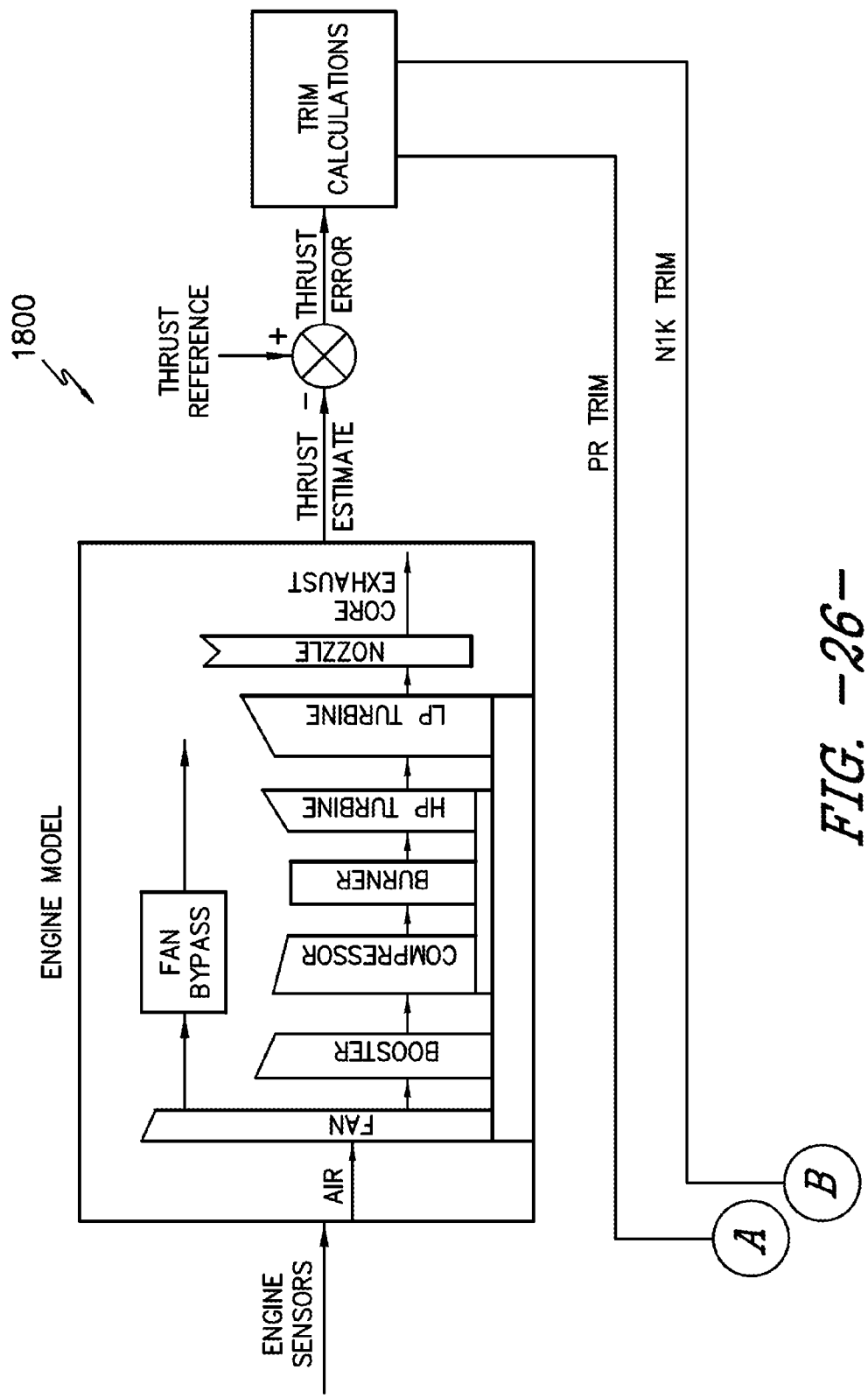
FIG. -26-

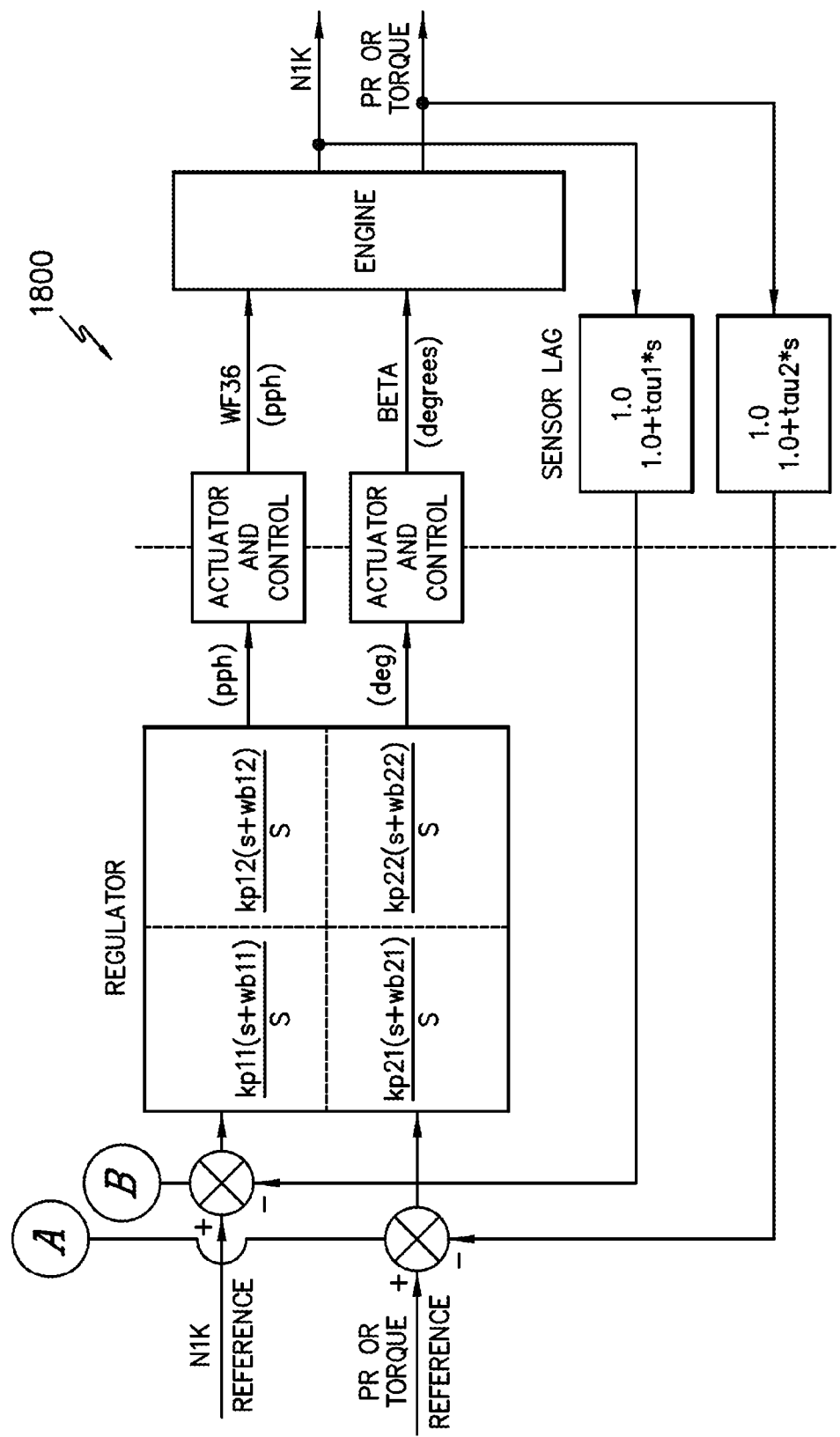
FIG. -27-

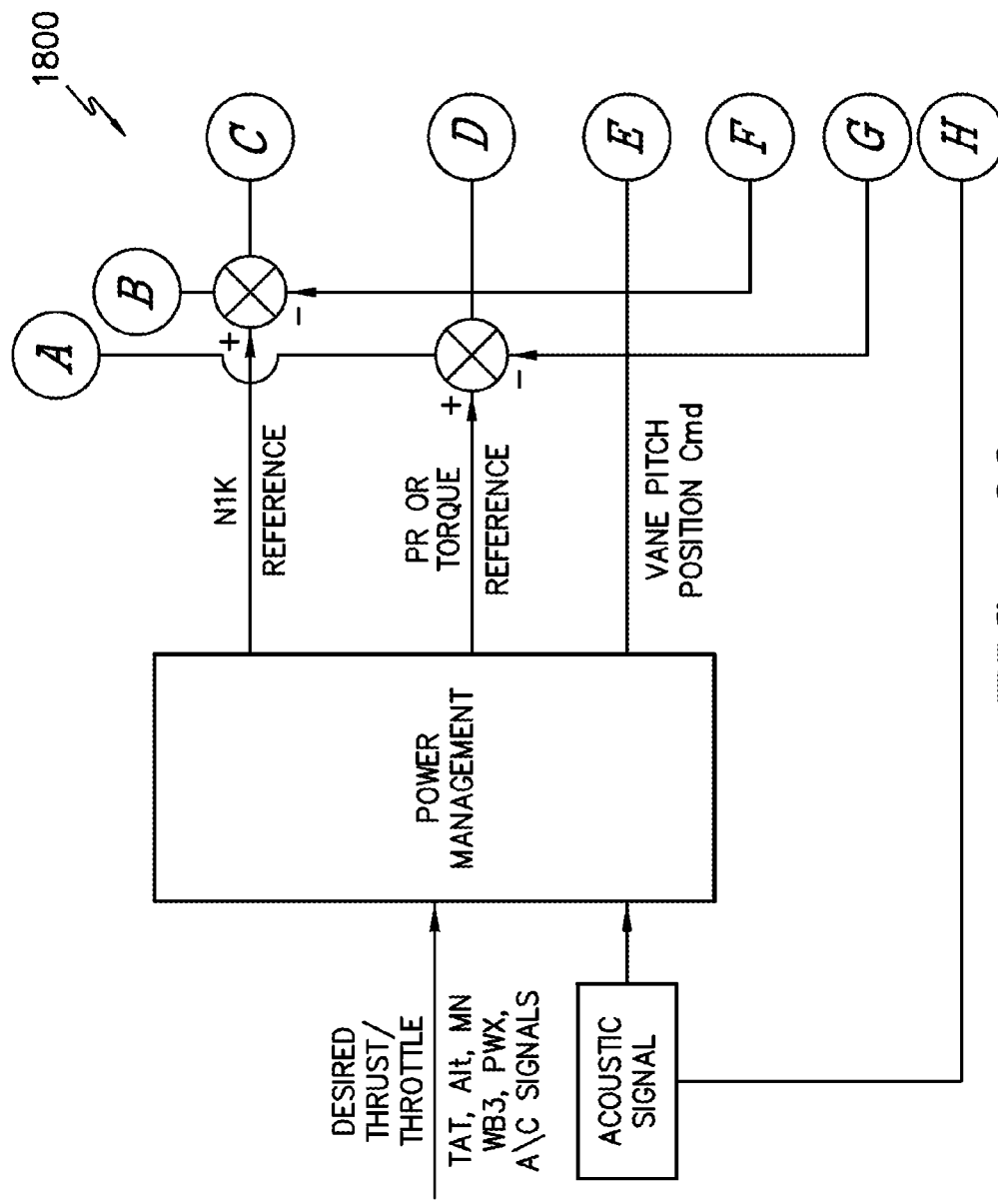
FIG. -28-

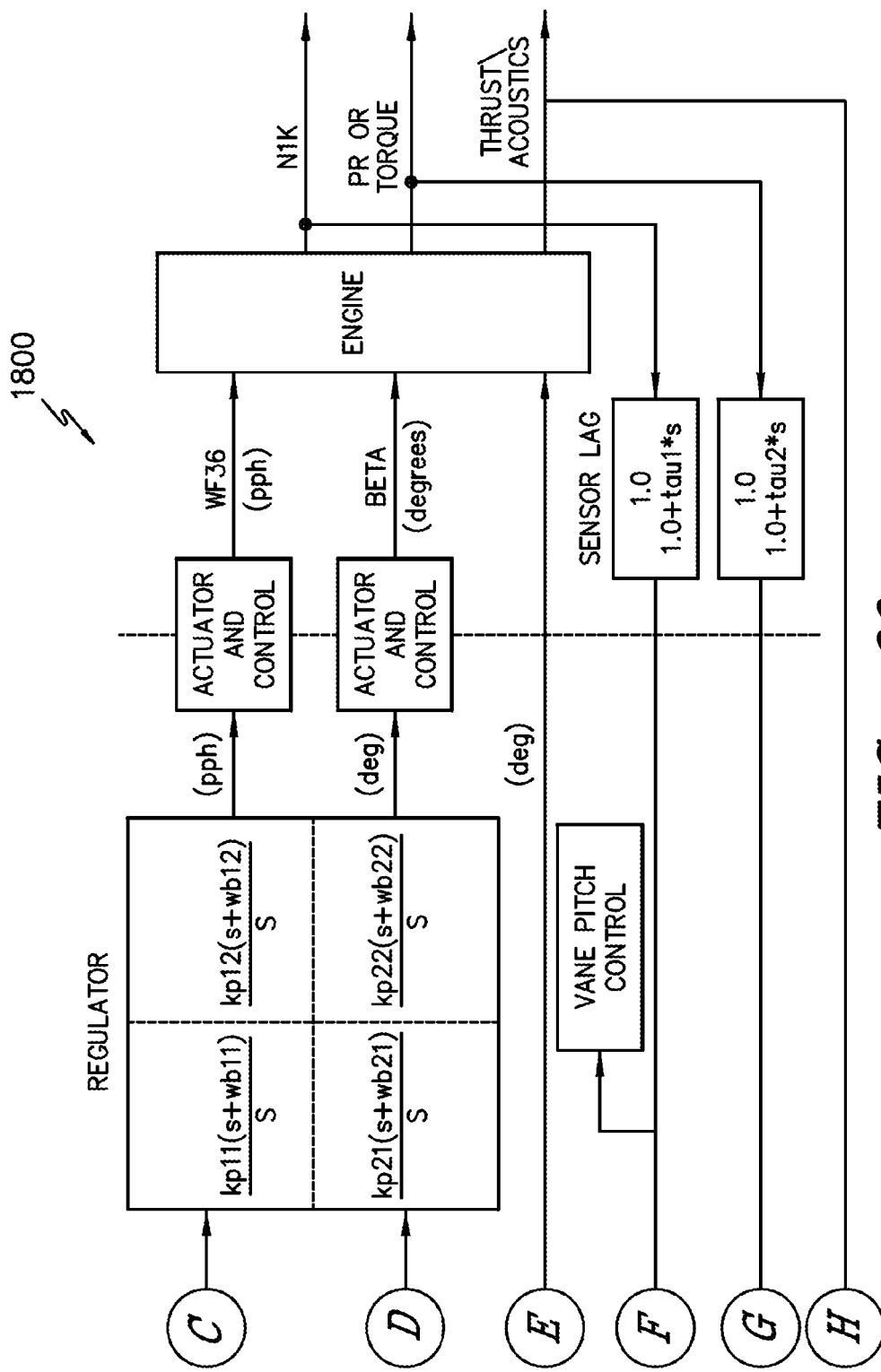
FIG. -29-

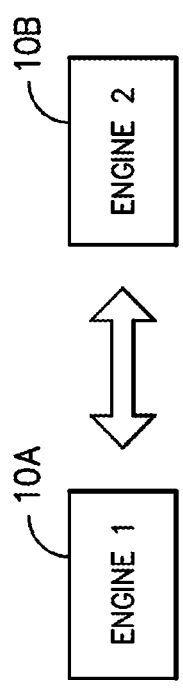
FIG. -30-
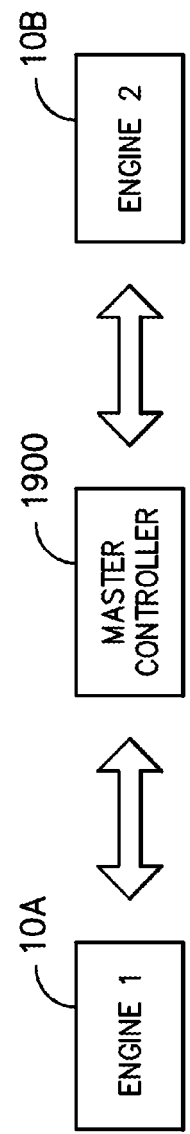
FIG. -31-

SYSTEM AND METHOD FOR CONTROL FOR UNDUCTED ENGINE

CROSS-REFERENCE TO RELATED APPLICATIONS

This application is a non-provisional application claiming the benefit of priority under 35 U.S.C. § 119(e) to U.S. Provisional Application No. 62/915,364, filed Oct. 15, 2019, which is hereby incorporated by reference in its entirety.

FIELD

This application is generally directed to a turbomachine engine, including architectures for such an engine and methods for operating for such an engine.

BACKGROUND

A turbofan engine operates on the principle that a central gas turbine core drives a bypass fan, the bypass fan being located at a radial location between a nacelle of the engine and the engine core. With such a configuration, the engine is generally limited in a permissible size of the bypass fan, as increasing a size of the fan correspondingly increases a size and weight of the nacelle.

An open rotor engine, by contrast, operates on the principle of having the bypass fan located outside of the engine nacelle. This permits the use of larger rotor blades able to act upon a larger volume of air than for a traditional turbofan engine, potentially improving propulsive efficiency over conventional turbofan engine designs.

Engines with an open rotor design having a fan provided by two contra-rotating rotor assemblies have been studied. Each rotor assembly carries an array of airfoil blades located outside the engine nacelle. As used herein, "contra-rotational relationship" means that the blades of the first and second rotor assemblies are arranged to rotate in opposing directions to each other. Typically, the blades of the first and second rotor assemblies are arranged to rotate about a common axis in opposing directions, and are axially spaced apart along that axis. For example, the respective blades of the first rotor assembly and second rotor assembly may be co-axially mounted and spaced apart, with the blades of the first rotor assembly configured to rotate clockwise about the axis and the blades of the second rotor assembly configured to rotate counter-clockwise about the axis (or vice versa). Contra-rotating rotor assemblies however present technical challenges in transmitting power from the power turbine to drive the blades of the rotor assemblies rotating in opposing directions.

BRIEF DESCRIPTION

Aspects and advantages of the invention will be set forth in part in the following description, or may be obvious from the description, or may be learned through practice of the invention.

A computing system for an unducted rotor engine with a variable pitch vane assembly in aerodynamic relationship with an unducted rotor assembly is provided. The computing system includes a sensor-based controller configured to execute a first set of operations. The first set of operations includes obtaining a first signal corresponding to a commanded low spool speed; obtaining a second signal indicative of a pitch angle corresponding to thrust output from the unducted rotor assembly and variable pitch vane assembly; generating a pitch feedback signal corresponding to a commanded adjustment to the pitch angle based at least on one or both of a variable blade pitch angle or a variable vane pitch angle. The computing system further includes a model-based controller configured to execute a second set of operations. The second set of operations include obtaining a desired thrust output via a throttle input; determining, at least via a power management block, a commanded thrust output signal; receiving the commanded thrust output signal; and generating an output signal corresponding to one or more of a commanded fuel flow to a combustion section, a variable blade pitch angle, a variable vane pitch angle, or a rotor plane angle.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a cross-sectional side view of an embodiment of a propulsion system according to an aspect of the present disclosure;

FIG. 2 is a flowpath view of an exemplary embodiment of a rotor assembly of the propulsion system of FIG. 1;

FIG. 3 is a perspective view of an exemplary embodiment of the rotor assembly of FIG. 2;

FIGS. 4-5 are top-down views of a portion of an exemplary embodiment of a variable blade pitch rotor assembly for a propulsion system according to an aspect of the present disclosure;

FIGS. 6-7 are schematic depictions of modes of operation for the exemplary embodiments of the variable blade pitch rotor assembly of FIGS. 4-5;

FIG. 8 is an exemplary embodiment of a vane of a vane assembly of the propulsion system of FIG. 1;

FIGS. 9-13 are roll-out views of embodiments of the vane assembly of the propulsion system of FIG. 1;

FIG. 14 is an exemplary embodiment of positions of an articulatable vane of the propulsion system of FIG. 1;

FIGS. 15-16 are top-down views of a portion of an exemplary embodiment of a variable vane pitch assembly for a propulsion system according to aspects of the present disclosure;

FIGS. 17-21 are top-down schematic views depicting operations of an exemplary embodiment of a blade and a vane of the propulsion system of FIG. 1;

FIG. 22 is a flowchart outlining steps of a method for adjusting thrust vector for an unducted rotor engine;

FIGS. 23-29 are schematic depictions of embodiments of computing systems configured to operate one or more propulsion systems according to aspects of the present disclosure; and FIGS. 30-31 are schematic depictions of embodiments of engine arrangements and computing systems according to embodiments depicted in FIGS. 23-29.

Repeat use of reference characters in the present specification and drawings is intended to represent the same or analogous features or elements of the present invention.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The word "exemplary" is used herein to mean "serving as an example, instance, or illustration." Any implementation described herein as "exemplary" is not necessarily to be construed as preferred or advantageous over other implementations.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin, unless otherwise specified.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

References to "noise", "noise level", or "perceived noise", or variations thereof, are understood to include perceived noise levels, effective perceived noise levels EPNL, instantaneous perceived noise levels PNL(k), or tone-corrected perceived noise levels PNLT(k), or one or more duration correction factors, tone correction factors, or other applicable factors, as defined by the Federal Aviation Administration (FAA), the European Union Aviation Safety Agency (EASA), the International Civil Aviation Organization (ICAO), Swiss Federal Office of Civil Aviation (FOCA), or committees thereof, or other equivalent regulatory or governing bodies. Where certain ranges of noise levels (e.g., in decibels, or dB) are provided herein, it will be appreciated that one skilled in the art will understand methods for measuring and ascertaining of such levels without ambiguity or undue experimentation. Methods for measuring and ascertaining one or more noise levels as provided herein by one skilled in the art, with reasonable certainty and without undue experimentation, include, but are not limited to, understanding of measurement systems, frames of reference (including, but not limited to, distances, positions, angles, etc.) between the engine and/or aircraft relative to the measurement system or other perceiving body, or atmospheric conditions (including, but not limited to, temperature, humidity, dew point, wind velocity and vector, and points of reference for measurement thereof), as may be defined by the FAA, EASA, ICAO, FOCA, or other regulatory or governing body.

As used herein, the terms "processor" and "computer," and related terms, e.g., "processing device," "computing device," and "controller", are not limited to just those integrated circuits referred to in the art as a computer, but further broadly refers to one or more processing devices including one or more of a microcontroller, a microcomputer, a programmable logic controller (PLC), an application specific integrated circuit, and other programmable circuits, and these terms are used interchangeably herein. In the embodiments described herein, the computer or controller may additionally include memory. The memory may include, but is not limited to, a computer-readable medium, such as a random access memory (RAM), a computer-readable non-volatile medium, such as a flash memory. Alternatively, a floppy disk, a compact disc-read only memory (CD-ROM), a magneto-optical disk (MOD), and/or a digital versatile disc (DVD) may also be used. Also, in the embodiments described herein, the computer or controller may include one or more input channels and/or one or more output channels. The input channels may be, but are not limited to, computer peripherals associated with an operator interface such as a mouse and a keyboard, or sensors, such as engine sensors associated with an engine, such as a gas turbine engine, for determining operating parameters of the engine. Furthermore, in the exemplary embodiment, the output channels may include, but are not be limited to, an operator interface monitor, or the output channels may be linked to various components to control such components based, e.g., on data reviewed from the input channels and/or data or instructions stored in the memory. For example, the memory may store software or other instructions, which when executed by the controller or processor allow the controller to perform certain operations or functions, such as one or more of the operations or functions for which the controller is configured and/or one or more of the methods described herein. The term "software" may include any computer program stored in memory, or accessible by the memory, for execution by, e.g., the controller, processor, clients, and servers.

Referring to FIG. 1, in general, embodiments of an engine 10 variously depicted and described herein include a computing system 210 configured to include one or more controllers 1600, 1610, 1700, 1800 depicted and described herein, and/or configured to execute steps of a method or other operations provided herein. The computing system 210 can correspond to any suitable processor-based device, including one or more computing devices, such as described above. For instance, FIG. 1 illustrates one embodiment of suitable components that can be included within the computing system 210. As shown in FIG. 1, the computing system 210 can include a processor 212 and associated memory 214 configured to perform a variety of computer-implemented functions (e.g., performing the methods, steps, calculations and the like disclosed herein).

As shown, the computing system 210 can include control logic 216 stored in memory 214. The control logic 216 may include instructions that when executed by the one or more processors 212 cause the one or more processors 212 to perform operations, such as the method or operations described above, such as in regard to controllers 1600, 1610, 1700, 1800 depicted and described herein. Additionally, as shown in FIG. 1, the computing system 210 can also include a communications interface module 230. In several embodiments, the communications interface module 230 can include associated electronic circuitry that is used to send and receive data. As such, the communications interface module 230 of the computing system 210 can be used to send and/or receive data to/from engine 10 and the compressor section 21. In addition, the communications interface module 230 can also be used to communicate with any other suitable components of the engine 10, including any number of motors, actuators, linkages, vane or blade pitch change mechanisms, sensors, or other actuatable structures, such as one or more of those depicted and described herein.

It should be appreciated that the communications interface module 230 can be any combination of suitable wired and/or wireless communications interfaces and, thus, can be communicatively coupled to one or more components of the compressor section 21 or the engine 10 via a wired and/or wireless connection. As such, the computing system 210 may obtain, determine, store, generate, transmit, or operate any one or more steps of the operations such as described herein with regard to the engine 10 or an apparatus (e.g., aircraft or other vehicle) to which the engine 10 is attached.

Further, certain embodiments of the unducted single rotor turbomachine engine described hereinbelow may include an electric machine. An electric machine may generally include a stator and a rotor, the rotor rotatable relative to the stator. Additionally, the electric machine may be configured in any suitable manner for converting mechanical power to electrical power, or electrical power to mechanical power. For example, the electric machine may be configured as an asynchronous or induction electric machine operable to generate or utilize alternating current (AC) electric power. Alternatively, the electric machine may be configured as a synchronous electric machine operable to generate or utilize AC electric power or direct current (DC) electric power. In such a manner it will be appreciated that the stator, the rotor, or both may generally include one or more of a plurality of coils or winding arranged in any suitable number of phases, one or more permanent magnets, one or more electromagnets, etc.

It would be desirable to provide an open rotor propulsion system utilizing a single rotating rotor assembly analogous to a traditional turbofan engine bypass fan which reduces the complexity of the design, yet yields a level of propulsive efficiency comparable to contra-rotating propulsion designs with a significant weight and length reduction.

Embodiments of a single unducted rotor engine 10 are provided herein. Embodiments of the engine, propulsion system, or thrust-producing system provided herein may generate an increased unducted rotor efficiency at, and above a threshold power loading (i.e., power/area of rotor airfoil). In certain embodiments, the threshold power loading is 25 horsepower per $ft^2$ or greater at cruise altitude. In particular embodiments of the engine, structures and methods provided herein generate power loading between 25 horsepower/$ft^2$ and 100 horsepower/$ft^2$ at cruise altitude. Cruise altitude is generally an altitude at which an aircraft levels after climb and prior to descending to an approach flight phase. In various embodiments, the engine is applied to a vehicle with a cruise altitude up to approximately 65,000 ft. In certain embodiments, cruise altitude is between approximately 28,000 ft and approximately 45,000 ft. In still certain embodiments, cruise altitude is expressed in flight levels based on a standard air pressure at sea level, in which a cruise flight condition is between FL280 and FL650. In another embodiment, cruise flight condition is between FL280 and FL450. In still certain embodiments, cruise altitude is defined based at least on a barometric pressure, in which cruise altitude is between approximately 4.85 psia and approximately 0.82 psia based on a sea level pressure of approximately 14.70 psia and sea level temperature at approximately 59 degree Fahrenheit. In another embodiment, cruise altitude is between approximately 4.85 psia and approximately 2.14 psia. It should be appreciated that in certain embodiments, the ranges of cruise altitude defined by pressure may be adjusted based on a different reference sea level pressure and/or sea level temperature.

Various embodiments of the single unducted rotor engine include a vane assembly 30 in aerodynamic relationship with a bladed rotor assembly 20. Referring to FIG. 1, the vane assembly 30 is positioned aft (i.e., proximate to aft end 99) or generally downstream (relative to normal forward operation, schematically depicted by arrow FW) of a single unducted rotor assembly 20. The vane assembly 30 may generally define a de-swirler device configured to reduce or convert kinetic energy losses from unducted rotors into thrust output. In certain embodiments, the vane assembly 30 is configured to adjust vane pitch angle 90 based at least on output velocity vectors from the rotor assembly 20. The adjustable vane pitch angle is configured to output a desired thrust vector based on a desired engine operation (e.g., forward thrust, neutral or no thrust, or reverse thrust) and desired acoustic noise level. In still certain embodiments, the bladed rotor assembly 20 is configured to adjust blade pitch angle 91 based at least on a desired output velocity vector to the vane assembly 30, a desired engine operation, or a desired acoustic noise level. In still various embodiments, the rotor assembly 20 is configured to adjust rotor plane based on an angle of attack of incoming air to the rotor assembly, such as to adjust an output velocity vector to the vane assembly and reduce or eliminate undesired noise levels from the rotor assembly.

Certain embodiments of the single unducted rotor engine 10 provide noise reduction or attenuation based on dynamic blade pitch angle changes, vane pitch angle changes, and/or rotor plane angle changes relative to angle of attack of incoming air and output air velocity from the rotor assembly to an aft vane assembly. Additionally, or alternatively, embodiments of the engine 10 provided herein may attenuate low frequency noise, such as those that may propagate to the ground while an engine is at cruise altitude, or as may be referred to as "en-route noise." Various embodiments of the engine are configured to desirably alter rotor plane angle, blade pitch angle, and/or vane pitch angle to mitigate propagation of undesired noise to the ground and the fuselage. Additionally, the engine 10 may be configured to desirably deflect noise upward (e.g., skyward) rather than toward the ground. As such, perceived noise levels may be reduced or mitigated by one or more structures provided herein.

Referring now to the drawings, FIG. 1 shows an elevational cross-sectional view of an exemplary embodiment of a single unducted rotor engine 10. As is seen from FIG. 1, the engine 10 takes the form of an open rotor propulsion system and has a rotor assembly 20 which includes an array of airfoil blades 21 around a longitudinal axis 11 of engine 10. Blades 21 are arranged in typically equally spaced relation around the longitudinal axis 11, and each blade 21 has a root 223 and a tip 246 and a span defined therebetween.

Additionally, engine 10 includes a gas turbine engine having a core (or high speed system) 40 and a low speed system. The core engine 40 generally includes a high speed compressor 4042, a high speed turbine 4044, and a high speed shaft 4045 extending therebetween and connecting the high speed compressor 4042 and high speed turbine 4044. The high speed compressor 4042, the high speed turbine 4044, and the high speed shaft 4045 may collectively define and be referred to as a high speed spool 4046 of the engine. Further, a combustion section 4048 is located between the high speed compressor 4042 and high speed turbine 4044. The combustion section 4048 may include one or more configurations for receiving a mixture of fuel and air and providing a flow of combustion gasses through the high speed turbine for driving the high speed spool 4046.

The low speed system 50 similarly includes a low speed turbine 5050, a low speed compressor or booster, 5052, and a low speed shaft 5055 extending between and connecting the low speed compressor 5052 and low speed turbine 5050. The low speed compressor 5052, the low speed turbine 5050, and the low speed shaft 5055 may collectively define and be referred to as a low speed spool 5054 of the engine.

In various embodiments, the core engine 40 may include a third-stream flowpath 1063, such as to bypass flow from a core flowpath downstream of one or more compressors. The third-stream flowpath 1063 may generally define a concentric or non-concentric flowpath relative to the flowpath 1062 downstream of one or more compressors or fan stages. The third-stream flowpath 1063 is configured to selectively remove a portion of flow from the core flowpath 1062, such as via one or more variable guide vanes, nozzles, or other actuatable flow control structures. The third-stream flowpath 1063 may bypass the combustion section 4048. In certain embodiment, the third-stream flowpath 1063 furthermore bypasses all or part of the flowpath at the turbine section.

It should be appreciated that the terms "low" and "high", or their respective comparative degrees (e.g., -er, where applicable), when used with compressor, turbine, shaft, or spool components, each refer to relative speeds within an engine unless otherwise specified. For example, a "low turbine" or "low speed turbine" defines a component configured to operate at a rotational speed, such as a maximum allowable rotational speed, lower than a "high turbine" or "high speed turbine" at the engine. Alternatively, unless otherwise specified, the aforementioned terms may be understood in their superlative degree. For example, a "low turbine" or "low speed turbine" may refer to the lowest maximum rotational speed turbine within a turbine section, a "low compressor" or "low speed compressor" may refer to the lowest maximum rotational speed turbine within a compressor section, a "high turbine" or "high speed turbine" may refer to the highest maximum rotational speed turbine within the turbine section, and a "high compressor" or "high speed compressor" may refer to the highest maximum rotational speed compressor within the compressor section. Similarly, the low speed spool refers to a lower maximum rotational speed than the high speed spool. It should further be appreciated that the terms "low" or "high" in such aforementioned regards may additionally, or alternatively, be understood as relative to minimum allowable speeds, or minimum or maximum allowable speeds relative to normal, desired, steady state, etc. operation of the engine.

Although the engine 10 is depicted with the low speed compressor 5052 positioned forward (i.e., proximate to a forward end 98) of the high speed compressor 4042, in certain embodiments the compressors 4042, 5052 may be in interdigitated arrangement, i.e., rotary airfoils of the low speed compressor 5052 are in alternating arrangement along the gas flowpath with rotary airfoils of the high speed compressor 4042. Additionally, or alternatively, although the engine 10 is depicted with the high speed turbine 4044 positioned forward of the low speed turbine 5050, in certain embodiments the turbines 4044, 5050 may be in interdigitated arrangement. Although certain embodiments or descriptions of rotary elements provided herein may include "low pressure" or "high pressure", it should be appreciated that the rotary elements may additionally, or alternatively, refer to "low speed" or "high speed", respectively, such as based on interdigitated arrangements or otherwise provided above.

Referring to FIG. 1, the core engine 40 is generally encased in a cowl 1056 defining a maximum diameter $D_M$. The vane assembly 30 is extended from the cowl 1056 and positioned aft of the rotor assembly 20. In various embodiments, the maximum diameter is defined as a flowpath surface facing outward along the radial direction R in fluid communication with the flow of fluid egressed from the rotor assembly 20. In certain embodiments, the maximum diameter of the cowl 1056 corresponds substantially to a location or positioning of a root 335 of a vane 31 of the vane assembly 30 extended from the cowl 1056. The rotor assembly 20 further includes a hub 1052 extended forward of the plurality of blades 21.

In certain embodiments, the engine 10 defines a length L from a forward end 1042 of the hub 1052 to an aft end 1043 of the cowl 1056. However, it should be appreciated that the length L may correspond to an aft end of a rearward facing or pusher-configuration hub 1052 and rotor assembly 20. In still certain embodiments, the engine 10 defines the length L from an aft end 1043 of the cowl 1056, in which the aft end 1043 is positioned at an egress end or exhaust 1060 of the core engine 40. In various embodiments, the length L may exclude a dimension of an exhaust nozzle or cap positioned radially inward of a turbomachinery flowpath 1062. In various embodiments, the engine 10 includes a ratio of length (L) to maximum diameter ($D_M$) that provides for reduced installed drag. In one embodiment, $L/D_M$ is at least 2. In another embodiment, $L/D_M$ is at least 2.5. In various embodiments, it should be appreciated that the $L/D_M$ is for a single unducted rotor engine.

The reduced installed drag may further provide for improved efficiency, such as improved specific fuel consumption. Additionally, or alternatively, the reduced drag may provide for cruise altitude engine and aircraft operation at or above Mach 0.5. In certain embodiments, the reduced drag provides for cruise altitude engine and aircraft operation at or above Mach 0.75. In certain embodiments, such as certain embodiments of $L/D_M$, the rotor assembly 20, and/or the vane assembly 30 positioned aft of the rotor assembly 20, the engine 10 defines a maximum cruise altitude operating speed between approximately Mach 0.55 and approximately Mach 0.85. In still particular embodiments, certain embodiments of $L/D_M$, the quantity of blades at the rotor assembly 20 to the quantity of vanes at the vane assembly 30, and/or the vane assembly 30 positioned aft of the rotor assembly 20 provides the engine 10 with a maximum cruise altitude operating speed between approximately Mach 0.75 and Mach 0.85.

Moreover, it will be appreciated that the engine 10 further includes a cowl 1056 surrounding the turbomachinery and defining at least in part an inlet 1058, an exhaust 1060, and the turbomachinery flowpath 1062 extending between the inlet 1058 and the exhaust 1060. The inlet 1058 is for the embodiment shown an annular or axisymmetric 360 degree inlet 1058 located between the rotor assembly 20 and the vane assembly 30, and provides a path for incoming atmospheric air to enter the turbomachinery flowpath 1062 (and compressors, combustion section, and turbines) radially inwardly of the vane assembly 30. Such a location may be advantageous for a variety of reasons, including management of icing performance as well as protecting the inlet 1058 from various objects and materials as may be encountered in operation.

As is depicted, the rotor assembly 20 is driven by the turbomachinery, and more specifically, is driven by the low speed spool 5054. More specifically, still, engine 10 in the embodiment shown in FIG. 1 includes a power gearbox 1064, and the rotor assembly 20 is driven by the low speed spool 5054 of the turbomachinery across the power gearbox 64. In such a manner, the rotating blades 21 of the rotor assembly 20 may rotate around the axis 11 and generate thrust to propel the engine 10, and hence an aircraft to which it is associated, in a forward direction FW.

The power gearbox 1064 may include a gearset for decreasing a rotational speed of the low speed spool 5054 relative to the low speed turbine 5050, such that the rotor assembly 20 may rotate at a slower rotational speed than the low speed spool 5054. In certain embodiments, the power gearbox 1064 includes a gear ratio of at least 4:1. Although in various embodiments the 4:1 gear ratio may generally provide for the low speed turbine 5050 to rotate at approximately four times the rotational speed of the rotor assembly 20, it should be appreciated that other structures provided herein, such as the blade pitch change mechanism and/or an electric machine, may allow the unducted rotor assembly 20 to operate substantially de-coupled from the low speed turbine 5050 rotational speed. Moreover, when using an interdigitated counter-rotating or vaneless turbine the gear ratio may be reduced without an appreciable loss in output power from the rotor assembly 20.

Single unducted rotor engine 10 also includes in the exemplary embodiment a vane assembly 30 which includes an array of vanes 31 also disposed around longitudinal axis 11, and each vane 31 has a root 335 and a tip 334 and a span defined therebetween. These vanes 31 are mounted to a stationary frame and do not rotate relative to the longitudinal axis 11. In certain embodiments, the vanes 31 include a mechanism for adjusting their orientation relative to their axis 90 and/or relative to the blades 21, such as further described herein. For reference purposes, FIG. 1 also depicts a forward direction denoted with arrow FW, which in turn defines the forward and aft portions of the system. As shown in FIG. 1, the rotor assembly 20 is located forward of the turbomachinery in a "puller" configuration, and the exhaust 1060 is located aft of the vane assembly 30.

It may be desirable that the blades 21, the vanes 31, or both, incorporate a pitch change mechanism such that the airfoils (e.g., blades 21, vanes 31, etc.) can be rotated with respect to an axis of pitch rotation either independently or in conjunction with one another. Such pitch change can be utilized to vary thrust and/or swirl effects under various operating conditions, including to provide adjust a magnitude or direction of thrust produced at the vanes 31, or to provide a thrust reversing feature which may be useful in certain operating conditions such as upon landing an aircraft, or to desirably adjust acoustic noise produced at least in part by the blades 21, the vanes 31, or aerodynamic interactions from the blades 21 relative to the vanes 31.

Vanes 31 are sized, shaped, and configured to impart a counteracting swirl to the fluid so that in a downstream direction aft of both rows of airfoils (e.g., blades 21, vanes 31) the fluid has a greatly reduced degree of swirl, which translates to an increased level of induced efficiency.

Vanes 31 may have a shorter span than blades 21, as shown in FIG. 1, for example, 50% of the span of blades 21, or may have longer span or the same span as blades 21 as desired. Vanes 31 may be attached to an aircraft structure associated with the propulsion system, as shown in FIG. 1, or another aircraft structure such as a wing, pylon, or fuselage. Vanes 31 of the stationary element may be fewer or greater in number than, or the same in number as, the number of blades 21 of the rotating element and typically greater than two, or greater than four, in number.

In certain embodiments, the plurality of blades 21 each have a loading distribution such that at any location between the blade root 223 and 30% blade span 246 the value of $\Delta RCu$ in the air stream is greater than or equal to 60% of the peak $\Delta RCu$ in the air stream. Cu is the circumferential averaged tangential velocity in a stationary frame of reference. Vector diagrams are shown in a coordinate system in which the axial direction is in the downward direction and tangential direction is left to right. Multiplying the Cu times the airstream radius R gives the property RCu. The blade or vane loading at a given radius R is now defined as the change in RCu across the blade row (at a constant radius or along a streamtube), here forth referred to as $\Delta RCu$ and is a measure of the elemental specific torque of said blade row. Desirably, the $\Delta RCu$ for the rotating element should be in the direction of rotation throughout the span.

In certain embodiments, the blade 21 defines a more uniform $\Delta RCu$ over the span, particularly in the region between the blade root 223 and midspan. In fact, at a location of 30% span the value of $\Delta RCu$ is greater than or equal to 60% of the maximum value of $\Delta RCu$, and, in an embodiment, is greater than or equal to 70% of the maximum value of $\Delta RCu$, and, in an embodiment, is greater than or equal to 80% of the maximum value of $\Delta RCu$. $\Delta RCu$ is measured across the rotor assembly 20 in a conventional manner.

In certain embodiments, a change in the blade 21 cambers in the inner portion of the blade, i.e., from about 0 to approximately 50% span, and it is expected that characteristics of exemplary embodiments could also be loosely defined by a camber distribution. At least one of the following criteria are met: at 30% span the blade camber is at least 90% of the max camber level between 50% and 100% span; and the 0% span camber is at least 110% of the max camber between 50% and 100% span. Embodiments of the blade 21 may include geometries or features providing loading distribution such as provided in U.S. patent Ser. No. 10/202,865 B2 "Unducted Thrust Producing System" in Appendix A, and herein incorporated by reference in its entirety for all purposes.

Blades 21 may include a metal leading edge (MLE) wrap for withstanding foreign object debris (FOD), such as bird strikes, during engine operation. In particular embodiments, the blades 21 include a sheet metal sheath at the leading edge. In various embodiments, the blades 21 include one or more features, including orifices, voids, openings, cavities, or other frangible features configured to desirably liberate portions of the blade 21, such as to minimize damage to the fuselage of an aircraft.

In various embodiments, the plurality of vanes 31 and/or aircraft surfaces 1160 may include leading edge treatments such as to reduce acoustic interactions between the rotor assembly 20 and the vanes or aircraft surfaces positioned downstream of the rotor assembly 20. The vanes 31 and/or aircraft surface 1160 may include a surface modification element defining a modified contour configured to decorrelate a phase distribution of a plurality of sound sources within a source field positioned on at least a portion of the vane or aircraft surface. Embodiments of the vane 31 and/or aircraft surface 1160 may include geometries of features such as one or more surface modification elements such as provided in US Patent Application No. US 2017/0225773 A1 "Wing Leading Edge Features to Attenuate Propeller Wake-Wing Acoustic Interactions", and herein incorporated by reference in its entirety for all purposes.

In certain embodiments, the engine 10 includes one or more of a desired ratio of blades 21 to vanes 31, a difference in a quantity of blades 21 to a quantity of vanes 31, or sum of the quantity of blades 21 and the quantity of vanes 31, providing particular and unexpected benefits such as further described herein. Furthermore, it should be appreciated that it may be desirable to produce thrust from the rotor assembly 20 depicted and described herein within one or more particular ranges of quantity of blades 21, or more particularly, ranges of ratios, differences, and/or sums of blades 21 to vanes 31, such as to reduce interaction noise between an unducted rotor assembly and a vane assembly. Still further, it should be appreciated that although certain embodiments of turbo machines may provide partially overlapped ranges of quantities of thrust-producing blades, the present disclosure provides ranges, differences, or sums that, at least in part, provide a desired thrust for an unducted rotor assembly while attenuating or mitigating noise produced by an interaction of the blades 21 and the vanes 31, or attenuating noise perceived by an observer or measurement device. Additionally, or alternatively, one or more vanes 31 or vane structures depicted and described herein may include or be configured at, at least in part, one or more aircraft surfaces 1160 such as described herein, including, but not limited to, a wing, pylon, fuselage, empennage, or non-wing surface.

In various embodiments, the engine 10 includes a ratio of a quantity of blades 21 to a quantity of vanes 31 between 2:5 and 2:1, or between 2:4 and 3:2, or between 0.5 and 1.5. In certain embodiments, a difference between the quantity of blades 21 and the quantity of vanes 31 is between two (2) and negative two (−2), or between one (1) and negative one (−1). In various embodiments, the quantity of blades 21 is twenty (20) or fewer. In still certain embodiments, a sum of the quantity of blades 21 and the quantity of vanes 31 is between twenty (20) and thirty (30), or between twenty-four (24) and twenty-eight (28), or between twenty-five (25) and twenty-seven (27). In one embodiment, the engine 10 includes a quantity of blades 21 between eleven (11) and sixteen (16). In another embodiment, the engine 10 includes twelve (12) blades 21 and ten (10) vanes 31. In still another embodiment, the engine 10 includes between three (3) and twenty (20) blades 21 and between three (3) and twenty (20) vanes 31. In yet another embodiment, the engine 10 includes an equal quantity of blades 21 and vanes 31. In still yet another embodiment, the engine 10 includes an equal quantity of blades 21 and vanes 31, in which the quantity of blades 21 is equal to or fewer than twenty (20). In various embodiments, the engine 10 includes a combination of the quantity of blades 21 to the quantity of vanes 31 between 2:5 and 2:1, the difference between the quantity of blades 21 and the quantity of vanes 31 between two (2) and negative two (−2), and the quantity of blades 21 between eleven (11) and sixteen (16). For example, a difference between the quantity of blades and the quantity of vanes may correspond to an engine having fourteen (14) blades and sixteen (16) vanes, or fourteen (14) blades and twelve (12) vanes, or sixteen (16) blades and eighteen (18) vanes, or sixteen (16) blades and fourteen (14) vanes, or eleven (11) blades and thirteen (13) vanes, or eleven (11) blades and nine (9) vanes, etc.

In particular embodiments, a combination of the vane assembly 30 positioned aerodynamically aft of the rotor assembly 20 to recover swirl in the flow such as described herein and the differences between the quantities of blades 21 and vanes 31 allow for decreased noise. The vane assembly 20 being stationary relative to the engine centerline axis allows for reduced radiation efficiency of noise and redirects the noise in a manner favorable to use the difference between the quantities of blades 21 and vanes 31 such as described herein. In contrast, engines including counter-rotating unducted fan or propeller rotors with approximately equal blade counts for the forward and aft blade rows may generally result in increased noise radiation compared to a counter-rotating unducted fan or propeller rotor engine including a greater difference in blade counts between the forward and aft blade rows.

It should be appreciated that embodiments of the engine 10 including one or more ranges of ratios, differences, or sums of blades 21 to vanes 31 depicted and described herein may provide advantageous improvements over turbofan or turboprop gas turbine engine configurations. In one instance, embodiments of the engine 10 provided herein allow for thrust ranges similar to or greater than turbofan engines with larger quantities of blades or vanes, while further obviating structures such as fan cases or nacelles. In another instance, embodiments of the engine 10 provided herein allow for thrust ranges similar to or greater than turboprop engines with similar quantities of blades, while further providing reduced noise or acoustic levels such as provided herein. In still another instance, embodiments of the engine 10 provided herein allow for thrust ranges and attenuated acoustic levels such as provided herein while reducing weight, complexity, or issues associated with fan cases, nacelles, variable nozzles, or thrust-reverser assemblies at the nacelle.

It should further be appreciated that ranges of ratios, differences, sums, and/or discrete quantities of blades 21 to vanes 31 provided herein may provide particular improvements to gas turbine engines in regard to thrust output and acoustic levels. For instance, quantities of blades greater than those of one or more ranges provided herein may produce noise levels that may disable use of an open rotor engine in certain applications (e.g., commercial aircraft, regulated noise environments, etc.). In another instance, quantities of blades less than those ranges provided herein may produce insufficient thrust output, such as to render an open rotor engine non-operable in certain aircraft applications. In yet another instance, quantities of vanes less than those of one or more ranges provided herein may fail to sufficiently produce thrust and abate noise, such as to disable use of an open rotor engine in certain applications. In still another instance, quantities of vanes greater than those of ranges provided herein may result in increased weight that adversely affects thrust output and noise abatement.

It should be appreciated that various embodiments of the single unducted rotor engine 10 depicted and described herein may allow for normal subsonic aircraft cruise altitude operation at or above Mach 0.5. In certain embodiments, the engine 10 allows for normal aircraft operation between Mach 0.55 and Mach 0.85 at cruise altitude. In still particular embodiments, the engine 10 allows for normal aircraft operation between Mach 0.75 and Mach 0.85. In certain embodiments, the engine 10 allows for rotor blade tip speeds at or less than 750 feet per second (fps).

Referring now to FIGS. 2-7, in certain embodiments, the rotor assembly 20 includes a variable pitch rotor blade assembly 20 having a plurality of rotor blades 21 coupled to a disk 42 in a spaced apart manner. As depicted, the blades 21 extend outwardly from disk 42 generally along a radial direction R. Each of the plurality of blades 21 defines a leading edge 244 and a tip 246 defined at a radially outer edge of each respective rotor blade 21. Each rotor blade 21 is also rotatable relative to the disk 42 about a pitch axis P by virtue of the blades 21 being operatively coupled to a suitable actuation assembly 48 configured to vary the pitch of the blades 21 in a manner described in detail below. The blades 21, disk 42, and actuation assembly 48 are together rotatable about a rotor assembly longitudinal axis 12. It should be appreciated that longitudinal axis 12 may be co-axial or common to the central longitudinal axis 11 of the engine 10 depicted in FIG. 1. However, in other embodiments, the rotor assembly longitudinal axis 12 may be offset from the engine longitudinal axis 11, such that the axes 11, 12 are at an acute angle relative to one another. Additionally, in certain embodiments, the disk 42 of the variable pitch rotor assembly 20 is covered by rotatable front hub 1052 aerodynamically contoured to promote an airflow through the plurality of blades 21.

Referring now to FIG. 2 the rotor assembly 20 will be described in greater detail. FIG. 2 provides a forward-facing-aft elevational view of the rotor assembly 20 of the exemplary engine 10 of FIG. 1. For the exemplary embodiment depicted, the rotor assembly 20 includes twelve (12) blades 21. From a loading standpoint, such a blade count allows the span of each blade 21 to be reduced such that the overall diameter of rotor assembly 20 is also able to be reduced (e.g., to about twelve feet in the exemplary embodiment). That said, in other embodiments, rotor assembly 20 may have any suitable blade count and any suitable diameter, such as described herein.

Each blade 21 may have a suitable aerodynamic profile including a generally concave pressure side and a circumferentially opposite, generally convex suction side 100. Each blade 21 extends from an inner root end 223, which is rotatably coupled to disk 42, to a radially outer distal tip 246. As shown, each blade 21 defines a chord length C that extends between opposite leading edge 244 and trailing edge 245, with the chord varying in length over the span of the blade 21.

The rotor assembly 20 also has a corresponding solidity which is a conventional parameter equal to the ratio of the blade chord BC, as represented by its length, divided by the circumferential pitch CP or spacing from blade to blade at the corresponding span position or radius. The circumferential pitch is equal to the circumferential length at the specific radial span divided by the total number of rotor blades in the blade row. Accordingly, the solidity is directly proportional to the number of blades and chord length and inversely proportional to the diameter.

Typical high solidity turbofan engines have adjacent blades 21 that substantially overlap each other circumferentially due to the high solidity and high stagger of the airfoils. For example, as shown in FIG. 2, the blades 21 have high solidity and adjacent blades would contact each other when passing through the flat pitch position. Due to the solidity of the blades 21, it can be seen that the blades 21 would overlap at least in region 110 if they pass through flat pitch at the same time. In some embodiments, in order to achieve reverse thrust from the rotor assembly 20, it is necessary that the blades 21 pass through flat pitch. However, given the configuration shown in FIG. 2, unacceptable blade contact will occur if the blades 21 rotate in unison through flat pitch. Therefore, a rotor assembly 20 configured for asynchronous blade pitching is described below with respect to FIGS. 2-7. Such a system can ensure that the blades 21 do not pass through flat pitch at the same time, as well as provide other performance-related improvements to rotor assembly 20 operation, as discussed below.

Referring now generally to FIGS. 2-7, a pitch actuation assembly 48 in accordance with an exemplary embodiment of the present disclosure is depicted. As mentioned above, each blade 21 is rotatable relative to the disk 42 about a pitch axis P. The blades 21, disk 42, and actuation assembly 48 are together rotatable about the longitudinal axis 12. In certain embodiments, the pitch actuation assembly described in regard to the blade pitch actuation assembly 48 is further included at one or more of the vanes 31 of the vane assembly 30 as a vane pitch actuation assembly 148. As such, at least a portion of the pitch actuation assembly shown and described in regard to FIGS. 2-7 may be applied to one or more of the vanes 31 such as to collectively or independently adjust the orientation of the vane 31 about the axis 90 of each respective vane 31. Such independent or collective adjustment of pitch angle of the vane 31 about axis 90 may be utilized according to one or more methods further described herein, such as one or more methods for attenuating undesired acoustic noise, for producing a desired thrust vector, and/or for producing a desired thrust load.

The actuation assembly 48 generally includes a scheduling ring 120, plurality of linkage arms 122, and one or more motors 124 (e.g., an electric motor, a pneumatic or hydraulic actuation device, etc.). Each blade 21 may be rotatably coupled to the disk 42 through a first end 126 of a corresponding linkage arm 122 such that the first end 126 and the corresponding blade 21 may rotate about pitch axis P (e.g., blade pitch axis 91 in FIG. 1) relative to disk 42. In this regard, the blade 21 may be fixedly connected to the first end 126 of the corresponding linkage arm 122, such that rotation of the linkage arm 122 causes the blade 21 to rotate relative to the disk 42.

A second end 128 of the linkage arm 122 may be slidably connected to one of the plurality of slots 130 defined in scheduling ring 120. For example, the second end 128 may be rotatably connected to a sliding member 132. The sliding member 132 may be slidably received in a slot 130 of the scheduling ring 120. The scheduling ring 120 is rotatable about longitudinal centerline 12 relative to the disk 42 and is operatively coupled with the motor 124, which is fixed relative to the disk 42.

Each of the plurality of slots 130 on the scheduling ring 120 defines an airfoil pitch schedule. In this regard, for a given angle of rotation of the scheduling ring 120, the airfoil pitch schedule determines the actual pitch angle of the blades 21. In operation, the motor 124 rotates the scheduling ring 120 relative to the disk 42. As the scheduling ring 120 rotates, sliding member 132 moves along slot 130 and the angular position of the linkage arm 122 changes. As each linkage arm 122 rotates, the corresponding blade 21 rotates as well, thus rotating each blade 21 about pitch axis P.

Therefore, by rotating the scheduling ring 120 relative to the disk 42, each of the plurality of blades 21 rotates about its respective pitch axis P according to an airfoil schedule defined by the slot 130 to which it is coupled by linkage arm 122. By defining different airfoil pitch schedules, the rotation of the blades 21 may be controlled independently of each other. Therefore, for example, if alternating blades 21 are rotated according to different airfoil pitch scheduling, conflict through flat pitch may be avoided. In addition, the pitch schedule may be adjusted to improve performance of the blade 21. In certain embodiments, improved performance of the blade 21 via different airfoil pitch scheduling may reduce undesired acoustics, or mitigate the production of undesired acoustics, from the blades 21 during rotation at one or more operational modes of the engine 10, or during one or more operational modes of an aircraft to which the engine 10 is attached (e.g., takeoff, climb, cruise, approach, etc.).

The airfoil pitch schedules may depend, for example, on whether the aircraft is in a normal flight phase, a flat pitch transition phase, or a reverse thrust configuration. For example, the variable pitch rotor assembly 20 may be configured for normal flight phase when the blades 21 have a pitch of greater than 8°. In addition, when the blades 21 are within 8° of flat pitch (i.e., between −8° and 8°), the variable pitch rotor assembly 20 may be operating in a flat pitch transition phase. The blades 21 may be in a reverse thrust phase when angled at −8° or less. One skilled in the art will appreciate that these ranges are used only for the purpose of explanation, and that phases and airfoil schedules may be defined in a variety of other ways to improve performance of the variable pitch rotor assembly 20 and engine 10.

In an example embodiment, the plurality of blades 21 rotate according to different pitch schedules in order to avoid conflict as the blades 21 rotate through flat pitch. More specifically, as shown in FIG. 2, a first set of blades 134 may rotate according to a first airfoil pitch schedule, and an alternating, second set of blades 136 may rotate according to a second airfoil pitch schedule. The first and second airfoil pitch schedule may be the same for a first phase of rotation, which may correspond to normal flight operation, but the pitch schedules may deviate from one another as the blades 21 enter flat pitch. For example, as soon as the pitch of the plurality of blades 21 reach within 8° of flat pitch, the rotational speed of the first set of blades 134 may increase while the rotational speed of the second set of blades 136 may decrease. In this manner, the first set of blades 134 may pass through flat pitch sequentially ahead of the second set of blades 136, thus avoiding contact through flat pitch. After all blades 21 have passed through flat pitch and begin to generate reverse thrust, the first and second airfoil pitch schedules may once again synchronize with each other so that all blades 21 rotate in unison. Alternatively, however, the airfoil schedules may remain offset in order to ensure reverse thrust is achieved without choking the air going to the core 16 of the engine 10, or to achieve other performance improvements.

One skilled in the art will appreciate that the airfoil pitch schedules discussed above are only exemplary, and that any other airfoil pitch schedule or schedules may be used as needed for performance. For example, more than two airfoil pitch schedules may be used. Indeed, every blade 21 could rotate according to its own pitch schedule. All such variations are contemplated as within the scope of the present disclosure.

Now referring to FIGS. 6-7, a schematic representation of the displacement of the sliding member 132 is shown. This representation depicts two adjacent blades 21 rotating according to airfoil schedules defined by scheduling slots 130 in scheduling ring 120. In the illustrated embodiment, each blade 21 is centered about respective pitch axis P, where it is rotatably coupled to disk 42. Each linkage arm 122 is schematically represented by dotted line 122 and rotates a fixed radial distance about its respective pitch axis P. Sliding member 132 is rotatably connected to linkage arm 122 and is slidably coupled to scheduling slot 130.

As shown in the figures, as scheduling ring 120 rotates relative to disk 42, the scheduling slots 130 are generally translated in the direction indicated by arrow 140. For each angular position of the scheduling ring 120, the angular position of each blade 21 may be varied according to the shape of its respective scheduling slot 130, such as a first scheduling slot 142 and a second scheduling slot 143. In various embodiments, the first scheduling slot 142 defines a different contour from the second scheduling slot 143, such that each scheduling slot 142, 144 rotates the blade 21 to a different position, or at a different rate of change, relative to one another. For example, referring specifically to FIG. 6, some scheduling slots 130 may be entirely linear in the vertical direction (e.g., the first scheduling slot 142 defining a linear scheduling slot). By contrast, some scheduling slots 130 may be non-linear (e.g., the second scheduling slot 143 defining a non-linear scheduling slot), for example, by having one or more linear portions 146 and one or more non-linear portions 147. In other example embodiments, the scheduling slots 130 may be bent, curved, serpentine, or any other suitable shape.

Notably, when the scheduling ring 120 is rotated at a constant velocity, a linkage arm 122 connected to the entirely linear scheduling slot 142 will have a constant rotational speed about pitch axis P. By contrast, the rotational speed of a linkage arm 122 connected to a non-linear slot will vary according to the shape of its respective scheduling slot 130. In this manner, by alternately shaping each scheduling slot 130, alternating blades 21 may rotate into flat pitch at different times, such that blade 21 contact will not occur through flat pitch. In addition, adjacent scheduling slots 130 may have a similar profile throughout the blade 21 angle range, such that the blades 21 rotate in unison throughout their range with the exception of the point where they enter flat pitch.

One skilled in the art will appreciate that the above-described mechanism for actuating the rotation of the rotor blades is only one exemplary mechanism for achieving asynchronous rotor blade pitching. Other mechanisms will be evident to a skilled artisan based on the present disclosure. Any such variations or modifications are contemplated as within the scope of the present disclosure.

The above-described embodiments facilitate thrust vector adjustment, including thrust reverse, thrust magnitude change and/or thrust direction change along the longitudinal direction, for a variable pitch rotor assembly 20 with the blade 21 solidity greater than one without a need for a heavy thrust reverse mechanism. Particularly, embodiments of the pitch change mechanism shown and described herein allows for at least two-phase asynchronous blade 21 pitching, such that each blade 21 rotates on a different schedule through flat pitch and/or reverse allowing the blades 21 to pass each other without contact. For example, the pitch change mechanism can rotate six out of twelve blades 21 on a different schedule through reverse, thus allowing reverse thrust to be achieved without contact between the blades 21 as they pass through flat pitch. All blades 21 may rotate on the same schedule throughout the entire flight envelope with the exception of the reverse condition. Benefits of asynchronous blade 21 pitching include improvements in engine efficiency and specific fuel consumption. Installation is also simplified as compared to prior designs, fan operability is improved, and stall margin is increased. Other advantages will be apparent to those of skill in the art.

Referring back to FIG. 1, and further in conjunction with FIGS. 8-14, in certain embodiments, the vane assembly 30 includes a plurality of vane airfoils 31 arranged in a spaced apart manner. Referring briefly to FIG. 8, an exemplary airfoil 31 is provided graphically depicting how various parameters such as camber and stagger angle are defined with respect to the airfoil, such as the blade 21 (FIG. 1) or the vane 31 (FIG. 1). An airfoil meanline is described as a line that bisects the airfoil thickness (or is equidistant from the suction surface and pressure surface) at all locations. The meanline intersects the airfoil at a leading edge (LE) and a trailing edge (TE). The camber of an airfoil is defined as the angle change between the tangent to the airfoil meanline at the leading edge and the tangent to the angle meanline at the trailing edge. The stagger angle is defined as the angle the chord line makes with the centerline axis (e.g., reference line 44). Reference line 44 is parallel to axis 11, and reference line 55 is orthogonal to reference line 44.

Referring generally to FIG. 1 and FIGS. 15-16, a vane characteristics actuation assembly 148 in accordance with an exemplary embodiment of the present disclosure is depicted. In certain embodiments, the engine 10 includes a pitch actuation assembly 48 at the rotor assembly 20 (e.g., such as depicted and described in regard to FIGS. 2-7) and a vane characteristics change assembly 148 at the vane assembly 30 (e.g., such as depicted and described in regard to FIG. 1 and FIGS. 15-16) to desirably control thrust output, thrust vector, rotor speed, acoustic noise, or generally allow for constant or substantially constant speed or operation of the core engine 40 while desirably adjusting magnitude and/or direction of thrust output.

As mentioned above, one or more of the plurality of vanes 31 is rotatable about a vane pitch axis (e.g., vane pitch axis 90 in FIG. 1, FIGS. 15-16). The vane characteristics actuation assembly 148 may provide to one or more of the vanes 31 collective, independent, or ganged (i.e., a first set of vanes differently and/or independently operable from a second set of vanes, such as depicted and described herein) adjustment of the orientation or airfoil characteristics of the vane 31 about the vane pitch axis of each respective vane 31. Such independent or collective adjustment of pitch angle of the vane 31 about the vane pitch axis may be utilized according to one or more methods further described herein, such as one or more methods for attenuating undesired acoustic noise, for producing a desired thrust vector, and/or for producing a desired thrust load.

FIGS. 9-13 each include illustrations of radial sections of the engine 10 taken through stages of axial flow airfoils and nearby aircraft surfaces, and are typically referred to as "roll-out-views", such as a projection of blades about circumference onto a plane. These views are generated by sectioning airfoil stages and aircraft surfaces at a fixed radial dimension measured radially from longitudinal axis 11 and reference dimension R in FIG. 1. When blades 21 and vanes 31 of respective rotor assembly 20 and vane assembly 30 are sectioned at reference dimension R, corresponding blade 21 and vanes 31 are generated. Then the blades 21 and vanes 31 are unrolled or 'rolled-out' to view the sections in two-dimensional space while maintaining the circumferential and axial relationships between the airfoil stages and any nearby aircraft surfaces. Reference dimension E for the axial spacing between blades 21 and vanes 31. This allows the rotor assembly 20 and the vane assembly 30 in FIGS. 9-13 to be described in two dimensions. An axial dimension, parallel to the longitudinal axis 11 and generally aligned with the direction Z of the moving working fluid shown in FIG. 1, and a 'rolled-out' or flattened circumferential dimension X, orthogonal to the axial dimension.

FIG. 9 illustrates a cross-sectional "roll-out view" of rotor assembly 20 which as depicted includes twelve blades 21. Each blade 21 is individually labeled with lower case letters o through z, with the blade 21 labeled o repeating at the end of the sequence to highlight the actual circumferential nature of rotor assembly 20. Each blade 21 has a blade leading edge 244. A line positioned in the circumferential direction X through each blade leading edge 244 defines a rotor plane 24. Each blade 21 is spaced apart from one another and is located axially at the rotor plane 24.

Similar to the rotor assembly 20, the vane assembly 30 depicted in FIG. 9 has ten vanes 31, individually labeled a through j, each with a vane leading edge 333. A line positioned in the circumferential direction through each vane leading edge 333 defines a stator plane 34. In FIG. 9, each vane 31 in the vane assembly 30 is identical in size, shape, and configuration, and is evenly spaced circumferentially from each other (i.e., along reference dimension P) and evenly spaced axially from the rotor plane 24 (i.e., in regard to reference dimension E). A nominal, evenly distributed circumferential spacing Q, between vanes 31 can be defined by the following equation using the radial height of the reference dimension R, and the number of vanes 31, N, in vane assembly 30:

$$Q = R*2*\pi/N$$

The engine 10 may include a controller configured to adjust the position of one or more vanes 31, the blade pitch angle of the plurality of blades 21 at the rotor assembly 20, and/or the rotor plane 24 of the rotor assembly 20 relative to the plurality of blades 21 of the rotor assembly 20. In certain embodiments, the pitch angle at pitch axis (e.g., vane pitch axis 90 in FIG. 1), the longitudinal or axial spacing of a respective vane leading edge 333 to the rotor plane 24, and/or the circumferential spacing of two or more vanes 31 along reference dimension Q is adjusted to improve the acoustic signature of the engine 10 relative to various operational conditions of the engine 10 and/or the aircraft (e.g., angle of attack). Exemplary embodiments of adjustments or positioning of the vane assembly 30 relative to the rotor assembly 20 are further provided in regard to FIGS. 10-12. In each of these figures, the rotor assembly 20 and vane assembly 30 are located axially forward of a wing of an aircraft. Additionally, an exemplary embodiment of an aircraft surface 1160 is represented as two wing sections 1161, 1162. Note that two wing sections are present in each "roll-out view," because the radial section that generates these installed views cuts through the wing of an aircraft in two circumferential locations. For the non-uniform vanes 31 in all of the Figures which follow, this dashed and solid line depiction method is used to refer to exemplary embodiments of nominal and non-nominal vanes 31 respectively.

To minimize the acoustic signature, it is desirable to have the aerodynamic loading of the vane leading edges 333 to all be similar and be generally not highly loaded. To maximize the efficiency and minimize the acoustic signature of the rotor assembly 20, a desired goal would be to minimize the variation in static pressure circumferentially along the rotor assembly 20. To maximize the performance of the vane assembly 30, another goal would be to have neither the aerodynamic loadings of the vane leading edges 333 nor the vane suction 35 and pressure surface 36 diffusion rates lead to separation of the flow.

To maximize the performance of the aircraft surface, depicted in these exemplary embodiments as a wing sections 1161 and 1162, one goal may be to keep the wing loading distribution as similar to the loading distribution the wing was designed for in isolation from the engine 10, thus maintaining its desired design characteristics. The goal of maintaining the aircraft surface 1160 performance as designed for in isolation from the engine 10 applies for aircraft surfaces that may be non-wing, including, for example, fuselages, pylons, and the like. Furthermore, to maximize the performance of the overall aircraft and engine 10, one of the goals would be to leave the lowest levels of resultant swirl in the downstream wake. As described herein, the non-uniform characteristics of the vanes 31 is adjusted based on one or more of these desired goals during operation of the engine 10 and aircraft.

This optimal performance can be accomplished in part by developing non-uniform vane exit flow angles, shown in FIG. 10 as angles Y and Z, to minimize interaction penalties of the engine installation and to reduce the acoustic signature. The first exemplary embodiment of this is shown in FIG. 10, where each pair of vanes 31 in the vane assembly 30 are evenly spaced circumferentially from one another and evenly spaced axially from the rotor plane 24. However, the nominal (without pitch change) stagger angle and camber of the vanes 31 in FIG. 10 vary to provide optimal exit flow angles into the aircraft surface downstream of the vane assembly 30, such as depicted in regard to reference vanes 31 labeled b through e, and g through i.

FIG. 11 shows another exemplary embodiment of vane assembly 30 providing flow complimentary to aircraft surface 1160. In FIG. 11, vanes 31 and related vanes 31 in vane assembly 30 are not evenly spaced circumferentially from each other, nor are they evenly spaced axially from the rotor plane 24. The degree of non-uniformity may vary along the span of a vane. Two vanes 31 are spaced axially forward of the stator plane 34, reference dimensions F and G, allowing the vane assembly 30 to merge axially with the aircraft surface 1160. For instance, the aircraft surface 1160 may at least partially include or define at least one of the vanes 31 of the vane assembly 30. The nominal (without pitch change) stagger angle and camber angle of the vanes 31 vary to provide optimal exit flow angles into the wing sections 1161 and 1162, as shown in vanes 31 labeled d through i.

FIG. 12 is similar to FIG. 11, but depicts the removal of two vanes 31 adjacent to wing section 1161. This exemplary embodiment allows the vanes 31 to be evenly spaced axially from the rotor plane 24 and allows the wing section to merge axially with the vane assembly 30.

Although the location of the rotor assembly 20 and vane assembly 30 in each of the foregoing exemplary embodiments was axially forward of the aircraft surface 1160, it is foreseen that the propulsion system 70 could be located aft of the aircraft surface 1160. In these instances, the prior enumerated goals for optimal installed performance are unchanged. It is desirable that the propulsion system has suitable rotor assembly 20 circumferential pressure variations, vane leading edge 333 aerodynamic loadings, and vane pressure surface 35 and suction surface 36 diffusion rates. This is accomplished in part by varying the size, shape, and configuration of each vane 31 and related vane 31 in the vane assembly 30 alone or in combination with changing the vane 31 pitch angles. For these embodiments, additional emphasis may be placed on assuring the combined propulsion system 70 and aircraft leave the lowest levels of resultant swirl in the downstream wake.

The exemplary embodiment of the rotor assembly 20 and vane assembly 30 in FIG. 9 is designed for a receiving a constant swirl angle, reference angle A, into vanes 31 along the stator plane 34. However, as the aircraft angle of attack is varied the vanes move to off design conditions and the swirl angle into the vane assembly 30 will vary around the stator plane 34. Therefore, to keep the aerodynamic loading on the vane leading edges 33 roughly consistent along the stator plane 34, a variable pitch system that would rotate either each vane 31 or group of vanes 31 a different amount is desirable. Such a pitch change can be accomplished by rotating a vane 31 in a solid body rotation along any axis, including, for example, the axis along the centroid of vane 31 or an axis along the vane leading edge 333. The desire for similar aerodynamic loading on the vane leading edges 33 is in part driven by the desire to keep the acoustic signature of the engine 10 low. Vanes 31 with high leading edge loadings tend to be more effective acoustic radiators of the noise created from the gust of the upstream rotor assembly 20. The exemplary embodiment of the rotor assembly 20 and vane assembly 30 in FIG. 13 describes this desired variation in vane 31 via changes in pitch angles of one or more vanes 31, such as via the vane pitch change mechanism 148 further described herein. For ease of explanation, we define the chord line angle of vanes at the design point as stagger and hence variations between vanes at the design point as stagger variations. As the engine 10 moves to different operating conditions, or as the aircraft to which the engine is attached moves to different operating conditions (e.g., takeoff, climb, cruise, approach, landing, etc.), vanes 31 may rotate around the pitch axis 90 referred to as pitch change (or changes in pitch angle) of the vanes 31. Variations in vane chord angles that result from these solid body rotations are referred to as pitch angle variations.

In FIG. 13, each vane 31 in the vane assembly 30 is identical in size, shape, and configuration, and are evenly spaced circumferentially from each other and evenly spaced axially from the rotor plane 24. However, the pitch angles of the vanes 31 in FIG. 13 vary as they represent a change in the vane 31 pitch actuation to accommodate varying input swirl, reference different input swirl angles A and B, into stator plane 34 caused in part by changes in aircraft angle of attack. As desired, this provides similar aerodynamic loading on the vane leading edges 33 to keep the acoustic signature of the engine 10 low, such as within one or more ranges further described herein. This similar loading can be accomplished by independently changing pitch angle for individual vanes 31 via the vane characteristics change mechanism 148, or by changing pitch angles similarly for groups of vanes 31 suitable for ganging. The vanes 31 could rotate in pitch about any point in space, but it may be desirable to maintain the original leading edge 333 circumferential spacing and rotate the vanes 31 around a point at or near their leading edge 333. This is shown in FIG. 13 using vanes 31 labeled c, d, f, and g, where the nominal staggered vanes 31 are depicted in dashed lines and the rotated (or pitched) vanes 31 are depicted as solid lines.

As shown by way of example in FIG. 14, it may be desirable that either or both of the sets of blades 21 and vanes 31 incorporate a pitch or airfoil characteristics change mechanism (e.g., blade pitch actuation assembly 48 in FIGS. 2-7, vane characteristics change mechanism 148 in FIGS. 15-16) such that the blades and vanes can be rotated with respect to an axis of pitch rotation either independently or in conjunction with one another. Such pitch change can be utilized to vary thrust and/or swirl effects under various operating conditions, including providing thrust reversing, acoustic noise attenuation, or desired thrust vector, which may be useful in certain operating conditions of the engine 10 and/or aircraft.

The vane system 30, as suitable for a given variation of input swirl and aircraft surface 1160 installation, has non-uniform characteristics or parameters of vanes with respect to one another selected either singly or in combination from those which follow. A delta in stagger angle between neighboring vanes 31 according to one embodiment of greater than or equal to about 2 degrees can be employed, and according to another embodiment between about 3 degrees and about 20 degrees. A delta in camber angle between neighboring vanes 31 and related vanes 31 according to one embodiment of greater than or equal to about 2 degrees can be employed, and according to another embodiment between about 3 degrees and about 15 degrees. A circumferential spacing Q at a given reference dimension R, between neighboring vanes 31 and related vanes 31, for vane 31 counts N from about 5 to about 20, from about 10% to about 400% of the nominal, even circumferential spacing can be employed. An axial spacing from the rotor plane 24 to vanes 31 and related vanes 31 up to about 400% of the radial height H, of the vane 31 can also be employed.

The non-uniform characteristic may be attributed to a portion of the span of the vanes, or to substantially all of the span of the vanes. In certain embodiments, at least a portion, or all, of the plurality of vanes 31 of the vane assembly 30 may include the vane characteristics actuation mechanism 148, in which the vane characteristics actuation mechanism is configured to adjust at least a pitch axis and/or axial spacing such as described herein.

Still various embodiments of the vane assembly 30 provided herein may include at least one vane defining a pylon or aircraft surface (e.g., aircraft surface 1160). It should be appreciated that vane pitch angle changes may desirably alter thrust direction to or away from the pylon surface, such as described herein, to attenuate generation of undesired noise. In certain embodiments, one or more aircraft surfaces, such as the pylon, may include pitch change mechanisms, flaps, or actuators configured to perform substantially similarly as one or more vanes depicted and described herein.

Referring now to FIGS. 17-21, exemplary depictions of adjustments, actuations, or other changes in pitch at the blades 21 and/or vanes 31 are provided. FIGS. 17-21 provide a radial view of an airfoil profile such as described in regard to FIGS. 1-16, corresponding to a radial location for which a contribution to reverse thrust is desired, such as the outer span of the blade 21. In regard to FIGS. 17-21, closing the blade 21, such as changing the pitch of the blade 21 toward a closed position, is represented by a clockwise rotation (e.g., depicted via arrows CW) of the airfoil about its respective pitch axis 91. Closing the vane 31, such as changing the pitch of the vane 31 toward a closed position, is represented by a counter-clockwise rotation (e.g., opposite of arrows CW) of the airfoil about its respective pitch axis 90. In the vector diagrams depicted in FIGS. 17-21, subscript 1 (e.g., $V_1$, $W_1$) refers to an airflow condition at a first station forward of the rotor assembly 20 (e.g., proximate to forward end 98). Subscript 2 (e.g., $V_2$, $W_2$) refers to an airflow condition at a second station between the rotor assembly 20 and the vane assembly 30. Subscript 3 (e.g., $V_3$, $W_3$) refers to an airflow condition at a third station aft of the vane assembly 30 (e.g., proximate to aft end 99). $V_1$, $V_2$, $V_3$ each refer to absolute velocity at their respective airflow stations. $W_1$, $W_2$, $W_3$ each refer to velocity relative to a rotating frame of reference of the rotor assembly 20 at their respective airflow stations. U indicates magnitude and direction of the speed of the rotor blade 21 corresponding to the rotational speed and radial location. Axial and tangential velocity components are indicated by the vertical and horizontal components, respectively, of the vectors. Positive tangential velocity components are in the direction of blade speed vector U. The change in tangential velocity that occurs as the flow travels through rotor assembly 20, indicated by $\Delta V_t$, indicates the level or magnitude of loading on the rotor.

It should be appreciated that as the rotor assembly 20 rotates about the longitudinal axis 11 of engine 10, it imparts tangential momentum, or swirl, to the flow, such that the flow exiting the rotor assembly has greater tangential velocity than the flow entering it. If flow enters the rotor assembly 20 with zero or substantially zero tangential velocity then the flow exits the rotor with a positive tangential velocity. The flow exiting the rotor assembly 20 may have a positive tangential velocity component, a zero or substantially zero tangential velocity component, or a negative tangential velocity component based on the flow entering the rotor assembly 20, the blade pitch angle about pitch axis 91, or speed U of the rotor blade 21, or combinations thereof. Residual swirl from forward thrust and reverse thrust operation (i.e., non-zero tangential velocity component in the flow exiting the propulsion system) does not contribute substantially to the thrust capability of the system.

FIG. 17 illustrates the engine 10 during forward thrust operation. In the embodiment depicted in FIG. 17, the rotor assembly 20 and the vane assembly 30 are each at or near their exemplary design point or forward thrust position (e.g., nominal position). As the air flows from the first station to the second station, the rotor assembly 20 imparts tangential momentum to the air such as to increase the tangential component of the absolute velocity (V) in the direction of rotation. From the second station to the third station, the vane assembly 30 removes a substantial portion, or all, of tangential momentum from the flow from the rotor assembly 20, resulting in an exit velocity from the vane 31 at the third station that has less tangential velocity component. As such, the lower exit tangential velocity component may define, at least in part, a desirably efficient generation of thrust via reduced waste in kinetic energy. Stated differently, the desirably efficient generation of thrust directs kinetic energy generally along the axial or longitudinal direction rather than along a non-axial direction.

FIG. 18 illustrates the engine 10 during an exemplary thrust reverse operation mode. The vane 31 is positioned substantially at or near its design point pitch angle, such as depicted in regard to FIG. 17. For reverse thrust operation, the blade 21 is closed, such as via rotation along blade pitch axis 91 in the CW direction, so that the leading edge 244 (i.e., the thick end relative to a thinner trailing edge 245) is aft of the trailing edge 245. As the rotor assembly 20 rotates about the longitudinal axis 11 of engine 10 with the blade 21 in closed position, the rotor assembly 20 induces flow from the second station to the first station. As a result, the vane 31 imparts a tangential velocity component opposite to the direction of rotation of the rotor assembly 20 (i.e., counter-swirl) as the flow progresses from the third station to the second station. Absolute velocity $V_2$ has a negative tangential velocity component, and the effect of the rotor assembly 20 is to result in absolute velocity $V_1$ with reduced or eliminated negative tangential velocity component. This results in increased rotor loading and increased reverse thrust output relative to a system without a stationary vane row. With increased rotor loading, the change in angle of the relative velocity from $W_2$ to $W_1$ increases due to a higher negative tangential component of $W_2$. With the increase in loading on the rotor, the departing reverse thrust relative velocity $W_1$ may have a higher negative tangential component and less swirl component in the departing absolute velocity $W_1$ than a system without a stationary vane row.

Referring now to FIG. 20, another thrust reverse operation mode is depicted. In FIG. 20, the vane 31 is closed (i.e., rotated CCW along the vane pitch axis 90) relative to its design point pitch angle (e.g., such as the vane depicted in FIG. 17). Relative to the example depicted in FIG. 18, closing the vane 31 increases the counter-swirl entering the rotor blade 21, such as to increase reverse thrust output via increased rotor loading at the blade 21. The increased rotor loading may increase the negative tangential component of the relative velocity $W_1$ departing the blade 21 and provide a reduced exit swirl. If the increased loading on the rotor blade 21 produces excess reverse thrust or exit swirl, the rotor blade 21 may be opened (i.e., rotated CCW along the blade pitch axis 91) to enhance the desired effect.

FIG. 21 depicts the vane 31 opened (i.e., rotated CW along the vane pitch axis 90) relative to its design point pitch angle. In certain instances, methods or operations may desirably reduce or spoil thrust reverse such as depicted in FIG. 21, such as via opening the vane pitch angle to generate a resultant tangential velocity component at the first station. Desirably reducing or spoiling thrust reverse via altering the vane pitch angle allows for reducing thrust without changing rotor blade pitch 91 angle or rotational speed at the rotor assembly 20. As such, reverse thrust output may be desirably altered without altering core engine speed or output, or while maintaining substantially constant core engine speed, such as described herein. It should be appreciated that spoiling reverse thrust such as described herein may mitigate risks or damage related to core engine or rotor assembly overspeed, changes in torque output at the core engine or rotor assembly, or other transient operations at the core engine or rotor assembly. However, it should further be appreciated that alteration or adjustment of vane angle for a desired thrust output may be performed with changes at the core engine and/or rotor assembly.

Referring now to FIG. 19, another thrust reverse operation mode is depicted. The vane 31 is opened (i.e., the vane 31 is rotated CW along the vane pitch axis 90) relative to its design point, or nominal, pitch angle such as to reduce the negative tangential velocity component at the second station relative to the thrust reverse mode depicted in regard to FIG. 18. The reduced tangential velocity opposite of the rotation of the blades 21 (i.e., counter-swirl) tends to unload the rotor assembly 20. However, the pitch angle of the blade 21 is closed (i.e., rotated CW along the blade pitch axis 91) an additional amount to at least partially recover the rotor loading and impart a change in absolute tangential velocity from the second station to the first station, such as described in regard to FIG. 18. Reverse thrust output may be reduced or spoiled by way of opening the vanes 31 while maintaining a substantially constant operation of the core engine 40 and/or without changing blade pitch angle or rotational speed.

In various embodiments, the blade 21 is formed such that the stagger angle varies from hub to tip to accommodate the desired flow vectors and loading distribution along the blade span. The varied stagger angle may allow for forward thrust output from a lower span of the blade and reverse thrust output from an upper span of the blade. In one embodiment, the blade is configured to generate forward flow below 50% span. In still another embodiment, the blade is configured to generate reverse flow at or above 50% span. In still various embodiments, the vane is configured to change angle up to 15 degrees open and up to 15 degrees closed from the design point to adjust reverse thrust such as described above. In another embodiment, the vane is configured to change up to 10 degrees open and up to 10 degrees closed from the design point to adjust reverse thrust such as described above. In yet another embodiment, the vane is configured to change angle up to 5 degrees open and up to 5 degrees closed to adjust reverse thrust such as described above.

Referring now to FIG. 22, a method for adjusting thrust vector for an unducted rotor engine is provided, (hereinafter, "method 1000"). Embodiments of the method 1000 provided herein may particularly provide for altering or adjusting thrust direction and magnitude for an unducted rotor engine. Certain embodiments provide for control and generation of reverse thrust for an unducted rotor engine. Still certain embodiments provide for control and generation of thrust and desirably altering a tangential velocity component of the flow exiting the rotor assembly. Embodiments of the method 1000 may be applied with gas turbine engines with articulatable fan or propeller rotor pitch axis and vane assembly pitch axis, such as depicted in all or part of the embodiments of the engine 10 provided in regard to FIGS. 1-21. Steps of the method 1000 may be store and executed via a controller, such as controller 210 depicted in FIG. 1, or one or more controllers depicted and described in FIGS. 23-29. However, it should be appreciated that the method 1000 may be executed with other configurations of unducted rotor engine.

The method 1000 includes at 1010 generating, via rotation of a rotor assembly, a flow of air from a first station forward of the rotor assembly to a second station aft of the rotor assembly. In a particular embodiment, the rotor assembly generates the flow of air from forward of the rotor assembly to aft of the vane assembly. In certain embodiments, the method 1000 further includes generating an aft axial velocity component of the flow of air from aft of the vane assembly to forward of the rotor assembly at least by closing a blade pitch angle at one or more blades at the rotor assembly. At 1020, the method 1000 includes generating a positive tangential velocity component of the flow of air via the rotor assembly. It should be appreciated that the positive tangential velocity component is along a first direction corresponding to the direction of rotation of the rotor assembly. A negative tangential velocity component is along a second direction opposite of the first direction.

In certain embodiments, the method 1000 includes at 1030 increasing loading at the blades of the rotor assembly. In one embodiment, increasing loading at the blades of the rotor assembly includes closing the blade pitch angle when generating reverse thrust via a flow of air from aft of the rotor assembly to forward of the rotor assembly, such as described in regard to FIG. 18. In another embodiment, increasing loading at the blades of the rotor assembly includes closing a vane pitch angle at the vane assembly. In one embodiment, increasing loading at the rotor assembly includes at 1032 closing the pitch angle of the vane at the vane assembly and the blade at the rotor assembly. In certain embodiments, the method 1000 includes at 1034 reducing the negative tangential velocity component of the flow of air from the vane assembly at least by opening the vane pitch angle.

In still certain embodiments, the method 1000 includes at 1040 adjusting the blade pitch angle at one or more blades of the rotor assembly to position a blade leading edge aft of a blade trailing edge, such as depicted and described in regard to FIGS. 17-19. In particular embodiments, rotating the rotor assembly after adjusting the blade pitch angle generates the positive tangential velocity component of fluid from the rotor assembly.

In still various embodiments, the method 1000 includes at 1050 adjusting the vane pitch angle at one or more vanes of the vane assembly. In one embodiment, adjusting the vane pitch angle includes reducing loading at the rotor assembly. In certain embodiments, the method 1000 includes at 1052 changing absolute tangential velocity relative to aft and forward of the rotor assembly. Changing absolute tangential velocity is based at least on adjusting blade pitch angle relative to vane pitch angle.

In certain embodiments, the method 1000 includes at 1070 rotating the vane at the vane assembly co-directional to a direction of rotation of the blade pitch angle at one or more blades of the rotor assembly. In one embodiment, the method 1000 includes at 1072 closing the vane pitch angle at one or more vanes of the vane assembly. In a particular embodiment, closing the vane pitch angle at one or more vanes of the vane assembly includes reducing a negative tangential velocity component at the vane assembly. In still another embodiment, closing the vane pitch angle at one or more vanes of the vane assembly includes increasing counter-swirl of the flow of air from the vane assembly, such as described and depicted in regard to FIGS. 20-21.

Referring now to FIGS. 23-29, diagrams outlining steps for operation of an unducted rotor engine are provided. The methods and diagrams provided herein may be utilized with various embodiments of a single unducted rotor engine, such as engine 10 depicted and described herein. However, it should be appreciated that the methods provided herein may be utilized to control engines generally including one or more of a rotor blade pitch change mechanism, a vane pitch change mechanism, a rotor angle of attack change mechanism, or combinations thereof.

Conventional turbofan engines generally control engine thrust by measuring corrected fan speed or overall engine pressure ratio and correlating one or both measurements to desired engine thrust based on an aircraft flight condition. However, methods for controlling and operating an unducted single rotor engine, such as depicted and described herein, include adjusting, to generate and adjust thrust output, a rotational speed (e.g., mechanical speed, corrected speed, etc.) of the rotor assembly (e.g., rotor assembly 20), a rotor blade pitch (e.g., at axis 91) at the rotor assembly, a torque (e.g., torque on a fan or propeller shaft), engine pressure ratio (e.g., P56/P2), or core engine pressure ratio (e.g., P56/P25). The method includes generating or adjusting thrust output based at least on a performance map, curve, table, or other reference position or function of the rotor assembly as a function of rotor blade pitch (e.g., at axis 91). In various embodiments, the method further includes generating or adjusting thrust output based on rotational speed of the rotor assembly or a flight condition (e.g., takeoff, climb, cruise, approach, landing, etc., or one or more air conditions related thereto, including air speed, pressure, temperature, density, humidity, or other environmental condition).

In certain embodiments, the method includes determining or adjusting engine thrust output based at least on an engine cycle model, such as the power management and engine cycle model block (power management block) depicted in FIGS. 23-29. In one embodiment, a controller 1600 includes one or more, or multiple, single-input, single-output (SISO) loops or a combination of SISO and multi-input, multi-output (MIMO) loops to provide dynamic coordination or adjustment between blade pitch changes (e.g., blade pitch 91 at one or more blades 21), vane pitch changes (e.g., vane pitch 90 at one or more vanes 31), rotor plane changes (e.g., rotor plane 34), core engine speed changes (e.g., core engine 40), electric machine load changes, or combinations thereof.

Referring to FIG. 23, operations or method steps executed at the controller 1600 may include receiving or obtaining, at the power management block in the control logic, a throttle input. In various embodiments, the schematic controller 1600 depicted in regard to FIG. 21 is a sensor-based controller that infers a desired thrust output based on a lookup table, chart, schedule, or other reference. The throttle input is mapped to one or more of a desired rotor speed, a desired torque, a desired thrust output, a desired pressure ratio across the engine and/or rotor assembly, while adjusting to or otherwise accounting for environmental conditions related to an aircraft state at the corresponding moment or period of time (e.g., air speed, pressure, temperature, density, humidity, altitude, etc.). In a first control loop, the engine cycle model or power management block outputs a signal indicative of a desired thrust output. In certain embodiments, the signal is a commanded rotor blade pitch angle and/or commanded vane pitch angle, such as described in regard to rotor assembly 20 and/or vane assembly 30 herein. A difference between a commanded pitch angle, measured pitch angle (i.e., pitch error), is received at a controller (e.g., Control) configured to control, adjust, or otherwise articulate the rotor blade pitch and/or vane pitch, such as via a respective rotor blade pitch change mechanism or vane pitch change mechanism. The engine 10 adjusts the rotor blade pitch angle 91 based on the commanded adjustment. In various embodiments, a pitch sensor obtains, receives, measures, or otherwise acquires an actual rotor blade pitch angle at one or more of the plurality of rotor blades (e.g., blade 21), at a synchronization ring (e.g., scheduling ring 120), or at one or more slots (e.g., slot 130) at the rotor blade pitch change mechanism (e.g., blade pitch change mechanism 48). The pitch sensor provides an output signal to a difference function, at which a difference or delta between the commanded rotor blade pitch angle from the engine cycle model is compared to the actual rotor blade pitch angle obtained from the pitch sensor.

In certain embodiments, the engine 10 adjusts the vane pitch angle 90 based on the commanded adjustment. In various embodiments, a pitch sensor obtains, receives, measures, or otherwise acquires an actual vane pitch angle at one or more of the plurality of vanes (e.g., vane 31), at a synchronization ring, or at one or more slots at the vane pitch change mechanism (e.g., vane pitch change mechanism 148). The pitch sensor provides an output signal to a difference function, at which a difference or delta between the commanded vane pitch angle from the engine cycle model is compared to the actual vane pitch angle obtained from the pitch sensor.

Referring still to FIG. 23, the controller 1600 includes a second control loop, at which the engine cycle model outputs a commanded low spool parameter (e.g., $N_1$-cmd, such as referring to a low speed spool 5054 including the low speed compressor 5052 and the low speed turbine 50 in FIG. 1). A difference (e.g., $N_1$ error), based at least on the commanded low spool parameter and adjusted based at least on an actual $N_1$ parameter obtained or measured from an $N_1$ sensor (e.g., $N_1$ feedback), is provided to the controller (e.g., Control). The controller outputs an engine control signal, including, but not limited to, a commanded fuel flow to the engine (e.g., combustion section 4048 in FIG. 1). The commanded fuel flow to the engine, such as the combustion section, includes or one or more of a fuel flow rate, pressure, temperature, or a valve, orifice, manifold, area, or volume adjustment corresponding to the commanded fuel flow, or other parameter that may affect an amount of fuel provided to the combustion chamber for generating combustion gases. The actual $N_1$ parameter corresponds to the commanded $N_1$ parameter and may include one or more of a low speed spool rotational speed (e.g., mechanical speed, corrected speed, etc.) torque (e.g., propeller shaft torque), or pressure ratio (e.g., pressure ratio across one or more compressors, or overall pressure ratio across the engine or core engine).

Although FIG. 23 depicts a first control loop and a second control loop controlling rotor blade pitch 91 and rotational speed of the rotor assembly 20, it should be appreciated in other additional or alternative embodiments, control for rotational speed of the rotor assembly 20 may be replaced by, or augmented by, control of torque or engine pressure ratio (e.g., pressure measured, by a sensor, downstream of the turbine section, by a sensor, upstream of the compressor section over pressure measured, such as P56/P2) or core engine pressure ratio (e.g., pressure measured downstream of a turbine of the turbine section over pressure measured between a low pressure compressor and a high pressure compressor, such as P56/P25), or core engine rotational speed.

Referring now to FIG. 24, in yet other embodiments, steps of the for operating the engine may include providing a controller 1610 including two or more control loops. Various embodiments of the controller 1610 may be configured substantially similarly as depicted and described in regard to controller 1600 in regard to FIG. 23. In certain embodiments, the controller 1610 may include two or more control loops configured to control an engine using at least two parameters indicative of thrust. It should be appreciated that in certain embodiments, the two or more parameters indicative of thrust include a vane pitch angle 90 at a vane assembly 30 positioned in aerodynamic relationship with the rotor assembly (e.g., the vane assembly 30 with adjustable vane pitch angle 90 relative to the rotor assembly 20). In one embodiment, such as depicted in FIG. 24, the two or more closed control loops may include a combination of a fan or propeller speed and fan or propeller system torque, or a combination of fan or propeller speed and a pressure ratio such as described herein.

In still various embodiments, the controller 1610 may include three or more control loops. For instance, a third loop may add another feedback parameter based on sensed or calculated variables to manipulate or modulate another effector such as other variable geometry (VG) (e.g., one or more stator vanes, an inlet guide vane, bleed valves, etc.) or other mechanism for modulating power or airflow. Control of two or more loops may be performed by a multi-input, multi-output (MIMO) controller, such as depicted in FIGS. 24-25. In still various embodiments, control of two or more loops may be performed by several single-input, single-output (SISO) controllers, or combinations of MIMO and SISO controllers.

Referring now to FIG. 25, another embodiment of a controller 1700 configured to execute steps of the method for operating a single unducted rotor engine is provided. The methods and diagrams provided herein may be utilized with various embodiments of a single unducted rotor engine such as depicted and described herein. However, it should be appreciated that the methods provided herein may be utilized to control engines generally including one or more of a rotor blade pitch change mechanism, a vane pitch change mechanism, a rotor angle of attack change mechanism, or combinations thereof. The power management block may further output an aircraft power extraction signal indicative of bleed air, electrical load, or other power extractions from one or more engines for aircraft systems (e.g., thermal management, environmental control system, electrical or electronic systems, etc.).

Referring to FIGS. 26-29, the schematic controller 1800 depicted is configured as a model-based controller, such as depicted at FIG. 26, configured to calculate a desired output thrust based at least on an engine operating parameter including fuel flow, variable geometry (e.g., vane pitch angle, blade pitch angle, compressor vane or bleed opening/closing, fuel flow controls, etc.), and flight condition (altitude, Mach number, ambient air temperature and/or pressure, one or more aircraft loads, such as, but not limited to, aircraft electrical loads, thermal or environmental control system bleeds, or other aircraft bleeds and power extractions). Steps of the method for operation may include receiving or obtaining at the controller 1800, or particularly at the power management block of the control logic, a desired thrust output, such as from a throttle input. The power management block determines or otherwise calculates commanded positions for variable geometries (VGs) (e.g., variable vane angles, actuator positions, bleed valve open/close positions, or other variable geometries) as well as the commanded fan speed or corrected fan speed. The controller (e.g., Control) receives the difference between the commanded thrust output signal and an actual or estimated thrust output signal from an engine model and tracking filter. The controller provides to the engine an output signal corresponding to one or more of a commanded fuel flow (e.g., flow rate, pressure, temperature, etc.), a rotor blade pitch angle, a vane pitch angle, a rotor plane angle at the rotor assembly, or one or more other variable geometries (e.g., Other VGs), such as, but not limited to, a variable vane or bleed valve at a compressor section, a bypass valve or flow, a turbine nozzle area, an inlet guide vane of a compression stage feeding a third-stream flowpath, booster or low pressure compressor variable stator vanes, or third-stream variable nozzle, or one or more actuator positions corresponding thereto. The engine receives the output signal from the controller and generates an actual thrust output based on the output signal from the controller. One or more engine signals corresponding to one or more engine sensors, such as a torque sensor, low spool speed measurement (e.g., $N_1$ speed), high spool speed measurement (e.g., $N_2$ speed), other spool speed measurements (e.g., intermediate spools for 3-shaft engines, fan shaft speeds for geared engine arrangements, etc.), a rotor blade pitch angle measurement, a vane pitch angle measurement, a rotor plane position measurement, or one or more actuator positions corresponding to the variable geometries articulated by the output signal, or an acoustic sensor (e.g., microphone, vibration sensor, accelerometer, etc.) is provided from the engine and obtained by the engine model and tracking filter. A thrust feedback signal is generated from the engine model and tracking filter based on one or more engine signals corresponding to one or more engine sensors.

Referring to FIGS. 26-29, in certain embodiments, the engine, aircraft, system, or method may include a computing system 1800 including a sensor-based controller, such as depicted in FIGS. 27-29, and a model-based controller, such as depicted in FIG. 26. The computing system 1800 may be configured substantially similarly such as depicted and described in regard to a plurality of control devices such as depicted and described in regard to FIGS. 23-25 (e.g., controller 1600, 1610, 1700). In one embodiment, a model-based controller, such as depicted in FIG. 26 or configured such as controller 1700 depicted in regard to FIG. 23, is utilized as a supervisory controller to provide a trim or adjustment to engine operation and performance, such as described herein. In one instance, the model-based controller may alter or vary engine output thrust within a 7% margin (e.g., +/−3.5%) of a set condition. In another instance, the model-based controller may alter or vary engine thrust output within a 5% margin (e.g., +/−2.5%) of a set condition. In yet another instance, the model-based controller may alter or vary engine thrust output within a 2% margin (e.g., +/−1%) of a set condition.

In various embodiments, such as an exemplary embodiment depicted in FIG. 26, the computing system 1800 includes a model-based trim function providing one or more trims or adjustments to controller commands to improve engine performance or operability based on a current operating state of the engine, aircraft, and environmental parameter. In various embodiments, the model-based or state-aware scheme includes a parameter estimation algorithm, also known as a tracking filter, to update the model to match actual engine characteristics or engine health, such as engine deterioration.

The sensor-based controller, such as depicted in FIGS. 27-29 or configured such as controller 1600, 1610 depicted and described in regard to FIGS. 23-24, may provide control and adjustment for changes in thrust output greater than the trim or adjustment levels of the model-based controller. In various instances, the sensor-based controller may provide for transient changes in engine operating condition, such as to and between two or more of ignition, idle, takeoff, climb, cruise, descent, approach, or thrust reverse. In other instances, the model-based controller may provide for adjustments during substantially steady state engine operating condition.

Referring to FIGS. 23-29, embodiments of methods for operation of an unducted rotor engine may adjust, change, articulate, or actuate one or more of a rotor blade pitch, a vane pitch, a rotor plane (e.g., via an AoA change mechanism), low spool speed, high spool speed, or combinations thereof, such as via one or more controllers 1600, 1610, 1700, 1800, or combinations thereof.

As such, a computing system for an unducted rotor engine is provided in which the computing system includes one or the other, or both, of a sensor-based controller or a model-based controller such as described herein. The sensor-based controller is configured to execute a first set of operations, such as those described herein, including obtaining a first signal corresponding to a commanded low spool speed. obtaining a second signal indicative of a pitch angle corresponding to thrust output from the unducted rotor assembly and variable pitch vane assembly, and generating a pitch feedback signal corresponding to a commanded adjustment to the pitch angle based at least on one or both of a variable blade pitch angle or a variable vane pitch angle.

In various embodiments, the first set of operations executed by the sensor-based controller include obtaining a throttle input corresponding to one or more of a desired air speed of an aircraft, a desired thrust output, or a desired pressure ratio, generating the first signal corresponding to the commanded low spool speed, and generating the second signal indicative of the pitch angle corresponding to thrust output at the rotor assembly. In a particular embodiment, the first set of operations further includes generating a low spool speed feedback signal corresponding to the commanded fuel flow.

In certain embodiments of the computing system including the model-based controller and the sensor-based controller, the sensor-based controller is configured to generate the pitch feedback signal during transient changes in engine operating condition. Such as described herein, transient changes in engine operating condition may include conditions to and between two or more of ignition, idle, takeoff, climb, cruise, descent, approach, or thrust reverse.

Additionally, or alternatively, the computing system includes the model-based controlled configured to execute a second set of operations such as described herein, including obtaining a desired thrust output via a throttle input, determining, at least via a power management block, a commanded thrust output signal, receiving the commanded thrust output signal, and generating an output signal corresponding to one or more of a commanded fuel flow to a combustion section, a variable blade pitch angle, a variable vane pitch angle, or a rotor plane angle. In certain embodiments, the model-based controller, when included in the computing system with the sensor-based controller, is configured to generate the output signal during substantially steady state engine operating condition.

In still certain embodiments, the second set of operations executed by the model-based controller includes receiving, via a sensor at the engine, an engine signal corresponding to one or more of a torque, a low spool speed, a high spool speed, a rotor blade pitch angle, a vane pitch angle, a rotor plane position, or one or more actuator positions corresponding to a variable geometry, or an acoustic sensor, and generating a thrust feedback signal based at least on the engine signal.

In certain embodiments, desired thrust and/or desired acoustic noise level is generated at least by adjusting the rotor blade pitch via a rotor blade pitch change mechanism as a function of one or more of rotor assembly speed (e.g., $N_1$ speed), core engine speed (e.g., $N_2$ speed), and environmental conditions of the incoming air (including angle of attack, speed, temperature, pressure, humidity, etc.). In certain embodiments, desired thrust and/or acoustic noise level is generated at least by adjusting two or more parameter indicative of thrust output. In particular embodiments, the two or more parameters indicative of thrust output includes the rotor blade pitch at the rotor assembly and/or vane pitch angle at the vane assembly in aerodynamic relationship with the rotor assembly, such as described herein. As such, thrust output may be altered or generated by articulation of the vane assembly such as described herein. Furthermore, operation of the engine may use fuel flow to the core engine and rotor blade pitch and/or vane pitch changes to control rotor assembly (e.g., fan or propeller speed) in addition to engine pressure ratio, core sped, or rotor assembly torque. In some embodiments, methods for operating the engine include operating the core engine at a substantially constant speed during one or more of ground operation (e.g., ground idle, taxi, etc.), takeoff, climb, cruise, approach, landing, or thrust reverse. Operating the core engine at a substantially constant speed may improve engine efficiency and performance by allowing the core engine to operate substantially at or within an operating band (e.g., within 5%) of an aero design point (e.g., a design point for maximum performance in contrast to other operating conditions or speeds) for the core engine. Furthermore, operating the core engine at a substantially constant speed may contrast with control systems or methods generally directed to operating an engine at a substantially constant fan or propeller speed while adjusting gas generator or core speed.

In contrast to gas turbine engine configurations such as turbofans, embodiments of the engine provided herein allow for thrust control based substantially on rotor blade pitch adjustment (e.g., via blade pitch change mechanism 48), vane pitch adjustment (e.g., via vane pitch control mechanism 148), or both. In certain embodiments, the core engine 40 may operate at a substantially constant speed, such as to provide electricity, air, or other services to an aircraft, such as for an environmental control system, a thermal management system, or powering avionics or the aircraft generally. Operating the core engine (e.g., core engine 40) at a substantially constant speed may allow embodiments of the engine provided herein, as a propulsion system, to obviate a separate auxiliary power unit (APU) for an aircraft. As such, aircraft weight and complexity may be reduced by allowing the propulsion unit to provide power and services during ground operation that may conventionally be provided by an APU.

In still certain embodiments, such as in regard to engine 10, substantially constant speed operation of the low speed spool 5054 and/or the high speed spool 4046 may be allowed by rotating the rotor blade pitch 91 to reduce or increase thrust, including producing little or no thrust from the rotor assembly when desired (e.g., ground operations), substantially independent of speed of the core engine 40 during operation of the engine 10. For example, the vane assembly 20 may reduce or spoil thrust output from the rotor assembly such as described in regard to FIGS. 20-21. Furthermore, or alternatively, thrust output may be adjusted by rotating the vane pitch 90 to reduce or increase thrust output, or to change thrust vector (e.g., reverse thrust, or provide substantially axial thrust to correct for angle of attack). As such, in certain embodiments, methods and controllers provided herein allow for thrust control via modulating or adjusting blade pitch angle and vane pitch angle while maintaining substantially constant speed or torque of the core engine.

Embodiments of methods for control provided herein as may be stored or executed by one or more controllers 1600, 1610, 1700, 1800 may be utilized to desirably control rotor dynamics, such as vibrations, beat frequencies, acoustics, etc. via trim controls or adjustments to blade pitch angle, vane pitch angle (e.g., altering loading at one or more of the rotor assembly and/or the vane assembly), or rotor plane angle. In still various embodiments, methods and systems for control depicted and described herein may include a supervisory controller configured as a model-based controller. The supervisory controller may include an online optimization program to improve fuel burn, perceived or measured noise levels, combustor tones or dynamics, emissions output, or other control or performance parameters, while maintaining desired thrust output within operability limits.

Additionally, or alternatively, methods provided herein as may be stored or executed by one or more controllers 1600, 1610, 1700, 1800 may be utilized to desirably adjust or articulate blade pitch angle and/or vane pitch angle over a desired quantity of iterations, such as to determine a desired thrust output versus core engine speed, to remove or mitigate icing build up at a transient aircraft operating condition (e.g., during takeoff through icing conditions). In one embodiment, the controller receives an input signal indicative of an environmental parameter at which icing conditions may be present. The controller may generate an output signal corresponding to relatively rapid movements or changes in one or both of blade pitch angle or vane pitch angle to mitigate formation or build-up of ice at the rotor assembly or the vane assembly. The generated output signal may further be based at least on a torsional mode shape of the blade 21 or the vane 31, such that the output signal corresponds to a desired frequency (e.g., a resonance frequency). The method may include intermittent changes in pitch such as to remove icing build-up or mitigate ice build-up.

In addition to, or alternative to, steps of a method for operating an unducted rotor engine provided above, embodiments of the method or operations provided herein may particularly provide for altering or adjusting thrust direction and magnitude, mitigating or eliminating beat frequency, reducing undesired acoustics, reducing or removing ice or debris build-up on a rotor assembly, and/or improve thrust match for an unducted rotor engine. Although embodiments of the method or operations may be applied with all or part of the embodiments of the engine 10 provided herein, certain embodiments of the engine 10 may include a computing system configured to execute one or more steps of the method provided herein. However, it should be appreciated that the embodiments of the method, or portions thereof, may be executed with other configurations of unducted rotor engine, gas turbine engine, or turbomachine.

In various embodiments, the method or operations includes operating a core engine and a rotor assembly to generate thrust output. In certain embodiments, such as the engine or portions thereof described herein, the core engine speed and the rotor assembly speed may be operated substantially separately or at least partially independently of one another. For instance, blade pitch angles at one or more blades of the rotor assembly may be altered to reduce or eliminate rotation of the rotor assembly while the core engine is operating. As such, in certain embodiments, the method or operations includes determining a desired thrust output versus speed of the core engine.

In still various embodiments, the method includes determining a desired first blade pitch at the first blade of the rotor assembly and determining a desired second blade pitch at the second blade of the rotor assembly. The method may include generating an output signal based at least on the determined desired thrust output versus speed of the core engine. In certain embodiments, such as described herein, thrust vector generated from the rotor assembly may be altered based at least on operating the low speed spool (e.g., including the rotor assembly) at a substantially constant speed based at least on articulating one or both of a first blade or a second blade of the variable pitch rotor assembly relative to a vane pitch angle of a vane assembly aft of the rotor assembly.

The method includes adjusting or altering one or both of a first blade pitch at a first blade of the rotor assembly or a second blade pitch at a second blade of the rotor assembly based on a determined desired thrust output versus speed of the core engine. In certain embodiments, the method includes articulating a first blade of a rotor assembly, such depicted and described herein, such as alter the first blade pitch when articulating the first blade. The method may further include articulating a second blade of the rotor assembly different from the first blade. Articulating the second blade alters the second blade pitch of the second blade differently from the first blade pitch at the first blade, such as depicted and described herein.

In various embodiments, the method includes receiving an input signal indicative of an environmental parameter within or surrounding the propulsion system. The method or operations includes generating an output signal based on the environmental parameter. The output signal corresponds to adjusting or articulating one or more of the first blade or the second blade of the rotor assembly. In certain embodiments, the environmental parameter corresponds to one or more of a temperature, pressure, flow rate, density, or physical property of fluid entering the engine. In still certain embodiments, the environmental parameter corresponds to a perceived noise, ambient air temperature, ambient air pressure, or icing condition. The environmental parameter may particularly correspond to an operating altitude or attitude of an aircraft to which the engine is attached.

In still certain embodiments, generating the output signal corresponds to a desired frequency of articulation of one or more of the first blade or the second blade of the rotor assembly. In one embodiment, the desired frequency of articulation corresponds to a resonance frequency of one or more of the first blade or the second blade of the rotor assembly. In another embodiment, the desired frequency of articulation is based at least on a torsional mode shape of the first blade or the second blade of the rotor assembly, such as described herein.

In yet another embodiment, articulating the first blade and the second blade of the rotor assembly includes intermittently changing the first blade pitch and the second blade pitch. For instance, intermittent changing of the blade pitch may include actuating the first blade pitch and/or the second blade pitch each between a first angle (e.g., $\theta_{1\,first\,blade\,pitch}$, $\theta_{1\,second\,blade\,pitch}$, etc.) and a second angle (e.g., $\theta_{2\,first\,blade\,pitch}$, $\theta_{2\,second\,blade\,pitch}$). In still certain embodiments, In various embodiments, the method includes altering thrust vector based at least on operating the core engine at a substantially constant speed and articulating one or both of the first blade or the second blade of the variable pitch rotor assembly. In one embodiment, the method includes altering thrust vector based at least on operating the low speed spool at a substantially constant speed based at least on articulating one or both of the first blade or the second blade of the variable pitch rotor assembly relative to a vane pitch angle of the vane assembly aft of the rotor assembly. In another embodiment, the method includes altering thrust vector based at least on operating the high speed spool at a substantially constant speed based at least on articulating one or both of the first blade or the second blade of the variable pitch rotor assembly relative to a vane pitch angle of the vane assembly.

Various embodiments of the method may be executed with a controller (e.g., computing system 210 in FIG. 1) in which all or part of the method is stored as instructions and/or executed as operations at one or more embodiments of an engine, such as the engine 10 depicted and described herein. In certain embodiments, the method is performed at an engine including a single unducted rotor assembly positioned forward of a vane assembly. In still certain embodiments, the method is executed at an engine including an unducted rotor assembly positioned in aerodynamic relationship with a variable pitch vane assembly.

Still various embodiments of the method may be executed with an engine including a variable pitch rotor assembly including a single stage of a plurality of blades coupled to a disk in which the plurality of blades includes a first blade configured to articulate a first blade pitch separately from a second blade configured to articulate a second blade pitch. A fixed-pitch or variable-pitch vane assembly may be positioned forward or aft of the variable pitch rotor assembly. The engine includes a core engine including a high speed spool and a low speed spool is operably coupled to the rotor assembly.

Referring now to FIGS. 30-31, an aircraft with symmetric open rotor engine configurations (e.g., left wing engines 10B and right wing engines 10A, or left-side fuselage engines 10B and right-side fuselage engines 10A, etc.) may be susceptible to undesired acoustic noise based on acoustic beat interferences due to differences in rotor assembly frequencies between the plurality of engines. It should be appreciated that beat interference or beat frequency is an interference pattern from two or more engines operating at different frequencies, perceived as a periodic variation in volume whose rate is the difference between the two or more frequencies from the respective engines.

The controllers depicted and described in regard to FIGS. 23-29 may be configured substantially similarly as shown and described in regard to FIGS. 30-31. In the embodiment depicted in FIG. 28, a first engine depicted as Engine 1 or engine 10A represents one or more right-wing or right-side fuselage engines, and a second engine depicted as Engine 2 or engine 10B represents one or more left-wing or left-side fuselage engines. The engine controllers from Engine 1 and Engine 2 are coupled together in analog or digital communication. Cross coupling of the two or more engine controllers allows for communication between the respective engine controllers (e.g., controller 210 for each respective engine, such as depicted in FIG. 1) of an engine operating parameter, such as one or more of the rotor assembly rotational speed, rotor blade pitch angle, vane pitch angle, or rotor plane (e.g., via an AoA control mechanism). In alternate embodiments, this cross-coupling or communication between engines may be via the aircraft flight control and communication bus.

In the embodiment depicted in FIG. 29, two or more of the engine controls from Engine 1 and Engine 2 are coupled together in analog or digital communication via a master controller 1900. The master controller 1900 is configured to receive inputs from Engine 1 and Engine 2 and determine whether to adjust an engine operating parameter at Engine 1, at Engine 2, or both, to synchrophase the plurality of engines. In certain embodiments, the master controller 1900 is a designated engine controller from either engine 1 or engine 2 (e.g., an engine controller, such as a Full Authority Digital Engine Controller, or FADEC). In other embodiments, the master controller is an aircraft controller, such as via aircraft avionics. In yet another embodiment, the master controller is, or is a portion of, a distributed network configured to receive and transmit signals from and to the two or more engines.

In various embodiments, the designated engine controller is altered or varying between Engine 1 and Engine 2. In such an embodiment, the designated engine controller (e.g., the master controller 1900) may be varied based on a relative engine performance of Engine 1 and Engine 2. In one embodiment, the designated engine controller is based at least on a better-performing engine, in which the better-performing engine is based on one or more of a health parameter, an engine operating parameter, an engine cycle count, an exhaust gas temperature, specific fuel consumption, time-on-wing, or other desired parameter establishing one engine as determinative of an engine operating condition to which another engine will be adjusted to.

In another embodiment, the designated engine controller is based at least on a least-performing engine, such as to define a lowest common denominator of engine performance between Engine 1 and Engine 2. In such an embodiment, the better-performing engine (i.e., not the least performing engine) may be de-tuned, de-rated, or otherwise adjusted to substantially match the engine operating condition of the least-performing engine.

Referring back to FIGS. 30-31, the controller and method determines differences in the engine operating parameter. In certain embodiments, the controller and method further compare the differences in engine operating parameter to one or more of a desired acoustic noise level, a desired thrust output, a health parameter, or a performance parameter (e.g., specific fuel consumption). The controller and method determine one or more adjustments, trims, or other changes to the engine operating parameter based at least on changing rotor assembly (e.g., rotor assembly 20) at one or more engines to match the plurality of engines at the aircraft to mitigate undesired noise. The controller and method may further determine one or more adjustments to the engine operating parameter to mitigate or eliminate undesired noise while avoiding asymmetric thrust or power conditions.

The controller and method further adjust the engine operating parameter based on the determined adjustment. In certain embodiments, the method includes decreasing the performance parameter at a first engine to substantially match the performance parameter at a second engine and further synchrophase rotor speeds and outputs to reduce or eliminate beat interferences. In another embodiment, a first engine including a better health parameter may be de-tuned to match a second engine including a relatively worse health parameter to reduce or eliminate beat interferences. In still another embodiment, a first engine including certain desired levels of health parameter or performance parameter may increase or decrease rotor assembly speed, pitch angle, etc. to mitigate or attenuate beat interferences while reducing the health parameter or performance parameter (e.g., reducing within still acceptable or desired limits).

It should be appreciated that embodiments of the method, controller, engine, or aircraft provided herein may include cross coupling two or more engines to improve overall aircraft and system performance and mitigate or eliminate undesired noise, such as beat frequency, while preserving desired thrust output. As such, although certain embodiments may include de-rating or de-tuning an engine to match another engine, it should be appreciated that the two or more engines may define substantially similar performance characteristics. Embodiments of the method and system provided herein may receive engine parameters from the respective engines and adjust one or more of the core speed (e.g., fuel flow, engine loading via an electric machine or variable vanes, valves, orifices, etc., high spool speed, etc.) or rotor blade pitch angle. The system may additionally adjust vane pitch angle and/or rotor plane angle to improve acoustic noise levels based on other noise sources (e.g., those not based on beat frequency), or to control thrust output level, or to control thrust output vector (e.g., providing a more axial thrust, such as to allow for lower core engine speeds and fuel consumption while maintaining or increasing thrust output at the rotor assembly and vane assembly).

Various embodiments of the engine 10 depicted and described herein provide novel improvements over known propulsion systems. Embodiments of the engine 10 include, but are not limited to, one or more ranges of ratios of blades to vanes, length to maximum diameter, vane spacing or orientation (i.e., vane pitch angle) relative to one or more blades or blade pitch angle, or combinations thereof. It should be appreciated that, to the extent one or more structures or ranges may overlap one or more of those known in the art, certain structures with certain turbo machine arrangements may be generally undesired to combine with other structures of other turbo machine arrangements. For instance, turbofan configurations generally include certain quantities of vanes to provide structural support for a casing surrounding a rotor assembly, without providing any teaching or motivation in regard to thrust output and noise abatement particular to open rotor engines. In another instance, turboprop or turboshaft configurations generally exclude vane assemblies since the added structure may increase weight without providing other benefits for turboprop or turbofan applications.

In still another instance, certain ranges of blades to vanes described herein provide unexpected benefits not previously known in the art, or furthermore, not previously known in the art for single stage unducted rotor assemblies. In still yet another instance, certain ranges of blades to vanes with certain ranges of length to maximum diameter of the engine provide unexpected benefits not previously known in the art, or furthermore, not previously known in the art for single stage unducted rotor assemblies. In still particular embodiments, certain ranges, differences, or sums of blades and vanes provided herein provide unexpected benefits not previously known in the art, such as reduced interaction noise between the rotor assembly 20 and the vane assembly 30.

Still further, certain embodiments of the engine 10 provided herein may allow for normal subsonic aircraft cruise altitude operation at or above Mach 0.5, or above Mach 0.75, based at least on ranges or quantities of blades to vanes and/or ranges of blades to vanes and length to maximum diameter, and/or in combination with other structures provided herein. In certain embodiments, the engine 10 allows for normal aircraft operation between Mach 0.55 and Mach 0.85, or between Mach 0.75 to Mach 0.85 at cruise altitude. In certain embodiments, the engine 10 allows for rotor blade tip speeds at or less than 750 feet per second (fps). In still certain embodiments, the core engine 40 and rotor assembly 20 are together configured to produce a threshold power loading is 25 horsepower per ft$^2$ or greater at cruise altitude. In particular embodiments of the engine 10, structures and ranges provided herein generate power loading between 25 horsepower/ft$^2$ and 100 horsepower/ft$^2$ at cruise altitude. Still particular embodiments may provide such benefits with reduced interaction noise between the rotor assembly 20 and the vane assembly 30 and/or decreased overall noise generated by the rotor assembly 20 and the vane assembly 30. Additionally, it should be appreciated that ranges of power loading and/or rotor blade tip speed may correspond to certain structures, core sizes, thrust outputs, etc., or other structures at the core engine 40 and the rotor assembly 20. However, as previously stated, to the extent one or more structures provided herein may be known in the art, it should be appreciated that the present disclosure may include combinations of structures not previously known to combine, at least for reasons based in part on conflicting benefits versus losses, desired modes of operation, or other forms of teaching away in the art.

It should furthermore be appreciated that certain unexpected benefits of various embodiments of the engine 10 provided herein may provide particular improvements to propulsion systems in regard to thrust output and acoustic levels. For instance, quantities of blades greater than those of one or more ranges provided herein may produce noise levels that may disable use of an open rotor engine in certain applications (e.g., commercial aircraft, regulated noise environments, etc.). In another instance, quantities of blades less than those ranges provided herein may produce insufficient thrust output, such as to render an open rotor engine non-operable in certain aircraft applications. In yet another instance, quantities of vanes less than those of one or more ranges provided herein may fail to sufficiently produce thrust and abate noise, such as to disable use of an open rotor engine in certain applications. In still another instance, quantities of vanes greater than those of ranges provided herein may result in increased weight that adversely affects thrust output and noise abatement.

It should be appreciated that embodiments of the engine 10 including one or more ranges of ratios, differences, sums, or discrete quantities of blades 21 to vanes 31 depicted and described herein may provide advantageous improvements over turbofan or turboprop gas turbine engine configurations. In one instance, embodiments of the engine 10 provided herein allow for thrust ranges similar to or greater than turbofan engines with larger quantities of blades or vanes, while further obviating structures such as fan cases or nacelles. In another instance, embodiments of the engine 10 provided herein allow for thrust ranges similar to or greater than turboprop engines with similar quantities of blades, while further providing reduced noise or acoustic levels such as provided herein. In still another instance, embodiments of the engine 10 provided herein allow for thrust ranges and attenuated acoustic levels such as provided herein while reducing weight, complexity, or issues associated with fan cases, nacelles, variable nozzles, or thrust-reverser assemblies at a turbofan nacelle.

This written description uses examples to disclose the invention, including the best mode, and also to enable any person skilled in the art to practice the invention, including making and using any devices or systems and performing any incorporated methods. The scope of the invention(s) described herein is defined by one or more of the claims, including combinations of two or more claims or clauses (as set forth below) and may include other examples that occur to those skilled in the art. For example, aspects of the invention(s) are provided by the subject matter of the following clauses, which are intended to cover all suitable combinations unless dictated otherwise based on logic or the context of the clauses and/or associated figures and description:

1. A propulsion system defining an engine centerline, the propulsion system comprising a rotor assembly comprising a plurality of blades extended radially relative to the engine centerline axis; and a vane assembly positioned in aerodynamic relationship with the rotor assembly, wherein the vane assembly comprises a plurality of vanes extended radially relative to the engine centerline axis, and wherein the propulsion system comprises a ratio of a quantity of blades to a quantity of vanes between 2:5 and 2:1.

2. The propulsion system of any one or more clauses herein, wherein the quantity of blades is 20 or fewer.

3. The propulsion system of any one or more clauses herein, wherein the quantity of blades is between 16 and 11.

4. The propulsion system of any one or more clauses herein, wherein a difference between the quantity of vanes and the quantity of blades is between 2 and −2.

5. The propulsion system of any one or more clauses herein, wherein a difference between the quantity of vanes and the quantity of blades is between 2 and −2, and wherein the quantity of blades is between 16 and 11.

6. The propulsion system of any one or more clauses herein, wherein the ratio of the quantity of blades to the quantity of vanes between 0.5 and 1.5.

7. The propulsion system of any one or more clauses herein, wherein a sum of blades and vanes is 30 or fewer, and wherein the sum of blades and vanes is 20 or greater.

8. The propulsion system of any one or more clauses herein, wherein the rotor assembly is unducted.

9. The propulsion system of any one or more clauses herein, wherein the vane assembly is positioned aft of the rotor assembly.

10. The propulsion system of any one or more clauses herein, wherein the vane assembly is unducted.

11. The propulsion system of any one or more clauses herein, the propulsion system comprising a core engine encased in a nacelle, wherein the nacelle defines a maximum diameter, and wherein the vane assembly is extended from the nacelle.

12. The propulsion system of any one or more clauses herein, wherein the rotor assembly comprises a hub from which the plurality of blades is extended, and wherein the propulsion system comprises a length extended from a forward end of the hub to an aft end of the nacelle, and wherein a ratio of length to maximum diameter is at least 2.

13. The propulsion system of any one or more clauses herein, wherein the ratio of length to maximum diameter is at least 2.5.

14. The propulsion system of any one or more clauses herein, wherein the core engine and the rotor assembly are together configured to generate a power loading of 25 horsepower per square foot or greater at cruise altitude.

15. The propulsion system of any one or more clauses herein, wherein the rotor assembly is configured to rotate at a blade tip speed of up to 750 feet per second.

16. A propulsion system defining an engine centerline axis, the propulsion system comprising an unducted single rotor assembly comprising a plurality of blades extended radially relative to the engine centerline axis; and a vane assembly positioned aft of the unducted rotor assembly, wherein the vane assembly comprises a plurality of vanes extended radially relative to the engine centerline axis, and wherein the propulsion system comprises a difference between a quantity of vanes and a quantity of blades is between 2 and −2.

17. The propulsion system of any one or more clauses herein, wherein the rotor assembly comprises a blade pitch change mechanism configured to control blade pitch at one or more of the plurality of blades relative to vane pitch at one or more of the plurality of vanes.

18. The propulsion system of any one or more clauses herein, wherein the vane assembly comprises a vane pitch change mechanism configured to control vane pitch at one or more of the plurality of vanes relative to blade pitch at one or more of the plurality of blades.

19. The propulsion system of any one or more clauses herein, the propulsion system comprising a core engine encased in a nacelle, wherein the nacelle defines a maximum diameter, and wherein the vane assembly is extended from the nacelle; and wherein the rotor assembly comprises a hub from which the plurality of blades is extended, and wherein the propulsion system comprises a length extended from a forward end of the hub to an aft end of the nacelle, and wherein a ratio of length to maximum diameter is at least 2.

20. The propulsion system of any one or more clauses herein, wherein a sum of blades and vanes is 30 or fewer, and wherein the sum of blades and vanes is 20 or greater.

21. The propulsion system in accordance with one or more clauses of this chapter, wherein the propulsion system generates a power loading at the rotor assembly of 50 horsepower per ft$^2$ or less at cruise altitude.

22. A propulsion system, the propulsion system comprising a core engine encased in a nacelle, wherein the nacelle defines a diameter, a rotor assembly comprising a plurality of blades and a hub, a vane assembly extended from the nacelle of the core engine, the vane assembly positioned aft of the rotor assembly, the propulsion system defines a length extended from the hub of the rotor assembly to an aft end of the nacelle, and wherein a ratio of length to diameter is at least 2, or at least 2.5

23. The propulsion system in accordance with one or more clauses of this chapter, wherein the core engine comprises an axisymmetric inlet.

24. The propulsion system in accordance with one or more clauses of this chapter comprising the system for reducing noise generation for a single unducted rotor engine in accordance with one or more clauses of this chapter.

25. A propulsion system, the propulsion system comprising a variable pitch rotor assembly comprising a plurality of blades coupled to a disk, wherein the plurality of blades extends radially from the disk, and wherein the plurality of blades is positioned along a rotor plane, the rotor plane extended orthogonal to a longitudinal centerline axis of the rotor assembly; and a scheduling ring rotatable relative to the disk and having a plurality of slots, and a plurality of linkage arms, each linkage arm operatively coupled to one of the plurality of fan blades and to one of the plurality of slots, wherein each of the plurality of fan blades rotates according to a blade pitch schedule defined by the slot to which it is operatively coupled, and wherein at least two of the plurality of slots define different blade pitch schedules.

26. The propulsion system in accordance with one or more clauses of this chapter, wherein at least two of the plurality of slots define different blade pitch schedules.

27. The propulsion system in accordance with one or more clauses of this chapter, wherein each of the plurality of linkage arms has a first end fixedly connected to one of the plurality of blades and a second end slidably connected to one of the plurality of slots.

28. The propulsion system in accordance with one or more clauses of this chapter, wherein the plurality of blades comprises a first set of blades and a second set of blades, and wherein the first set of blades is operably coupled to a first scheduling slot defining a first blade schedule, and wherein the second set of blades is operably coupled to a second scheduling slot defining a second blade schedule different from the first blade schedule.

29. The propulsion system in accordance with one or more clauses of this chapter, wherein the first scheduling slot and the second scheduling slot are in adjacent alternating arrangement.

30. The propulsion system in accordance with one or more clauses of this chapter, wherein the rotor assembly is a single unducted rotor assembly configured to provide substantially axial thrust.

31. The propulsion system in accordance with one or more clauses of this chapter, wherein the rotor assembly comprises between eight and twenty blades rotatably coupled to the disk.

32. The propulsion system in accordance with one or more clauses of this chapter, wherein the rotor assembly comprises twelve blades.

33. The propulsion system in accordance with one or more clauses of this chapter, comprising a core engine configured to produce combustion gases for driving a turbine section, wherein the variable pitch rotor assembly is configured to provide changes in thrust vector without changes in speed at the core engine.

34. The propulsion system in accordance with one or more clauses of this chapter comprising the system for reducing noise generation for a single unducted rotor engine in accordance with one or more clauses of this chapter.

75. A method for thrust reverse for a single unducted rotor engine, the method comprising generating a forward velocity component forward of a rotor assembly at least by closing a blade pitch angle at a blade at the rotor assembly, and generating a positive tangential velocity component at the rotor assembly, wherein the positive tangential velocity component is opposite of a negative tangential velocity component from a vane assembly aft of the rotor assembly.

76. The method in accordance with one or more clauses of this chapter, comprising loading the rotor assembly at least by closing a vane pitch angle at a vane at the vane assembly.

77. The method in accordance with one or more clauses of this chapter, wherein loading the rotor assembly comprises rotating the vane at the vane assembly co-directional to a direction of rotation of the blade at the blade assembly.

78. The method in accordance with one or more clauses of this chapter, wherein loading the rotor assembly comprises reducing the negative tangential velocity component at the vane assembly at least by closing the vane pitch angle.

79. A method for adjusting thrust vector for a single unducted rotor engine, the method comprising one or more steps of any preceding clause.

80. A computer-implemented method for operating a single unducted rotor engine, the computer-implemented method comprising the method of any preceding clause.

81. A computing system comprising one or more processors and one or more memory devices, wherein the one or more memory devices is configured to store instructions that, when executed by the one or more processors, performs operations, the operations comprising any of the steps of the method of any preceding clause.

82. A propulsion system in accordance with one or more clauses of this chapter, the propulsion system comprising the computing system of any preceding clause.

83. A propulsion system in accordance with one or more clauses of this chapter, the propulsion system configured to execute the steps of the method in accordance with one or more clauses of this chapter.

84. A computing system comprising one or more processors and one or more memory devices, wherein the one or more memory devices is configured to store instructions that, when executed by the one or more processors, performs operations, the operations comprising obtaining a throttle input corresponding to one or more of a desired air speed of an aircraft, thrust output, or pressure ratio; generating, via an engine cycle model, a commanded rotor blade pitch angle; obtaining, via a sensor, a measured rotor blade pitch; and generating, via a controller, a rotor blade pitch signal corresponding to a commanded adjustment to the commanded rotor blade pitch angle based at least on the measured rotor blade pitch.

85. The computing system in accordance with one or more clauses of this chapter, comprising generating a corrected low spool parameter signal based at least on a commanded low spool parameter and a measured low spool parameter; and generating an engine control signal corresponding to a fuel flow at a combustion section.

86. The computing system in accordance with one or more clauses of this chapter, wherein generating the rotor blade pitch signal is a first control loop and generating the engine control signal is a second control loop.

87. The computing system in accordance with one or more clauses of this chapter, wherein generating the rotor blade pitch signal is independent of generating the engine control signal when the combustion section is at a substantially steady state aircraft operating condition 88. A computing system comprising one or more processors and one or more memory devices, wherein the one or more memory devices is configured to store instructions that, when executed by the one or more processors, performs operations, the operations comprising obtaining a desired thrust output via a throttle input; determining, at least via a power management logic block, a commanded thrust output signal; receiving, at a controller, the commanded thrust output signal; and generating, via the controller, an output signal corresponding to one or more of a commanded fuel flow, a rotor blade pitch angle, a vane pitch angle, or a rotor plane angle.

89. The computing system in accordance with one or more clauses of this chapter, comprising generating, via the engine, an actual thrust output estimate based at least on the output signal.

90. The computing system in accordance with one or more clauses of this chapter, comprising receiving, via a sensor at the engine, an engine signal corresponding to one or more of a torque measurement, a low spool speed measurement, a high spool speed measurement, a rotor blade pitch angle measurement, a vane pitch angle measurement, a rotor plane position measurement, or one or more actuator positions corresponding to a variable geometry, or an acoustic sensor.

91. The computing system in accordance with one or more clauses of this chapter, comprising generating a thrust feedback signal based at least on the engine signal.

92. The computing system in accordance with one or more clauses of this chapter, wherein the thrust curve defines engine output characteristics as a function of one or more environmental conditions or control devices at the engine.

93. A computing system comprising one or more processors and one or more memory devices, wherein the one or more memory devices is configured to store instructions that, when executed by the one or more processors, performs operations, the sensor-based controller configured to execute instructions that perform operations comprising obtaining a throttle input corresponding to one or more of a desired air speed of an aircraft, thrust output, or pressure ratio; generating, via an engine cycle model, a commanded rotor blade pitch angle; obtaining, via a sensor, a measured rotor blade pitch; and generating, via a controller, a rotor blade pitch signal corresponding to a commanded adjustment to the commanded rotor blade pitch angle based at least on the measured rotor blade pitch, and wherein the computing system comprises a model-based controller configured to execute operations comprising obtaining a desired thrust output via a throttle input; determining, at least via an engine cycle model comprising a thrust curve, a commanded thrust output signal; receiving, at a controller, the commanded thrust output signal; and generating, via the controller, an output signal corresponding to one or more of a commanded fuel flow, a rotor blade pitch angle, a vane pitch angle, or a rotor plane angle.

94. The computing system in accordance with one or more clauses of this chapter, wherein the model-based controller is configured to adjust engine output thrust within a 7% margin.

95. The computing system in accordance with one or more clauses of this chapter, wherein the model-based controller is configured to adjust engine output thrust within a 5% margin.

96. The computing system in accordance with one or more clauses of this chapter, wherein the sensor-based controller is configured to generate the rotor pitch signal during transient changes in engine operating condition.

97. The computing system in accordance with one or more clauses of this chapter, wherein transient changes in engine operating condition comprises conditions to and between two or more of ignition, idle, takeoff, climb, cruise, descent, approach, or thrust reverse.

98. The computing system in accordance with one or more clauses of this chapter, wherein the model based controller is configured to generate the output signal during substantially steady state engine operating condition.

99. The computing system in accordance with one or more clauses of this chapter, the computing system configured to execute operations, the operations comprising generating a control signal corresponding to a commanded engine pressure ratio, a commanded core engine pressure ratio, a commanded rotor blade pitch angle, a commanded fuel flow, a commanded rotor plane angle, a commanded vane pitch angle, or combinations thereof.

100. The computing system in accordance with one or more clauses herein, the computing system comprising a first engine controller corresponding to a first single unducted rotor engine, the first engine controller comprising the sensor-based controller and the model-based controller; a second engine controller corresponding to a second single unducted rotor engine, the second engine controller comprising the sensor-based controller and the model-based controller, wherein the first engine controller and the second engine controller are in cross coupled communication to one another, and wherein the operations comprise determining a master controller of the first engine controller and the second engine controller, and determining whether to adjust an engine operating parameter at one or more of the first single unducted rotor engine or the second single unducted rotor engine, wherein determining whether to adjust the engine operating parameter corresponds to a sensed beat frequency between the first and second single unducted rotor engines.

101. The computing system of any clause herein, the operations comprising adjusting one or more of an engine operating parameter comprising rotor blade pitch angle, a vane pitch angle, or a rotor plane angle at one or more of the first single unducted rotor engine or the second single unducted rotor engine.

102. The computing system of any clause herein, wherein adjusting one or more of the engine operating parameter comprises maintaining a substantially constant speed of a core engine at the single unducted rotor engines.

103. The computing system of any clause herein, wherein determining the master controller comprises determining a better-performing engine based on one or more of a health parameter, an engine operating parameter, an engine cycle count, an exhaust gas temperature, specific fuel consumption, or time-on-wing.

104. The computing system of any clause herein, the operations comprising de-tuning the better-performing single unducted rotor engine based on the other engine operating condition.

105. The computing system of any clause herein, the operations comprising generating, via the sensor-based controller at the first engine controller or the second engine controller, a corrected low spool parameter signal based at least on a commanded low spool parameter and a measured low spool parameter; generating, via the sensor-based controller at the first engine controller or the second engine controller, an engine control signal corresponding to a fuel flow at a combustion section; generating, via the engine, an actual thrust output based at least on the output signal; and receiving, via a sensor at the engine, an engine signal corresponding to one or more of a torque measurement, a low spool speed measurement, a high spool speed measurement, a rotor blade pitch angle measurement, a vane pitch angle measurement, a rotor plane position measurement, or one or more actuator positions corresponding to a variable geometry, or an acoustic sensor.

106. An aircraft comprising a computing system in accordance with one or more clauses of this chapter.

107. An aircraft comprising a propulsion system in accordance with one or more clauses of this chapter.

108. An aircraft configured to execute the steps of a method in accordance with one or more clauses of this chapter.

109. A propulsion system, the propulsion system comprising a variable pitch rotor assembly comprising a plurality of blades coupled to a disk, wherein the plurality of blades comprises a first blade configured to articulate a first blade pitch separately from a second blade configured to articulate a second blade pitch; a vane assembly positioned in aerodynamic relationship with the variable pitch rotor assembly; a core engine comprising a high speed spool and a low speed spool, wherein the low speed spool is operably coupled to the rotor assembly; and one or more controllers configured to execute operations, the operations comprising articulating the first blade of the rotor assembly, wherein articulating the first blade alters the first blade pitch; and articulating the second blade of the rotor assembly, wherein articulating the second blade alters the second blade pitch.

110. The propulsion system of any clause herein, the operations comprising receiving an input signal indicative of an environmental parameter within or surrounding the propulsion system; and generating an output signal based on the environmental parameter, wherein the output signal corresponds to articulation of one or more of the first blade or the second blade of the rotor assembly.

111. The propulsion system of any clause herein, wherein generating the output signal corresponds to a desired frequency of articulation of one or more of the first blade or the second blade of the rotor assembly.

112. The propulsion system of any clause herein, wherein the desired frequency of articulation corresponds to a resonance frequency of one or more of the first blade or the second blade of the rotor assembly.

113. The propulsion system of any clause herein, wherein the desired frequency of articulation is based at least on a torsional mode shape of the first blade or the second blade of the rotor assembly.

114. The propulsion system of any clause herein, wherein articulating the first blade and the second blade of the rotor assembly comprises intermittently changing the first blade pitch and the second blade pitch.

115. The propulsion system of any clause herein, the operations comprising altering thrust vector based at least on operating the core engine at a substantially constant speed and articulating one or both of the first blade or the second blade of the variable pitch rotor assembly.

116. The propulsion system of any clause herein, the operations comprising altering thrust vector based at least on operating the low speed spool at a substantially constant speed based at least on articulating one or both of the first blade or the second blade of the variable pitch rotor assembly relative to a vane pitch angle of the vane assembly aft of the rotor assembly.

117. The propulsion system of any clause herein, wherein the variable pitch rotor assembly is a single unducted rotor assembly positioned forward of the vane assembly.

118. The propulsion system of any clause herein, the operations comprising operating the core engine and the rotor assembly to generate thrust output; determining a desired thrust output versus speed of the core engine; and generating an output signal based at least on the determined desired thrust output versus speed of the core engine.

119. The propulsion system of any clause herein, the operations comprising altering thrust vector based at least on operating the low speed spool at a substantially constant speed based at least on articulating one or both of the first blade or the second blade of the variable pitch rotor assembly relative to a vane pitch angle of the vane assembly aft of the rotor assembly.

120. A propulsion system comprising a variable pitch rotor assembly comprising a single stage of a plurality of blades coupled to a disk, wherein the plurality of blades comprises a first blade configured to articulate a first blade pitch separately from a second blade configured to articulate a second blade pitch; a vane assembly positioned aft of the variable pitch rotor assembly; a core engine comprising a high speed spool and a low speed spool, wherein the low speed spool is operably coupled to the rotor assembly; and a controller configured to execute operations, the operations comprising determining a desired thrust output versus speed of the core engine; determining a desired first blade pitch at the first blade; determining a desired second blade pitch at the second blade; and adjusting one or both of the first blade pitch or the second blade pitch based on the determined desired thrust output versus speed of the core engine.

121. The propulsion system of any clause herein, the operations comprising receiving an input signal indicative of an environmental parameter; and generating an output signal based on the environmental parameter, wherein the output signal corresponds to adjusting of one or more of the first blade pitch or the second blade pitch.

122. The propulsion system of any clause herein, wherein the environmental parameter comprises one or more of a perceived noise, ambient air temperature, ambient air pressure, or icing condition.

123. The propulsion system of any clause herein, wherein generating the output signal corresponds to a desired frequency of adjusting of one or more of the first blade pitch or the second blade pitch.

124. The propulsion system of any clause herein, wherein the desired frequency of adjusting corresponds to a resonance frequency of one or more of the first blade or the second blade of the rotor assembly.

125. The propulsion system of any clause herein, wherein the desired frequency of adjusting is based at least on a torsional mode shape of the first blade or the second blade of the rotor assembly.

126. The propulsion system of any clause herein, wherein adjusting one or both of the first blade pitch or the second blade pitch comprises intermittently adjusting the first blade pitch and the second blade pitch between a respective first angle and second angle.

127. The propulsion system of any clause herein, the operations comprising altering thrust vector based at least on adjusting the first blade to the desired first blade pitch at the first blade or adjusting the second blade to the desired second blade pitch different from the desired first blade pitch.

128. The propulsion system of any clause herein, the operations comprising operating the core engine at a substantially constant speed when altering thrust vector.

129. A propulsion system defining an engine centerline, the propulsion system comprising a rotor assembly configured to rotate relative to the engine centerline axis, the rotor assembly comprising a plurality of blades, each blade of the plurality of blades configured to rotate along a respective blade pitch angle axis; and a vane assembly positioned in aerodynamic relationship with the rotor assembly, the vane assembly comprising a plurality of vanes, each vane of the plurality of vanes configured to rotate along a respective vane pitch angle axis a controller configured to execute operations, the operations comprising moving each blade of the plurality of blades to a reverse thrust position about its respective blade pitch axis, wherein a leading edge of each blade is located aft of a trailing edge of the respective blade at a radial span location when in the reverse thrust position; and adjusting each vane of the plurality of vanes about its respective vane pitch axis when the plurality of blades is in the reverse thrust position to modify an amount of reverse thrust generated by the propulsion system.

130. The propulsion system of any clause herein, wherein the rotor assembly is unducted.

131. The propulsion system of any clause herein, wherein the one or more blades is configured to generate forward flow over a first portion of a blade span, and wherein the one or more blades is configured to generate reverse flow over a second portion of the blade span.

132. The propulsion system of any clause herein, wherein the one or more blades is configured to generate forward flow below 50% of a blade span, and wherein the one or more blades is configured to generate reverse flow at or above 50% of the blade span.

133. The propulsion system of any clause herein, wherein adjusting each vane of the plurality of vanes about its respective vane pitch axis when the plurality of blades are in the reverse thrust position comprises rotating one or more vanes along the vane pitch axis up to 15 degrees open or up to 15 degrees closed from a design point.

134. The propulsion system of any clause herein, wherein adjusting each vane of the plurality of vanes about its respective vane pitch axis when the plurality of blades are in the reverse thrust position comprises rotating one or more vanes along the vane pitch axis up to 10 degrees open or up to 10 degrees closed from a design point.

135. The propulsion system of any clause herein, wherein adjusting each vane of the plurality of vanes about its respective vane pitch axis when the plurality of blades are in the reverse thrust position comprises rotating one or more vanes along the vane pitch axis up to 5 degrees open or up to 5 degrees closed from a design point.

136. The propulsion system of any clause herein, wherein adjusting each vane of the plurality of vanes about its respective vane pitch axis when the plurality of blades is in the reverse thrust position comprises closing the vanes to increase the amount of reverse thrust generated by the propulsion system.

137. The propulsion system of any clause herein, wherein adjusting each vane of the plurality of vanes about its respective vane pitch axis when the plurality of blades is in the reverse thrust position comprises opening the vanes to decrease the amount of reverse thrust generated by the propulsion system.

138. The propulsion system of any clause herein, wherein the rotor assembly is ducted.

139. The propulsion system of any clause herein, wherein the vane assembly is positioned aft of the rotor assembly when the blade pitch angle at one or more blades of the rotor assembly is closed.

140. A method for generating reverse thrust for a single stage unducted rotor engine with a vane assembly positioned in aerodynamic relationship, the method comprising adjusting a blade pitch angle at one or more blades of the rotor assembly to position a blade leading edge aft of a blade trailing edge at a radial span location; and adjusting loading at the rotor assembly based on changing a vane pitch angle of one or more vanes of the vane assembly.

141. The method of any clause herein, wherein adjusting loading at the rotor assembly based on changing the vane pitch angle of one or more vanes of the vane assembly comprises closing the vanes to increase the amount of reverse thrust generated by the engine.

142. The method of any clause herein, wherein adjusting loading at the rotor assembly based on changing the vane pitch angle of one or more vanes of the vane assembly comprises opening the vanes to decrease the amount of reverse thrust generated by the propulsion system.

143. The method of any clause herein, wherein adjusting loading at the rotor assembly based on changing the vane pitch angle of one or more vanes of the vane assembly comprises rotating one or more vanes along the vane pitch axis up to 15 degrees open or up to 15 degrees closed from a design point.

144. The method of any clause herein, wherein adjusting loading at the rotor assembly based on changing the vane pitch angle of one or more vanes of the vane assembly comprises rotating one or more vanes along the vane pitch axis up to 10 degrees open or up to 10 degrees closed from a design point.

145. The method of any clause herein, wherein adjusting loading at the rotor assembly based on changing the vane pitch angle of one or more vanes of the vane assembly comprises rotating one or more vanes along the vane pitch axis up to 5 degrees open or up to 5 degrees closed from a design point.

146. The method of any clause herein, wherein adjusting the blade pitch angle at one or more blades of the rotor assembly to position the blade leading edge aft of the blade trailing edge at the radial span location comprises generating forward flow below 50% of a blade span; and generating reverse flow at or above 50% of the blade span.

147. A computing system, the computing system configured to store instructions that, when executed by the one or more processors, performs operations, the operations comprising commanding an adjustment of a blade pitch angle at one or more blades of a rotor assembly of an aeronautical engine to position a blade leading edge aft of a blade trailing edge at a radial span location; and commanding an adjustment of a loading at the rotor assembly based on changing a vane pitch angle of one or more vanes of a vane assembly of the aeronautical engine.

148. The computing system of any clause herein, wherein commanding the adjustment of the loading at the rotor assembly based on changing the vane pitch angle of one or more vanes of the vane assembly comprises commanding a closing of the vanes to increase an amount of reverse thrust generated by the aeronautical engine.

149. The computing system of any clause herein, wherein commanding the adjustment of the loading at the rotor assembly based on changing the vane pitch angle of one or more vanes of the vane assembly comprises commanding an opening of the vanes to decrease an amount of reverse thrust generated by the aeronautical engine.

150. A system for reducing noise generation for a single unducted rotor engine, the system comprising the propulsion system in accordance with one or more clauses of this chapter.

151. A propulsion system defining an engine centerline, the propulsion system comprising an unducted rotor assembly comprising a plurality of blades extended radially relative to the engine centerline axis, the rotor assembly configured to generate thrust substantially co-directional to the engine centerline axis, and a vane assembly positioned aft of the rotor assembly, the vane assembly comprising a plurality of vanes extended radially relative to the engine centerline axis, wherein the propulsion system generates a power loading at the rotor assembly of at least 25 horsepower per ft$^2$ at cruise altitude.

152. The propulsion system in accordance with one or more clauses of this chapter, wherein the propulsion system generates a power loading at the rotor assembly of 100 horsepower per ft$^2$ or less at cruise altitude.

153. The propulsion system in accordance with one or more clauses of this chapter, wherein cruise altitude comprises an ambient air condition between 4.85 psia and 2.14 psia.

154. A propulsion system of any one or more clauses herein configured to execute the method of any one or more clauses herein.

What is claimed:

1. A computing system for an unducted rotor engine with an unducted variable pitch vane assembly fluidly coupled to an unducted rotor assembly, the computing system comprising:
  a controller configured to execute operations comprising:
    determining a throttle input;
    determining, based on the throttle input, a desired thrust output;
    generating a first pitch angle control signal for the unducted rotor assembly and a second pitch angle control signal for the unducted variable pitch vane assembly based on the desired thrust output determining, using an engine model and a plurality of engine sensor measurements, a thrust estimate;
    generating, based on a difference between the desired thrust output and the thrust estimate, an adjustment to at least one of the first pitch angle control signal and the second pitch angle control signal;
    receiving, via an acoustic sensor an acoustic signal; and
    wherein the generating the adjustment to at least one of the first pitch angle control signal and the second pitch angle control signal is further based on the acoustic signal.

2. The computing system of claim 1, wherein the adjustment is configured to alter the desired thrust output by less than 7%.

3. The computing system of claim 1, wherein the adjustment is not used to adjust the at least one of the first pitch angle control signal and the second pitch angle control signal during transient changes in engine operating condition.

4. The computing system of claim 3, wherein transient changes in engine operating condition comprises conditions to and between two or more of ignition, idle, takeoff, climb, cruise, descent, approach, or thrust reverse.

5. The computing system of claim 1, wherein the adjustment is used to adjust the at least one of the first pitch angle control signal and the second pitch angle control signal during substantially steady state engine operating condition.

6. The computing system of claim 1, the operations comprising:
  generating a speed signal corresponding to a reference low spool speed based on the desired thrust output and
  generating, based on the difference between the desired thrust output and the thrust estimate, an adjustment to the speed signal.

7. The computing system of claim 6, the operations comprising:
  generating a fuel flow control signal based on the desired thrust output.

8. The computing system of claim 7, the operations comprising:
  generating, based on a difference between the desired thrust output and the thrust estimate, an adjustment to the fuel flow control signal.

9. The computing system of claim 8, wherein adjustment to the fuel flow control signal is based on the adjustment to the speed signal.

10. The computing system of claim 1, the operations further comprising:
  generating a torque signal based on the desired thrust output;
  generating, based on a difference between the desired thrust output and the thrust estimate, an adjustment to the torque signal;
  wherein the adjustment to at least one of the first pitch angle control signal and the second pitch angle control signal is based on the adjustment to the torque signal.

11. A computing system for an engine, the computing system comprising one or more processors and one or more memory devices, wherein the one or more memory devices is configured to store instructions that, when executed by the one or more processors, performs operations, the operations comprising:
  generating a first signal corresponding to a commanded low spool speed;
  generating a second signal indicative of a command for at least one of:
  a variable blade pitch angle of an unducted rotor assembly;
  variable vane pitch angle of an unducted variable pitch vane assembly fluidly coupled to the unducted rotor assembly;
  generating a pitch feedback signal from at least one pitch sensor to adjust the second signal, wherein generating the pitch feedback signal is a first closed control loop;
  receiving, via an acoustic sensor an acoustic signal; and
  generating a further adjustment to the second signal based on the acoustic signal.

12. The computing system of claim 11, the operations comprising:
  obtaining a throttle input corresponding to at least one of a desired air speed of an aircraft, a desired thrust output, and a desired pressure ratio;
  generating the first signal corresponding to the commanded low spool speed based on the throttle input; and
  generating the second signal based on the throttle input.

13. The computing system of claim 12, wherein the first signal is indicative of a fuel flow to a combustion section.

14. The computing system of claim 13, the operations comprising:
  generating a low spool speed feedback signal from at least one speed sensor to adjust the first signal and thereby adjust the fuel flow.

15. The computing system of claim 14, wherein generating the low spool speed feedback is a second closed control loop.

16. The computing system of claim 14, wherein generating the first signal includes maintaining a substantially constant core engine speed.

17. The computing system of claim 16, wherein generating the first signal includes a variable speed of the unducted rotor assembly.

* * * * *